US010480940B2

(12) United States Patent
Schubert et al.

(10) Patent No.: US 10,480,940 B2
(45) Date of Patent: Nov. 19, 2019

(54) LEVELING AND POSITIONING SYSTEM AND METHOD

(71) Applicant: OTL DYNAMICS LLC, Vashon Island, WA (US)

(72) Inventors: Richard S. Schubert, Vashon Island, WA (US); Robert P. Donker, Burton, WA (US)

(73) Assignee: OTL DYNAMICS LLC, Vashon Island, WA (US)

( * ) Notice: Subject to any disclaimer, the term of this patent is extended or adjusted under 35 U.S.C. 154(b) by 62 days.

(21) Appl. No.: 15/900,659

(22) Filed: Feb. 20, 2018

(65) Prior Publication Data

US 2018/0180414 A1 Jun. 28, 2018

Related U.S. Application Data

(63) Continuation-in-part of application No. 15/259,997, filed on Sep. 8, 2016, now Pat. No. 9,909,867, which is a continuation-in-part of application No. 14/259,865, filed on Apr. 23, 2014, now Pat. No. 9,464,895, which is a continuation-in-part of application No. 13/212,989, filed on Aug. 18, 2011, now Pat. No. 8,959,784, which is a (Continued)

(51) Int. Cl.

| | |
|---|---|
| ***G01C 9/06*** | (2006.01) |
| ***G01C 15/10*** | (2006.01) |
| ***G01C 9/28*** | (2006.01) |
| ***G01C 3/02*** | (2006.01) |
| ***G01C 9/02*** | (2006.01) |

(52) U.S. Cl.
CPC ................ *G01C 9/06* (2013.01); *G01C 3/02* (2013.01); *G01C 9/02* (2013.01); *G01C 9/28* (2013.01); *G01C 15/10* (2013.01); *B23B 2260/094* (2013.01)

(58) Field of Classification Search
CPC .............. G01C 9/06; G01C 9/00; G01C 9/28
USPC .................................. 33/371, 370, 372, 373
See application file for complete search history.

(56) References Cited

U.S. PATENT DOCUMENTS 312,266 A * 2/1885 Gurley .................... G01C 9/28
33/373
986,783 A * 3/1911 Tschop .................... G01C 9/26
33/332

(Continued)

OTHER PUBLICATIONS

Bennett, G. Bradley, Reasons for Allowance in parent case (U.S. Appl. No. 13/623,781), dated Jun. 19, 2014, p. 2.

(Continued)

*Primary Examiner* — Christopher W Fulton
(74) *Attorney, Agent, or Firm* — Davis Wright Tremain LLP

(57) ABSTRACT

A leveling device coupler assembly that includes a coupling head and a joint assembly coupled to the coupling head. The joint assembly can include a first and second rotatable coupling. The leveling device coupler assembly can also include a base coupler coupled to the joint assembly, with the base coupler and coupling head being coupled on opposing ends of the joint assembly. The leveling device coupler assembly can also include an electronic coupler assembly leveling device configured to at least detect a configuration status of the leveling device coupler assembly.

12 Claims, 57 Drawing Sheets

Related U.S. Application Data continuation-in-part of application No. 12/724,326, filed on Mar. 15, 2010, now Pat. No. 8,006,397.

(60) Provisional application No. 61/159,968, filed on Mar. 13, 2009, provisional application No. 62/343,619, filed on May 31, 2016.

(56) References Cited

U.S. PATENT DOCUMENTS 1,380,407 A 6/1921 Nelson
1,794,254 A 2/1931 Sherwood
1,908,496 A 5/1933 Hunter
2,314,927 A 3/1943 Farrington
2,535,791 A 12/1950 Fluke
2,575,697 A * 11/1951 Willis ........................ B25H 7/00 33/341
2,647,712 A * 8/1953 Sandmoen ............... B25H 3/00 248/314
2,755,561 A 7/1956 LaFosse
2,789,363 A 4/1957 Miley
2,824,381 A 2/1958 Traupmann
3,368,287 A 2/1968 Ault
3,545,091 A 12/1970 Sebastiani
3,707,772 A 1/1973 Cotter
3,820,249 A 6/1974 Stone
4,141,151 A 2/1979 Jansky
4,154,001 A 5/1979 Serafin
4,168,578 A 9/1979 VanderWerf
4,295,279 A 10/1981 Sienknecht
4,333,244 A 6/1982 Bailey
4,393,599 A 7/1983 Sterrenberg
4,402,141 A 9/1983 Sterrenberg
4,564,322 A 1/1986 Stapley
4,593,475 A 6/1986 Mayes
4,625,423 A 12/1986 Sackett
4,663,856 A 5/1987 Hall et al.
4,953,475 A 9/1990 Munach et al.
4,976,040 A 12/1990 Mish et al.
4,996,777 A 3/1991 Grosz
5,031,329 A 7/1991 Smallidge
5,109,609 A 5/1992 Anderson
5,255,443 A 10/1993 Schmidt
5,388,337 A 2/1995 Powers, II
5,421,094 A * 6/1995 McCord ................... G01C 9/28 33/371
5,442,864 A 8/1995 Erman
5,531,031 A 7/1996 Green
5,581,900 A 12/1996 Payne
5,594,669 A 1/1997 Heger
5,749,151 A 5/1998 Scott et al.
5,813,125 A 9/1998 Byrn
5,992,033 A 11/1999 Scarborough
5,996,238 A 12/1999 Yonke
6,029,359 A 2/2000 Szumer
6,182,916 B1 2/2001 Lin
6,279,239 B1 8/2001 Astudillo
6,354,011 B1 3/2002 Albrecht
6,438,854 B1 * 8/2002 Kott, Jr. .................. B25B 5/068 269/6
6,442,853 B1 9/2002 Hale et al.
6,502,322 B2 1/2003 Smochek
6,640,456 B2 * 11/2003 Owoc ...................... G01C 9/26 33/371
6,655,883 B2 12/2003 Maar
6,675,490 B1 1/2004 Krehel et al.
6,836,972 B2 1/2005 Drahos et al.
6,898,860 B2 5/2005 Wu
6,915,587 B1 7/2005 Scillia et al.
6,915,588 B1 7/2005 Gay
6,918,187 B2 7/2005 Schaefer
7,117,606 B2 10/2006 Brown
7,182,148 B1 2/2007 Szieff
7,237,341 B2 7/2007 Murray
7,389,591 B2 6/2008 Jaiswal et al.
7,513,055 B2 4/2009 Montgomery
7,644,506 B2 1/2010 Wong
7,726,039 B2 6/2010 Lee et al.
7,743,520 B1 6/2010 Jiorle
7,752,763 B2 7/2010 Yamamoto
7,874,077 B2 1/2011 Borinato
8,006,397 B2 8/2011 Schubert
8,336,221 B2 12/2012 Steele et al.
8,484,856 B1 7/2013 Webb et al.
8,959,784 B2 2/2015 Schubert
9,114,494 B1 8/2015 Mah
9,144,875 B2 9/2015 Schlesak et al.
9,464,895 B2 10/2016 Schubert et al.
9,909,867 B2 * 3/2018 Schubert .................. G01C 9/10
2002/0133959 A1 9/2002 Bone et al.
2004/0182587 A1 9/2004 May et al.
2004/0216314 A1 11/2004 Ch Fung et al.
2005/0044738 A1 3/2005 Adams et al.
2005/0159840 A1 7/2005 Lin et al.
2005/0171714 A1 8/2005 Ely et al.
2005/0262717 A1 12/2005 Chen
2006/0064888 A1 3/2006 Chen
2007/0045010 A1 3/2007 Kasperek
2007/0079516 A1 4/2007 Eckstein et al.
2007/0130785 A1 6/2007 Bublitz et al.
2007/0180720 A1 8/2007 Gorgone
2010/0032179 A1 2/2010 Hanspers et al.
2010/0300713 A1 12/2010 Kume et al.
2010/0325906 A1 12/2010 Yowonske
2012/0168189 A1 7/2012 Eckert
2014/0007442 A1 1/2014 Pettersson et al.
2014/0019083 A1 1/2014 Nakaoka
2014/0075768 A1 3/2014 Schubert et al.
2014/0085144 A1 3/2014 Krapf et al.
2014/0166323 A1 6/2014 Cooper
2015/0014004 A1 1/2015 Schubert et al.
2015/0041164 A1 2/2015 Sergyeyenko et al.
2015/0042247 A1 2/2015 Kusakawa
2015/0309640 A1 10/2015 Vuckovic
2015/0352713 A1 12/2015 Takazakura et al.
2016/0054124 A1 2/2016 Schaefer
2017/0201853 A1 7/2017 Chen et al.

OTHER PUBLICATIONS

USPTO, Office Action dated Mar. 24, 2011 for U.S. Appl. No. 12/724,326, filed Mar. 15, 2010.
USPTO, Office Action dated May 29, 2013 for U.S. Appl. No. 13/212,989, filed Aug. 18, 2011.
U.S. Appl. No. 12/724,326, filed Mar. 15, 2010.
U.S. Appl. No. 13/212,989, filed Aug. 18, 2011.
U.S. Appl. No. 13/623,781, filed Sep. 20, 2012.
U.S. Appl. No. 14/259,865, filed Apr. 23, 2014.
U.S. Appl. No. 15/259,997, filed Sep. 8, 2016.
U.S. Appl. No. 16/154,433, filed Oct. 8, 2018.
U.S. Appl. No. 14/497,986, filed Sep. 26, 2014.
U.S. Appl. No. 15/610,357, filed May 31, 2017.

* cited by examiner 3730
3705
3710
4010
4005
4015
3700
3700B 3705
3730
3730
3700
3700B 3705
3730
3730
3700
3700B

LEVELING AND POSITIONING SYSTEM AND METHOD

PRIORITY CLAM

This application is a continuation-in-part of and claims priority to U.S. Non-Provisional application Ser. No. 15/259,997, filed Sep. 8, 2016, (issued as U.S. Patent 9,909,867) which is a continuation-in-part of and claims priority to U.S. Non-Provisional application No. 14/259,865 filed Apr. 23, 2014, which is a continuation-in-part of U.S. Non-Provisional application Ser. No. 13/212,989 filed Aug. 18, 2011, (issued as U.S. Pat. No. 8,959,784) which is a continuation-in-part of U.S. Non-Provisional application Ser. No. 12/724,326 filed on Mar. 15, 2010 (issued as U.S. Pat. No. 8,006,397) that claims the benefit of priority of U.S. Provisional Application No. 61/159,968 filed on Mar. 13, 2009 (now expired).

This application is also a non-provisional of and claims priority to U.S. provisional Application No. 62/569,263, filed Oct. 6, 2017.

This application is also related to application Ser. No. 13/623,781 filed Sep. 12, 2012 (issued as U.S. Pat. No. 8,869,412). All of these applications are incorporated herein by reference in their entireties for all purposes.

FIELD

This invention relates generally to leveling and positioning, and more specifically, to systems and methods for remote leveling and positioning.

BACKGROUND

Leveling is the positioning of a plane of an object perpendicular to the gravitational axis of the earth; whereas a plane is plumb when it is parallel to the earth's gravitational axis. For example, in a household setting, people typically prefer to level pictures, mirrors, and other framed objects so that these objects are parallel to the floor, ceiling and walls of a house, which are presumed to be level themselves. In a construction setting, numerous structural elements must be leveled to satisfy building codes and esthetic preferences. For example, as discussed above, leveling of framed objects requires that structures of a home be themselves level, which must be done during construction.

Positioning is the placement of an object, which may include its position in three dimensional space, or a rotational orientation. In some situations, positioning may include leveling. An example of positioning may include locating an object a certain distance from another object, orienting an object toward a compass point, locating the object a certain distance from sea level or ground level, and the like.

Various devices and methods can be used to level or position an object. One exemplary leveling device is a bubble or spirit level, which is a transparent and slightly curved vial that is incompletely filled with liquid. The resultant bubble in this vial settles to the center of the vial, when the vial is level.

While this is a typical device used to level or plumb objects, it is deficient because a user must be able to see the position of the bubble in order to properly use the instrument, and being at a distance, at certain angles, and having an obstructed view makes bubble levels unusable. Unfortunately, this substantially limits the use of such a device in many settings.

Additionally, in situations where a plurality of users is leveling an object, using a bubble level device can be cumbersome because at least one user must read the level and relay instructions to others. This is not efficient when an object is heavy or when it is not easy for users to view the bubble level while working.

BRIEF DESCRIPTION OF THE DRAWINGS

The present invention will be described by way of exemplary embodiments illustrated in the accompanying drawings in which like references denote similar elements, and in which.

DESCRIPTION

Figure 1A:
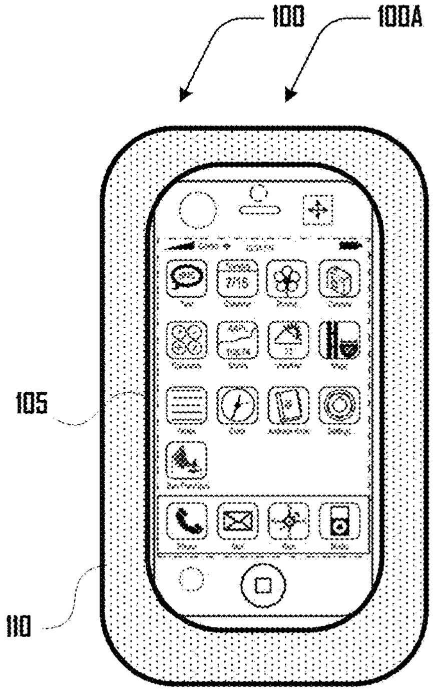
FIG. 1*a* is a front view of a leveling device assembly in accordance with an embodiment.

Illustrative embodiments presented herein include, but are not limited to, systems and methods for remote leveling and positioning. Some embodiments are directed to a housing or assembly of a leveling device.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the embodiments described herein; however, the order of description should not be construed as to imply that these operations and/or communications are necessarily order dependent. In particular, these operations and/or communications need not be performed in the order of presentation.

The term “embodiment” is used repeatedly. The phrase generally does not refer to the same embodiment; however, it may. The terms “comprising,” “having” and “including” are synonymous, unless the context dictates otherwise. Additionally, various embodiments discussed herein are directed towards leveling, however, these embodiments can equally relate to plumbing or achieving a plumb state.

Various embodiments described herein relate to leveling devices, which may include a housing and electronic components. In various embodiment, the housing and one or more electronic components of a leveling device may be seperable, either alone or in combination. For example, electronic components of a leveling device may be disposed on one or more circuit board that this separable from a housing. In some embodiments, a stand-alone device may be disposed within a housing. For example, a smart-phone may be disposed within a housing. In some embodiments, electronic various components may be integrally disposed within a housing. While some embodiments may describe one or more of these housing and electronic component configurations, any of the embodiments described herein may be suitably modified to conform to any of the above housing and electronic component configurations, or the like. Accordingly, the following disclosure should not be interpreted to be limiting in terms of housing and electronic component configuration.

Moreover, any of the capabilities, functionalities, or features of the embodiments described herein may be suitably applied to, or combined with, other embodiments, or may be removed from an embodiment. Accordingly, the following disclosure should not be interpreted to be limiting in terms of specific combinations of capabilities, functionalities, or features. The example embodiments described herein merely illustrate some of the numerous possible combinations of capabilities, functionalities, or features, which are within the scope and spirit of the invention.

Various embodiments disclosed herein may utilize one or more wireless network or wireless protocol. One or more wireless network may be used to operatively inter-connect two or more device disclosed herein, or may be used to operatively connect one or more device disclosed herein with another suitable device, network, or server. In some embodiments, peer-to-peer wireless connections may be established comprising two or more devices.

For example, in an embodiment, a suitable network may comprise MeshDynamics™ Smart Multi-Grid™ wireless technology, such as MD4000 modular and interoperable products, or the like (MeshDynamics Inc., Santa Clara, Calif.). In one embodiment, a suitable network may comprise ZigBee™ devices, may utilize ZigBee™ protocols, or the like (ZigBee Alliance, San Ramone, Calif.). In one embodiment, a suitable network may comprise Bluetooth™ devices, may utilize Bluetooth™ protocols, or the like (Bluetooth Special Interest Group, Kirkland, Wash.).

While some example embodiment described herein may be described as using one or more specific type of network, the present disclosure should not be construed to limit the number of types of networks, wireless or otherwise, that may be employed in various embodiments. Accordingly, the example embodiments described herein merely illustrate some of the numerous possible networks that may be used, which are within the scope and spirit of the invention.

Figure 1B:
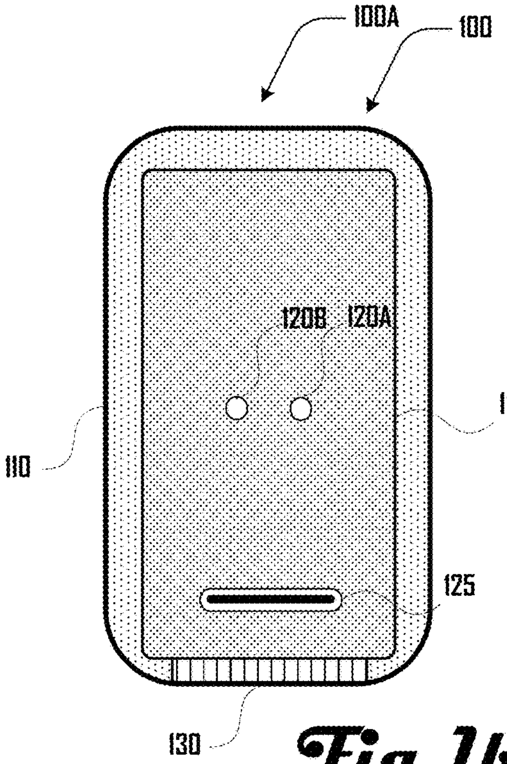
FIG. 1*b* is a back view of the leveling device assembly in accordance with an embodiment.
Figure 2A:
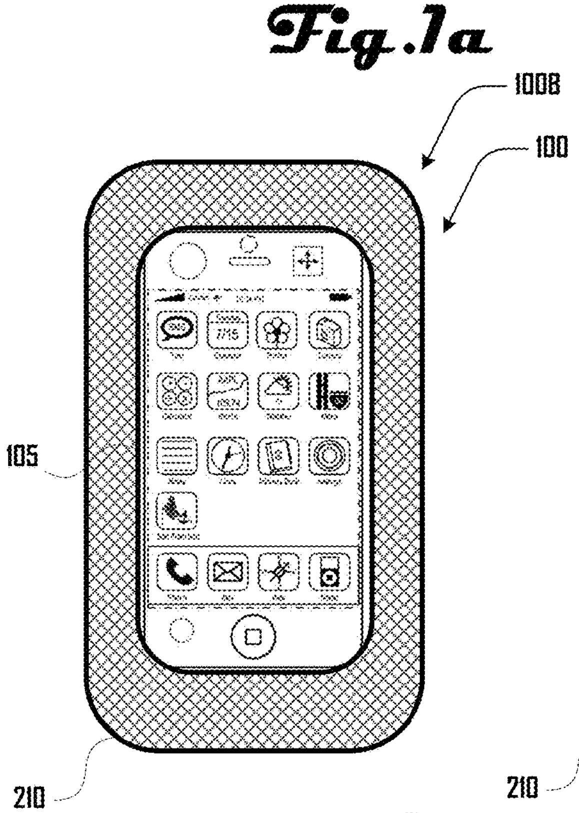
FIG. 2*a* is a front view of a further leveling device assembly in accordance with an embodiment.
Figure 2B:
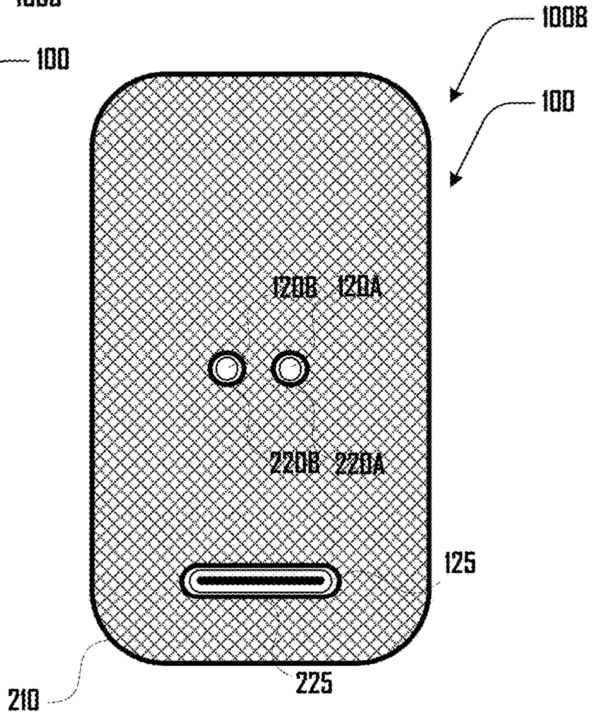
FIG. 2*b* is a back view of the further leveling device assembly in accordance with an embodiment.

FIGS. 1*a* and 1*b* show a front and back view of a leveling device assembly 100A in accordance with an embodiment. FIGS. 2*a* and 2*b* depict a front and back view of a leveling device assembly 100B in accordance with a further embodiment. In accordance with some embodiments, the leveling device assembly 100B of FIGS. 2*a* and 2*b* comprises the leveling device assembly 100A of FIGS. 1*a* and 1*b*. The following is a discussion of such an embodiment, however the leveling device assembly 100A of FIGS. 1*a* and 1*b* may be a stand-alone embodiment or further embodiments may comprise this leveling device assembly 100A, or the like. In accordance with an embodiment, the leveling device assembly may comprise a leveling device 105 and a leveling device cover (not labeled) which comprises all other components aside from the leveling device 105.

Accordingly, FIGS. 1*a* and 1*b* depict a leveling device assembly 100A, which includes a leveling device 105, which is covered by an inflatable bladder 110, which allows a portion of the leveling device 105 to be exposed. For example, in an embodiment, leveling device 105 may be a cellular telephone, personal data assistant, gaming device, or the like, which may comprise or be augmented to comprise leveling capabilities. The following Figures depict an iPhone® or iPod® as a leveling device 105, however further embodiments provide a leveling device 105 that may be various commercially available devices that are used as a leveling device 105.

The inflatable bladder 110 may be any suitable inflatable member that is configured to surround a portion of a leveling device 105. The inflatable member may be configured to be selectively inflated and deflated, which may be achieved via any suitable air port, pump, or the like (not shown). The inflatable bladder 110 may cover and surround some or all of a leveling device 105, which may be configured to provide access to a button, display, power port, data port, or the like, which may be present on a leveling device 105. For example, as depicted in FIG. 1*a*, the inflatable bladder is configured to allow access to a touch-display of the leveling device 105.

In some embodiments, it may desirable to have an inflatable bladder 110 to protect the leveling device 105 from damage caused by shock or contact, which may include falling or an object hitting the leveling device 105. The inflatable bladder 110 may therefore be configured to provide protection for the leveling device 105 in various embodiments.

Turning to FIG. 1*b*, the back of the leveling device assembly 100A comprises a rigid plate 115, which comprises a first and second coupling extension 120, a port 125 and a port coupling 130, which is configured to operably engage with at least one port (not shown) on the leveling device 105. For example, the port coupling 130 may be configured to operably engage any of a data port, power port, audio port, or the like, which may be present on a leveling device 105. Accordingly, the inflatable bladder 110 may be configured to provide access to such device ports. In some embodiments, there may be a plurality of ports 125.

The rigid plate 115 may provide a rigid backing support for the coupling extensions 120, the port 125, and the port coupling 130. The rigid plate 115 may or may not be coupled to the inflatable bladder 110. In some embodiments, the rigid plate 115 may be positioned directly adjacent to the leveling device 105 and surrounded by the inflatable bladder 110.

Turning to FIGS. 2*a* and 2*b*, a leveling device assembly 100B may be covered with a jacket 210, which surrounds a portion of the leveling device 105 and the inflatable bladder 110. The jacket 210 may comprise a port orifice 225 and coupling extension orifices 220, which provide access to the port 125 and coupling extensions 120 respectively. As shown in FIG. 2*a*, the jacket 210 may be configured to allow various portions of the leveling device 105 to be exposed, such as a touch-screen display. In various embodiments, the jacket 210 may comprise puncture resistant material such as Kevlar®, or the like.

In further embodiments the leveling device assembly 100A, 100B may include components to protect exposed portions of the leveling device 105. For example, there may be a transparent or translucent cover for the touch-display of the leveling device 105, which may be configured to reside over the touch-display without actually contacting the touch-display.

Figure 3A:
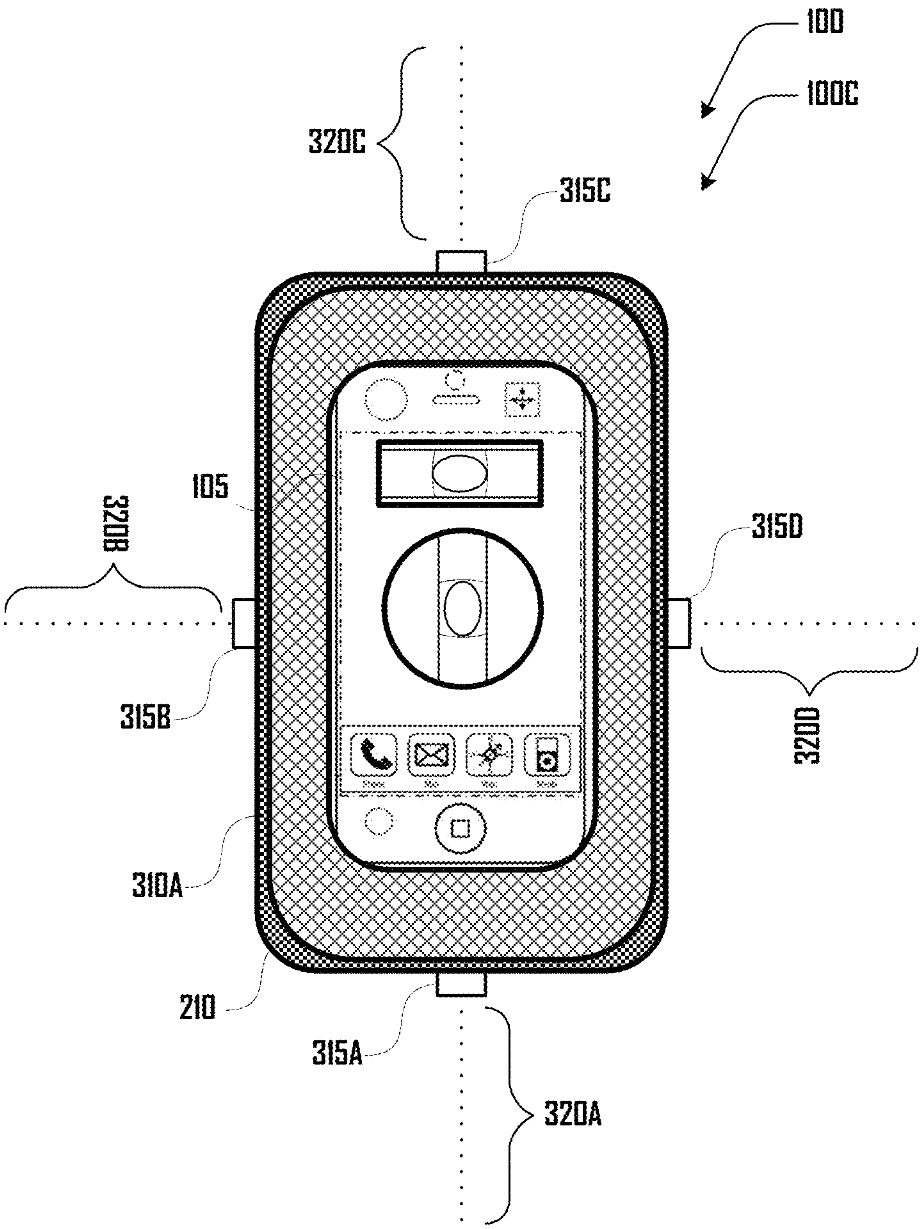
FIG. 3*a* is a top view of a leveling device assembly comprising lasers, in accordance with an embodiment.

FIG. 3*a* is a top view of a leveling device assembly 100C comprising an assembly housing 310A, which includes a plurality of lasers 315, which are positioned about the perimeter of the assembly housing 310A. For example, in various embodiments the leveling device assembly 100A, 100B may be operable to couple with the assembly housing 310A to constitute the leveling device assembly 100C.

In an embodiment, the assembly housing 310A may comprise lasers 315 aligned with an axis of the assembly housing 310A and or leveling device 105. For example, the lasers 315 may be positioned to be aligned with X and Y axes of the assembly housing 310A as shown in FIG. 3*a*. In further embodiments, there may be one or more laser 315 located in any suitable position on the assembly housing 310A.

In an embodiment, a laser 315 may be powered by a power source located in the assembly housing 310A or may be powered by a power source of the leveling device 105.

In various embodiments, a laser 315 may be operable to emit a beam 320, and may be operable to facilitate calculation of distance, heat, or other such measurements. The assembly housing 310 may include hardware and/or software capable of such functionalities, or such hardware and/or software may be present in whole or in part in the leveling device 105. Additionally, in an embodiment, a laser 315 may be configured to provide an indication by turning on and off or by changing color.

Figure 3B:
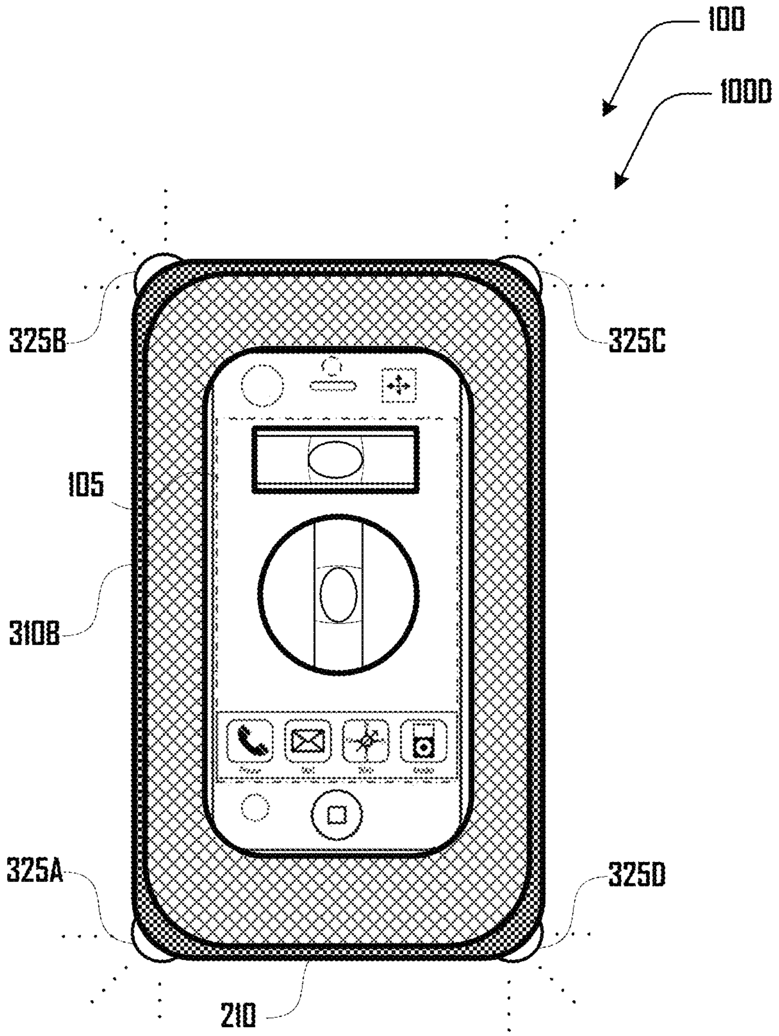
FIG. 3*b* is a top view of a leveling device assembly comprising indicator lights, in accordance with an embodiment.

FIG. 3*b* is a top view of a leveling device assembly 100D comprising an assembly housing 310B, which includes a plurality of lights 325, which are positioned about the perimeter of the assembly housing 310B. For example, in various embodiments the leveling device assembly 100A, 100B may be operable to couple with the assembly housing 310B to constitute the leveling device assembly 110D.

In an embodiment, the assembly housing 310B may comprise lights 325 aligned with an axis of the assembly housing 310B and/or leveling device 105, or aligned at the corners of the assembly housing 310B. In further embodiments, there may be one or more light 325 located in any suitable position on the assembly housing 310B.

In an embodiment, a light 325 may be powered by a power source located in the assembly housing 310B or may be powered by a power source of the leveling device 105.

In various embodiments, a light 325 may be operable to emit light 320 and may be configured to provide an indication by turning on and off or by changing color. For example, when leveling, lights on a side that are below level may be a different color than lights that are above level. Alternatively, lights may change intensity as the leveling device 105 changes to a level position.

Figure 4:
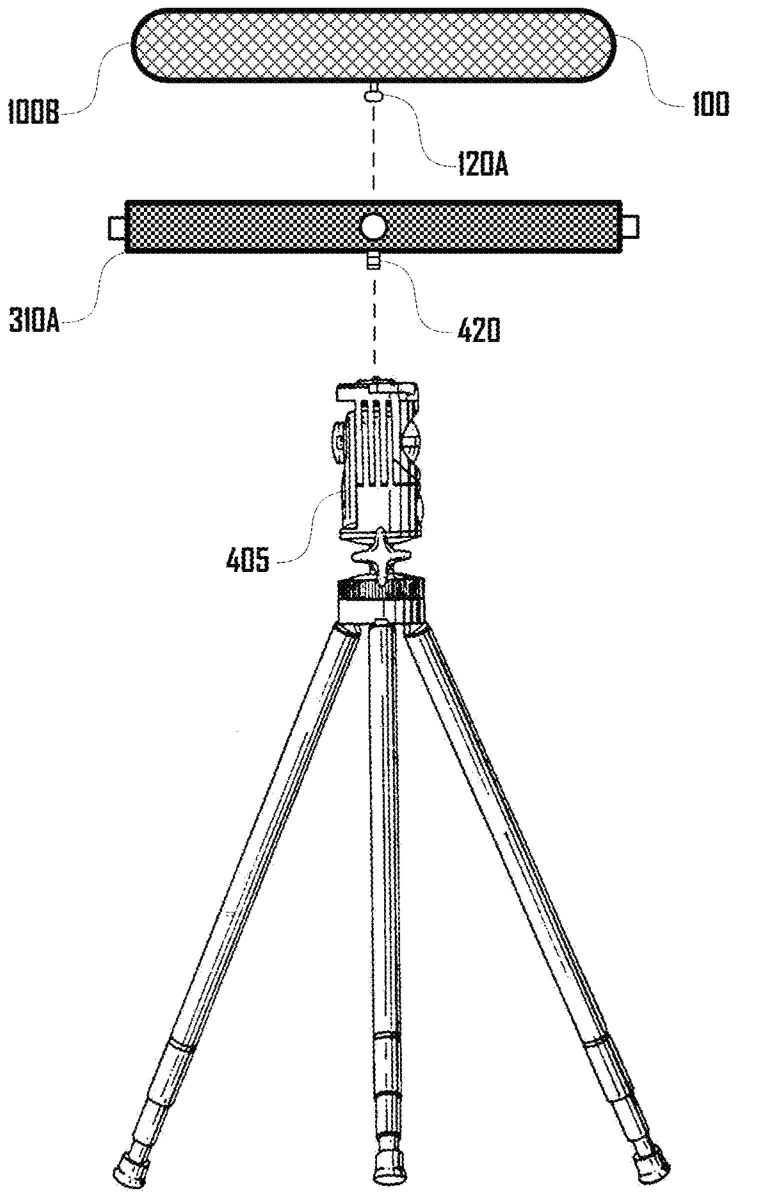
FIG. 4 is a side view of a leveling device assembly comprising a support stand, in accordance with an embodiment.

FIG. 4 is a side view of a leveling device assembly 100B coupling with an assembly housing 310A, which in turn is coupling with a support stand 405. For example, the leveling device assembly 100B of FIGS. 2*a* and 2*b* may couple with the assembly housing 310A of FIG. 3*a* via the coupling extensions 120 of the leveling device assembly 100B, and the assembly housing 310A may then couple with a support stand 405 via a coupling screw 420.

Although a coupling screw 420 and a plurality of coupling extensions 120 in depicted herein, these examples of coupling structures should not be construed to limit the scope of the numerous possible embodiments. For example, coupling between various members may be achieved by any suitable structure or structures.

In an embodiment, a support stand 405 may be a tripod as depicted in FIG. 4; however, in further embodiments, a support stand 405 may be configured in any suitable manner. For example a support stand 405 may include structures that facilitate the stand coupling to other members such as pipes, dimensional lumber, walls and the like. Such coupling structures may include straps, an adhesive, and the like.

Figure 5:
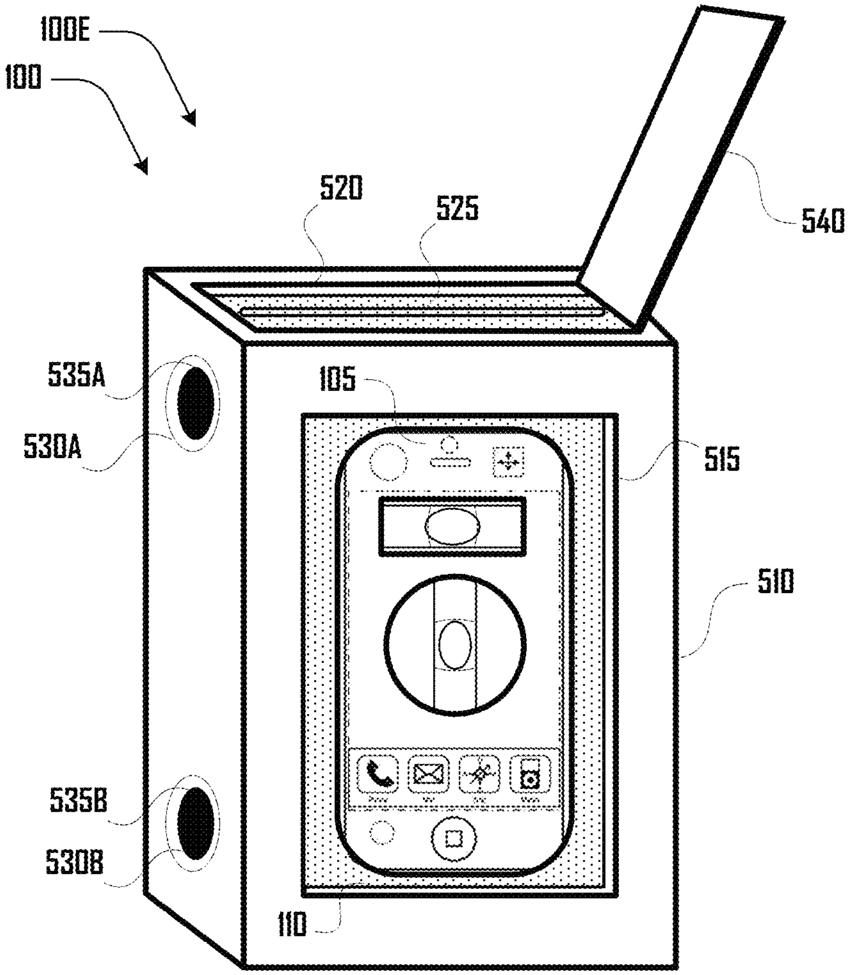
FIG. 5 is a perspective front view of a leveling device housing in accordance with an embodiment.
Figure 6:
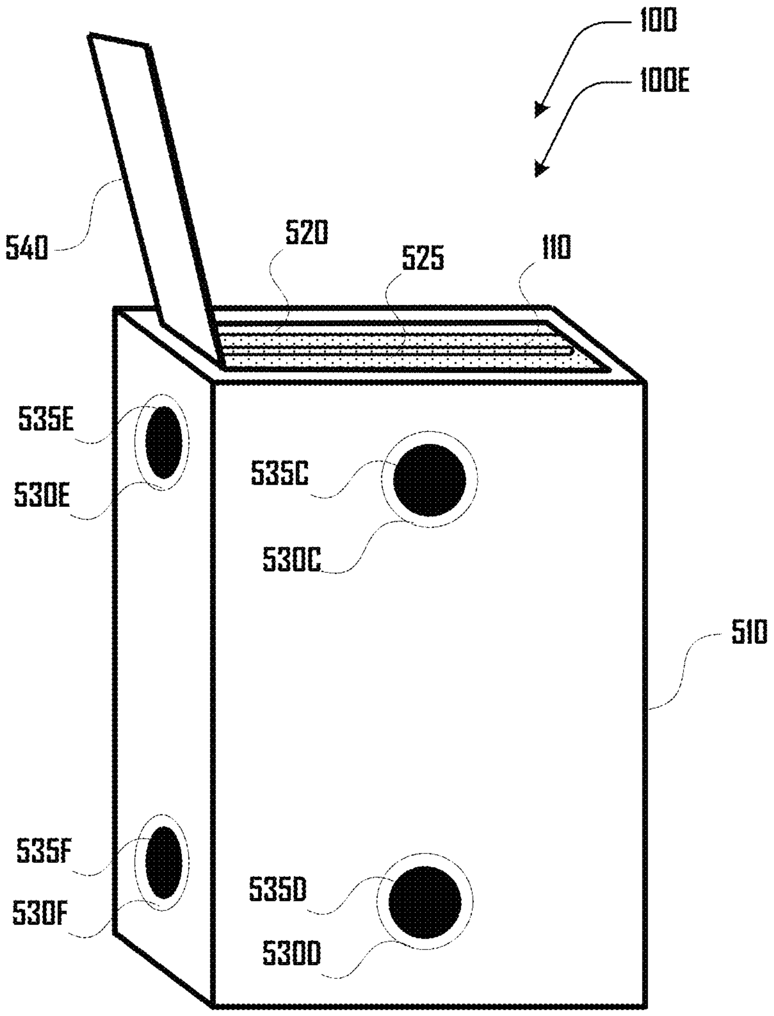
FIG. 6 is a perspective rear view of a leveling device housing in accordance with an embodiment.

FIGS. 5 and 6 show a perspective front and rear view of a leveling device assembly 110E in accordance with an embodiment, which comprises an assembly housing 510, which houses an inflatable bladder 110 and a leveling device 105. For example, in some embodiments the device assembly 100A of FIGS. 1*a* and 1*b* or a similar device assembly 100 may be housed within the assembly housing 510, which may or may not include the rigid plate 115. Alternatively, the inflatable bladder 110 may be configured for the assembly housing 510.

As depicted in FIGS. 5 and 6, the assembly housing 510 comprises a display orifice 515 on a side of the assembly housing 510, and an introduction orifice 520, which is selectively covered by a hatch 540. The display orifice 515 may be configured to allow a display portion of the leveling device 105 to be exposed. The introduction orifice 525 may be configured to allow the leveling device 105 to be introduced into the assembly housing 510 and into a cavity within inflatable bladder 110 via the bladder slit 525.

The assembly housing 510 further comprises a plurality of magnets 535, which reside within a magnet cavity 530. As depicted in FIGS. 5 and 6, magnets 535 within corresponding magnet cavities 530 may be present on various surfaces of the assembly housing 510.

In some embodiments, various components of the leveling device assembly 100E and/or leveling device 105 may be sensitive to a magnetic field generated by the plurality of magnets 535 present about the assembly housing 510. Accordingly, there may be magnetic shielding present in suitable locations to prevent a magnetic field from interfering with the operation of various components of the leveling device assembly 100E and/or leveling device 105.

In an embodiment, the inflatable bladder 110 may be selectively inflated and deflated. For example, the inflatable bladder 110 may be deflated and a leveling device 105 may be introduced into a cavity within the inflatable bladder 110 via the bladder slit 525. The inflatable bladder 110 may then be inflated so as to securely hold the leveling device 105. In some embodiments, the inflatable bladder 110 may be inflated and/or deflated via a mechanism associated with the hatch 540.

The plurality of magnets 535 may allow the leveling device assembly 100E to couple with metals and magnetic surfaces along the various surface of the leveling device assembly 100E.

Figure 7:
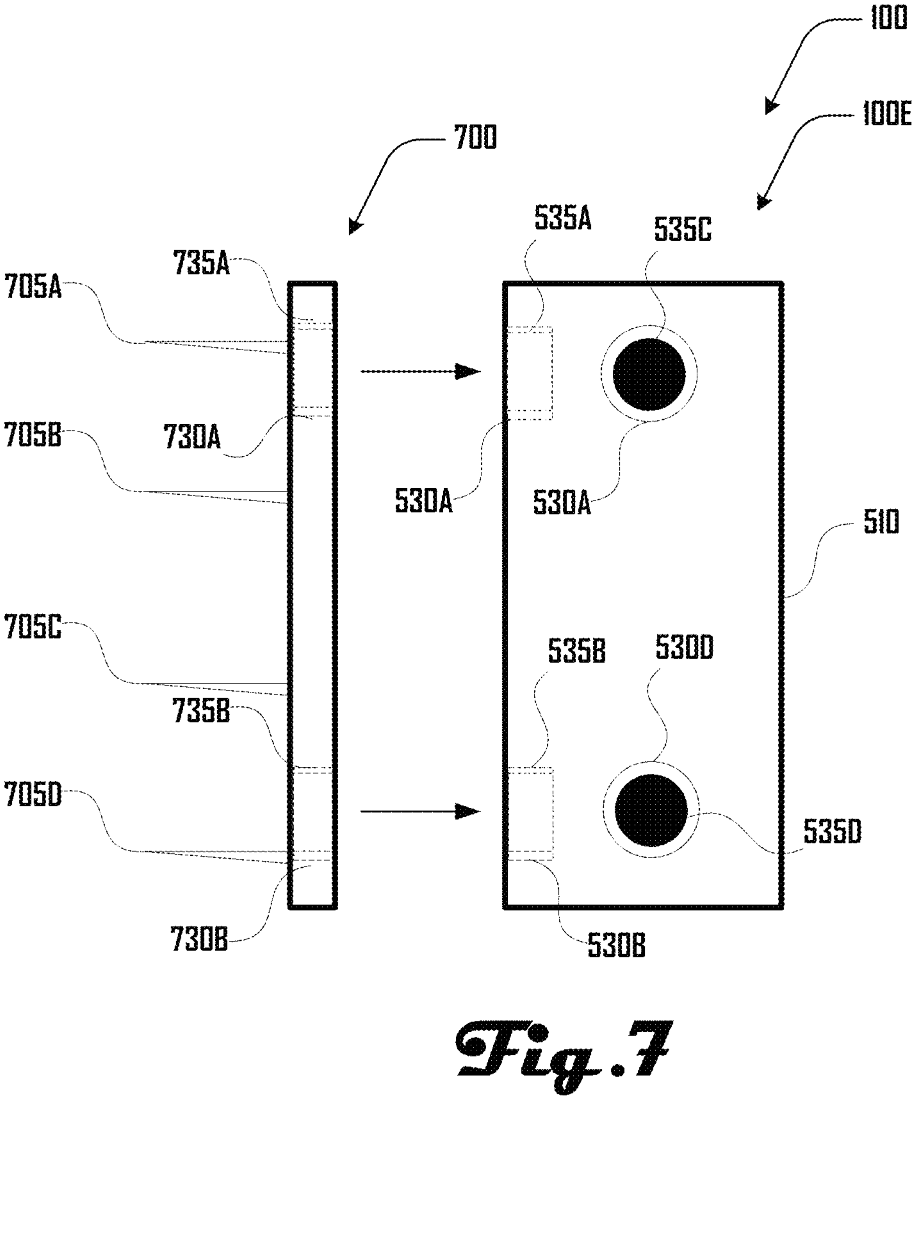
FIG. 7 is a side view of a leveling device housing and a coupling attachment in accordance with an embodiment.

Additionally, as depicted in FIG. 7, the leveling device assembly 100E may also couple with a coupling attachment 700. The coupling attachment 700 may comprise a coupling body 735 residing within a cavity 730. The coupling body may be a magnet or a material that would couple with a magnet. Additionally, the coupling bodies 735 are positioned to correspond to magnets 535 of the leveling device assembly 100E. In the exemplary coupling attachment 700 of FIG. 7, there are a plurality of nails 705 which can be used for attachment of the coupling attachment 700 to various substrates (e.g. wood, dirt, and the like). In further embodiments, a coupling attachment 700 may comprise any desirable coupling mechanism, which may include straps, an adhesive, a hook, and the like.

Additionally, although a specific configuration of magnets 535 and cavities 530 is depicted in these figures, it should be appreciated that any suitable configuration may be employed, and that the configuration of coupling bodies 735 may be similarly configured.

In an embodiment, the assembly housing 510 may further include structures such as lasers, lights and the like, which may operate as similar structures do in FIGS. 3*a* and 3*b*. Additionally, various elements as shown and described in relation to FIGS. 1*a*, 1*b*, 2*b*, 2*c*, 3*a*, 3*b*, 5, 6 and 7 may be combined, removed or otherwise selected for a leveling device assembly 100. Accordingly, FIGS. 1*a*, 1*b*, 2*b*, 2*c*, 3*a*, 3*b*, 5, 6 and 7 should be construed to merely depict various exemplary structures or components that may or may not be present in an embodiment.

As described herein, a leveling device 105 may comprise various leveling, positioning, and acceleration functionalities. For example a leveling device 105 may comprise elements such as a compass, a leveling body, a global positioning system (GPS), an accelerometer, an electronic timing device, a compass device, an azimuth-finding device, a vector detecting device, image capturing device, audio recording device, and the like. However, in some embodiments, a leveling device 105 may lack one or more of these functionalities and related functional elements, and may merely be a processor or computer.

Accordingly, in some embodiments, various portions of a leveling device assembly 100 may comprise such functional elements as described above, and suitable hardware and/or software to be operatively coupled with the leveling device 105. In some embodiments, such operable coupling may be via a port 125 and a port coupling 130, or the like.

For example in an embodiment, the leveling device 105 may be a cellular telephone that does not have elements such as a compass, a leveling body, a global positioning system (GPS), an accelerometer, and the like. However, such a leveling device 105 may be operably coupled with a leveling device assembly 100, which includes one or more of these elements, and the leveling device 105 may serve the purpose of a power source, controller, computer, processor or the like, for such elements present in the leveling device assembly 100. In some embodiments such functional elements may augment existing functional elements present in a leveling device 105.

In various embodiments, an assembly housing 510 may comprise a touch screen or display or buttons. Such a display or touch screen or buttons may augment, or replace various functionalities of a leveling device 105. For example, it may be desirable to protect the display of a leveling device 105, and a portion of the leveling device display may be covered or protected. Accordingly, a display or touch screen or buttons on an assembly housing 510 may be used to control various aspects of the leveling device 105. In some embodiments, a display or touch screen or buttons on an assembly housing 510 may facilitate less functionality than the leveling device 105 is actually capable of when not within the assembly housing 510.

In an embodiment, an assembly housing 510 may comprise a battery, which may or may not be used to power a coupled leveling device 105 or various elements of the assembly housing 510.

In an embodiment, coupling of a leveling device 105 with an assembly housing 510 may configure the leveling device 105 to function differently than when not coupled with the assembly housing 510. For example, coupling with an assembly housing 510 may cause the leveling device 105 to surrender to a mode whereby the leveling device 105 is controlled only by voice command. In another example, coupling with an assembly housing 510 may turn off a display, touch screen or other controls on the leveling device 105.

Figure 8A:
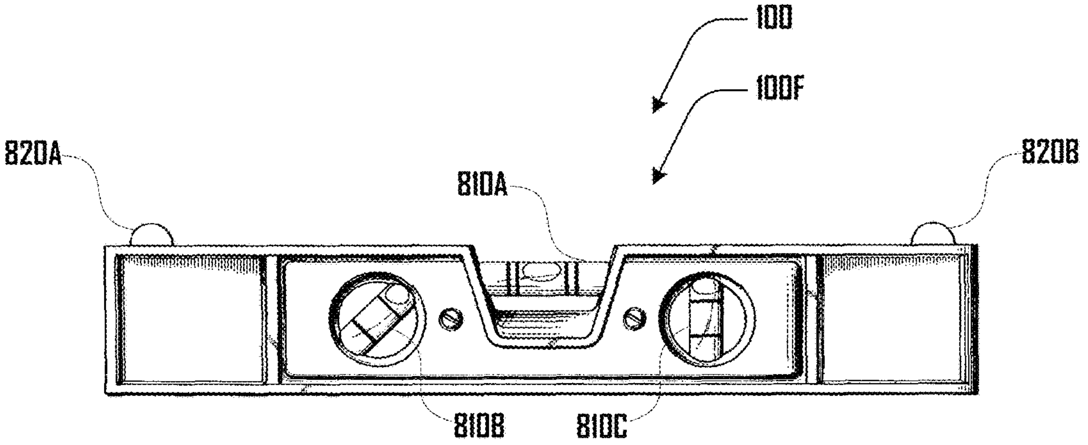
FIG. 8*a* is a side view of a level in accordance with various embodiments.
Figure 8B:
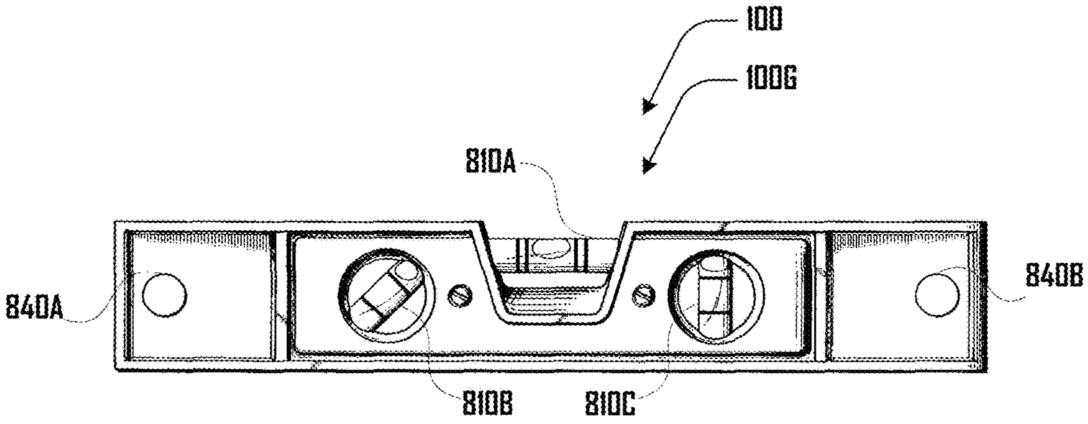
FIG. 8*b* is a side view of another level in accordance with various embodiments.
Figure 8C:
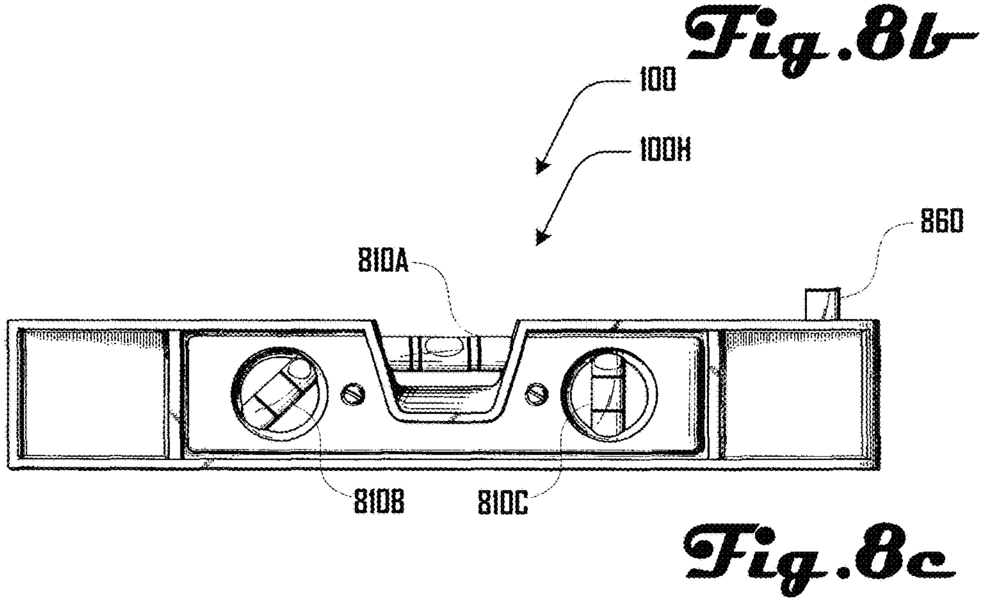
FIG. 8*c* is a side view of a further level in accordance with various embodiments.

FIGS. 8*a*, 8*b* and 8*c* depict a side view of a leveling device assembly 100F, 110G, 110H in accordance with various embodiments. The leveling device assembly 100 comprises a plurality of leveling bodies 810, and in some embodiments, the leveling device assembly 100 may comprise one or more leveling light 820A, 820B, one or more speaker 840A, 840B, and an antenna 860.

While FIGS. 8*a*, 8*b* and 8*c* depict an approximately rectangular leveling device assembly 100, a leveling device assembly 100 in accordance with various embodiments may be various shapes and sizes. Additionally, in some embodiments, a leveling body 810 may comprise a liquid filled tube with a gas bubble as shown in FIGS. 8*a*, 8*b* and 8*c*; however, a leveling body 810 may be various types of devices that facilitate leveling.

In various embodiments, a leveling device assembly 100 may provide an indication of whether it is level, or if one or more leveling body 810 of the leveling device assembly 100 is level. For example, as shown in FIG. 8*a*, there may be one or more leveling light 820 that indicates whether the leveling device assembly 100F is level, a direction that the leveling device assembly 100F would need to move or rotate to achieve a level position, and the like. In one example, a leveling light 820 may blink on a side that needs to be moved down to achieve a level position. In another example, both leveling lights 820A, 820B may be lit when the leveling device assembly 100F is level.

In further embodiments, there may be various numbers of leveling lights 820 in various positions about a leveling device assembly 100, and leveling lights 820 may be various sizes and shapes. For example, a leveling light 820 may be shaped as an arrow. In still further embodiments, a leveling light 820 may comprise a laser, and the like.

Additionally, in some embodiments, level status may be presented via one or more speaker 840. For example, a speaker 840 may present level status so as to instruct a user on how to achieve a level position. For example, in some embodiments, a speaker 840 may present instructions such as: "right side down";"left side up";"level achieved"; and the like. In another example, various types of non-lingual audio indications may indicate to a user how to position the leveling device assembly 100G such that a level position is achieved.

In further embodiments, visual indicators (such as a leveling light 820, and the like) or audio indications (via a speaker 840, and the like) may present position status. For example, a user may indicate or input a desired position of a leveling device assembly 100, and the leveling device assembly 100 may provide indications of how to move the leveling device assembly 100 to achieve the desired position. Desired position may include characteristics such as Global Positioning System ("GPS") coordinates, a compass direction, a height, a distance from a selected point, and the like.

Accordingly, in such embodiments, an audio indication may be presented via a speaker 840, which may include indications such as: "rotate clockwise"; "move two feet to the right"; "move two feet east"; "move down one foot"; right side up", and the like. In some embodiments, such indications may be non-lingual or visual.

Figure 22A:
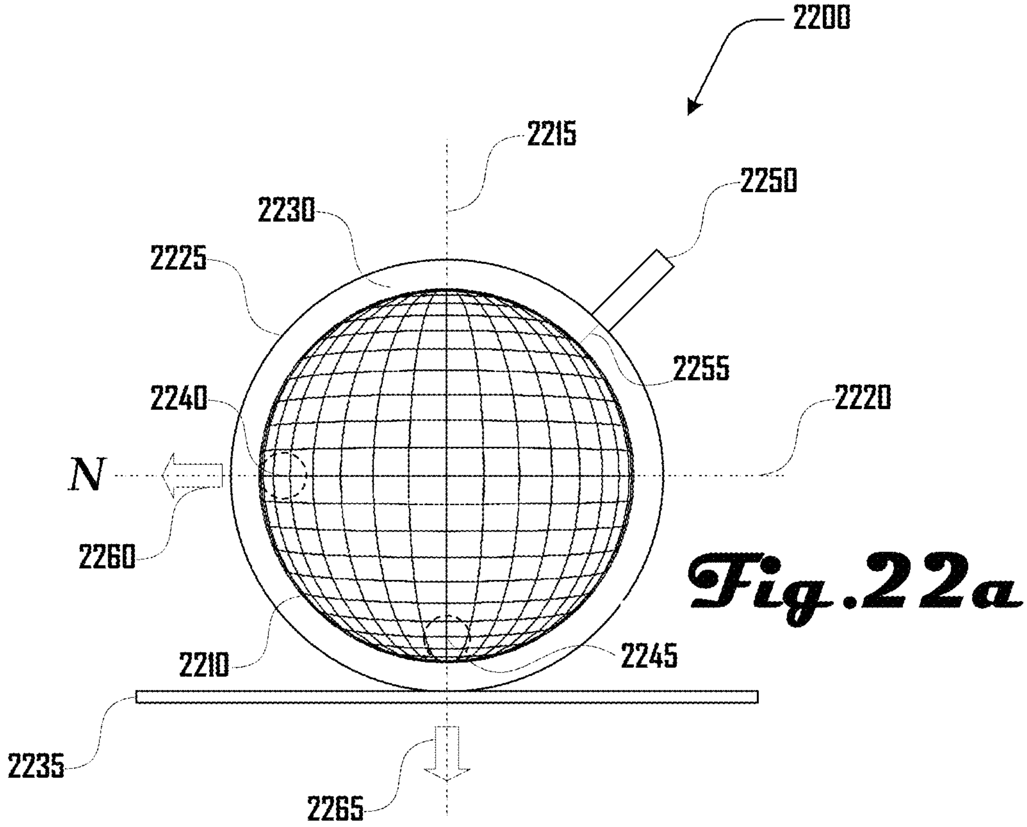
FIGS. 22*a* and 22*b* show a side view of a positioning sphere in accordance with various embodiments.

Additionally, FIGS. 8*a*, 8*b*, and 8*c* depict a liquid and bubble leveling body 810, and in some embodiments, various indications of level status or position status may be based on data from one or more of said liquid and bubble leveling bodies 810. However, in various embodiments, another type of leveling body 810 may provide data regarding level status, and a leveling body 810 may not be visible to a user. In various embodiments, leveling status data and/or positioning data may be obtained from a positioning unit 1245, and in some embodiments, positioning status data may include leveling status data. In some embodiments, the leveling body 810 may be a positioning sphere 2200 as depicted in FIGS. 22*a* and 2*b*.

Figure 23A:
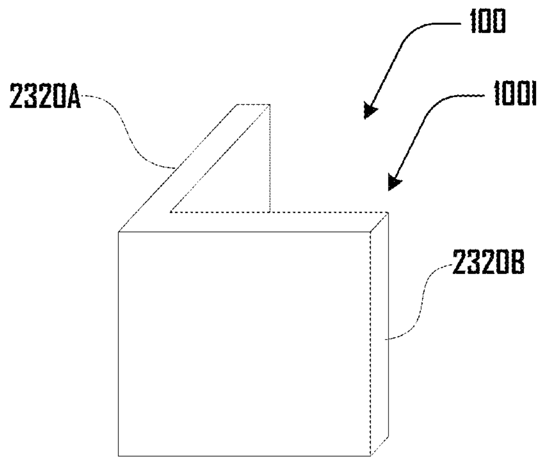
FIGS. 23*a* and 23*b* show a perspective view of a level in accordance with various embodiments and FIG. 23*c* illustrates a leveling device assembly having at least one cavity defined by a housing and a leveling device disposed within the housing.
Figure 23B:
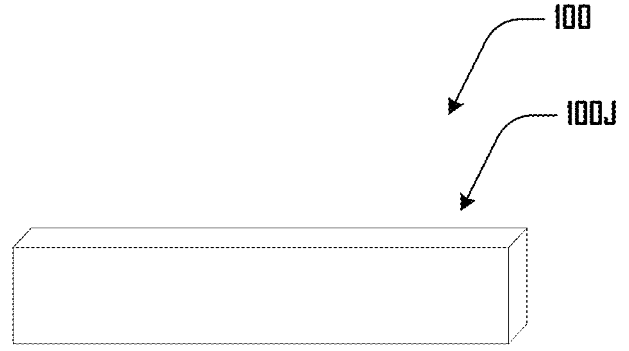
Figure 23C:
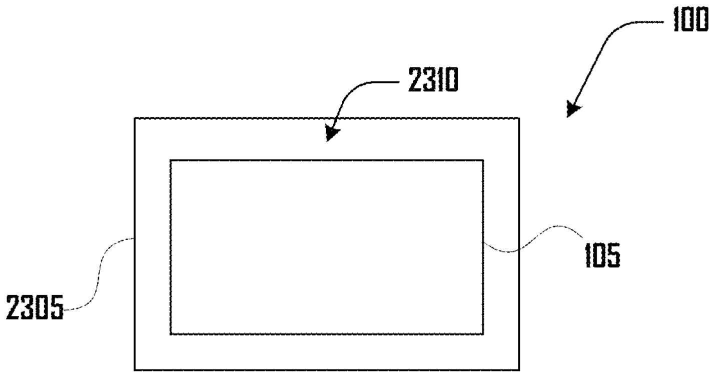

Additionally, the leveling device assembly 100 may be various shapes and sizes. For example, FIGS. 23*a* and 23*b* depict a leveling device assembly 100 in accordance with various embodiments. For example, FIG. 23*a* depicts a leveling device assembly 1001 comprising a pair of rectangular bodies 2320, which meet at an edge. As shown in FIG. 23*a*, the rectangular bodies 2320 may be coupled at a right angle, but may be joined at other angles in further embodiments. Additionally, FIG. 23*b* depicts a leveling device assembly 100J shaped as an elongated rectangular body. FIG. 23*c* illustrates a leveling device assembly 100 comprising a housing 2305 that defines a device cavity 2310 and a leveling device 105 disposed within the device cavity 2310.

FIG. 8*c* depicts a leveling device assembly 100H comprising an antenna 860, and said antenna 860, in various embodiments, may communicate with various devices such as an admin device 1110, an audio device 1020, a user device 1130, and the like, which may be achieved via a network 1040, and the like. For example, the antenna 860 may communicate to various devices position status data, leveling data, indications relating to how to achieve a desired leveling position or position, and the like. Such exemplary communications are further described herein.

In further embodiments, the leveling device assembly 100 may comprise a display 440 and an input device such as a keyboard or keypad, which may enable a user to define a leveling goal, define a positioning goal, define danger zone parameters, calibrate one or more component of the leveling device assembly 100, view and edit leveling data, view and edit positioning data, and the like.

Figure 9:
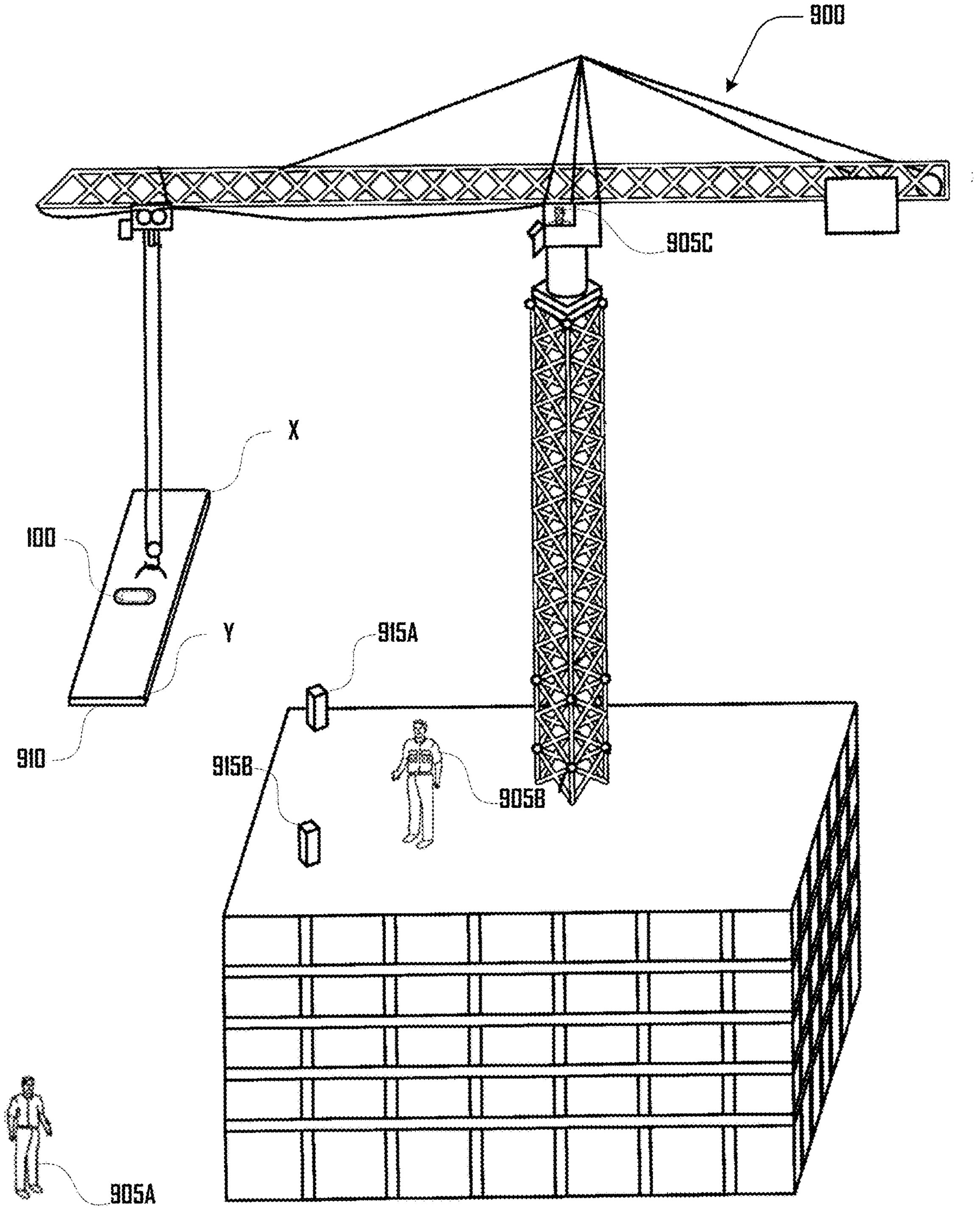
FIG. 9 is an environmental view of a leveling device being used in conjunction with a crane and a plurality of operators.

FIG. 9 is an environmental view of a leveling device assembly 100 being used in conjunction with a crane 900 and a plurality of operators 905. The operators 905 are depicted positioning a beam 910 onto a pair of posts 915, where a leveling device assembly 100 is positioned on the beam 910. In such an example, and as further described herein, the leveling device assembly 100 may perform various functions to assist in work-tasks and to promote safety of the operators 905, crane 900 and building materials.

For example, in an embodiment, the leveling device assembly 100 may be operable to provide leveling and/or positioning indications to the operations visually and/or audibly. As described herein, the leveling device assembly 100 may include lights, lasers, or speakers, which provide visual or audio indications of positioning and/or level status.

In another example, the operators 905 may each have an audio device 1020 such as a headset (FIGS. 10-18), which are operably connected to the leveling device assembly 100 and allow the operators to receive audio indications of leveling and/or positioning status. Additionally, the leveling device assembly 100 may be operable to provide warning to the operators when safety hazards are present. Such safety hazards may include a beam 910 wildly swinging out of level or otherwise out of desired position, a hazard may include the position of moving items being dangerously close to an operator 905, and the like.

In a further embodiment, operators 905 may be able to receive personalized indications of leveling and/or positioning status. For example, presuming that the beam 910 has a first and second end X and Y, the identity of each end X and Y will be different in terms of left and right based on the perspective of the operator. The crane operator 905C and the operator 905B near the crane 900 will perceive the X end as right, and the Y end as left. However, the ground operator 905A will perceive the Y end as right, and the X end as left. Accordingly, the leveling device assembly 100 may be operable to provide leveling or positioning indications which can be customized to the perspective and position of various operators 905.

Figure 10:
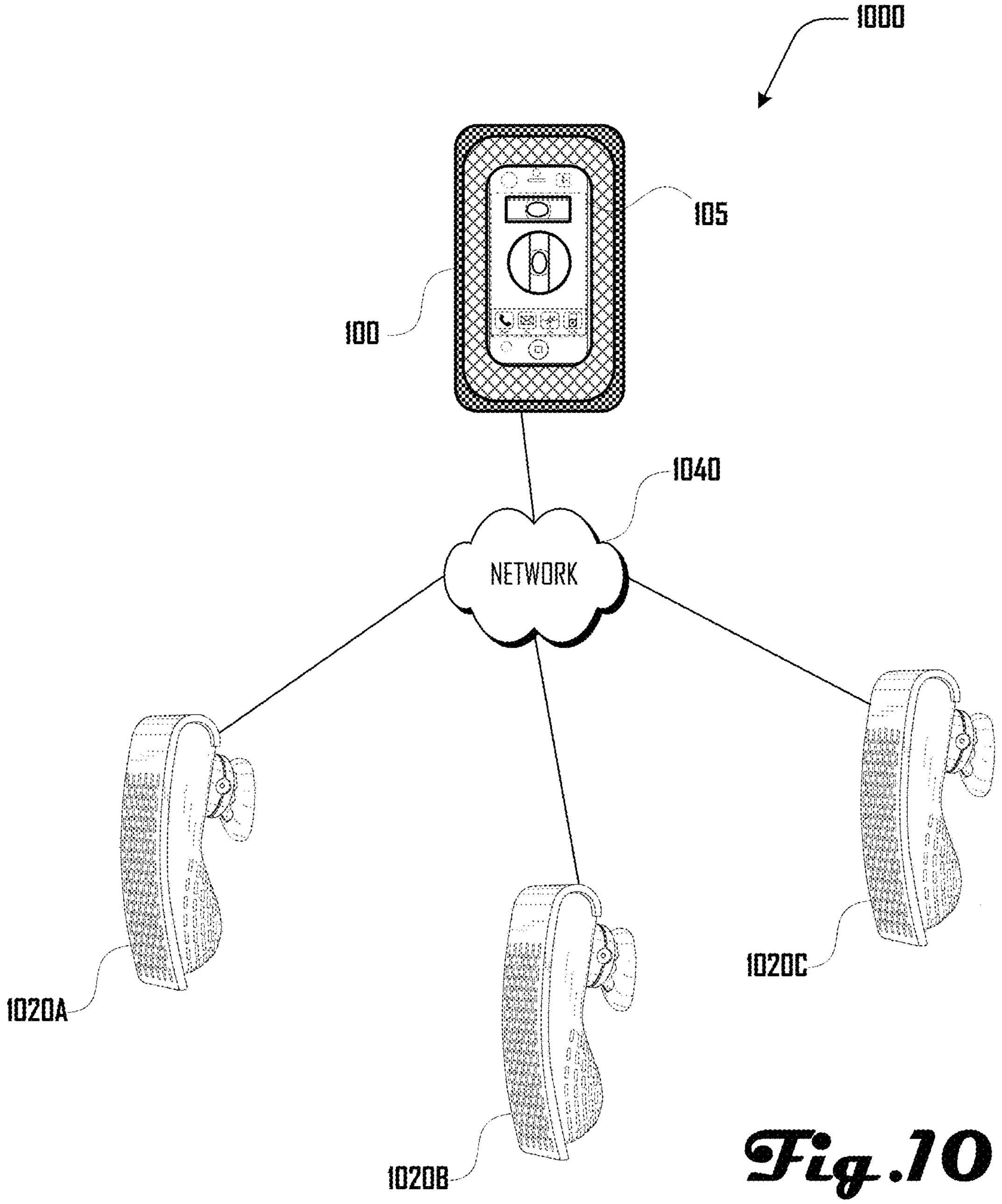
FIG. 10 is a pictorial diagram of a system of interconnected devices, in accordance with various embodiments, which includes a plurality of audio devices operably connected to a leveling device.

FIG. 10 is a pictorial diagram of a system 1000 of interconnected devices, in accordance with various embodiments. The system 1000 comprises a leveling device assembly 100 and a plurality of audio devices 1020A, 1020B, and 1020C, which are operably connected via a network 1040. In various embodiments, the network 1040 may be a wireless network, and the leveling device assembly 100 may be connected to the network 1040 via an antenna 860 (FIG. 8*c*) or via a wireless network interface, which may be present in a portion of the leveling device assembly 100 and/or the leveling device 105.

As described herein, the leveling device assembly 100 may communicate position status data, leveling data, indications relating to how to achieve a desired leveling position or position, and the like. Such communications may be obtained by an audio device 1020, which may present such data or indications in various forms. In some embodiments, an indication relating to how to achieve a desired leveling state or position may be presented in relation to the location of the audio device 1020.

For example, if an audio device 1020 is on a front side of a leveling device assembly 100, (i.e. a user is in front of the leveling device assembly 100) an indication of "move right side down" may be relevant to an observer in obtaining a level position for the leveling device assembly 100. However, if the audio device 1020 is behind the leveling device assembly 100 in the same situation, then an indication of "move left side down" may be relevant to an observer in obtaining a level position for the leveling device assembly 100.

In such examples, there may be a plurality of audio devices 1020 and indications may be modified for each audio device 1020 based on the location of a given audio device 1020. In some embodiments, the leveling device assembly 100 or audio device 1020 may modify such indications based on obtained audio device location data and level location data.

Audio devices 1020 may be various devices in accordance with some embodiments. For example, a Bluetooth headset, a radio, a cellular telephone, a personal data assistant, and the like may function as an audio device 1020. In various embodiments, an audio device 1020 may be any device capable of producing an audio presentation.

Figure 11:
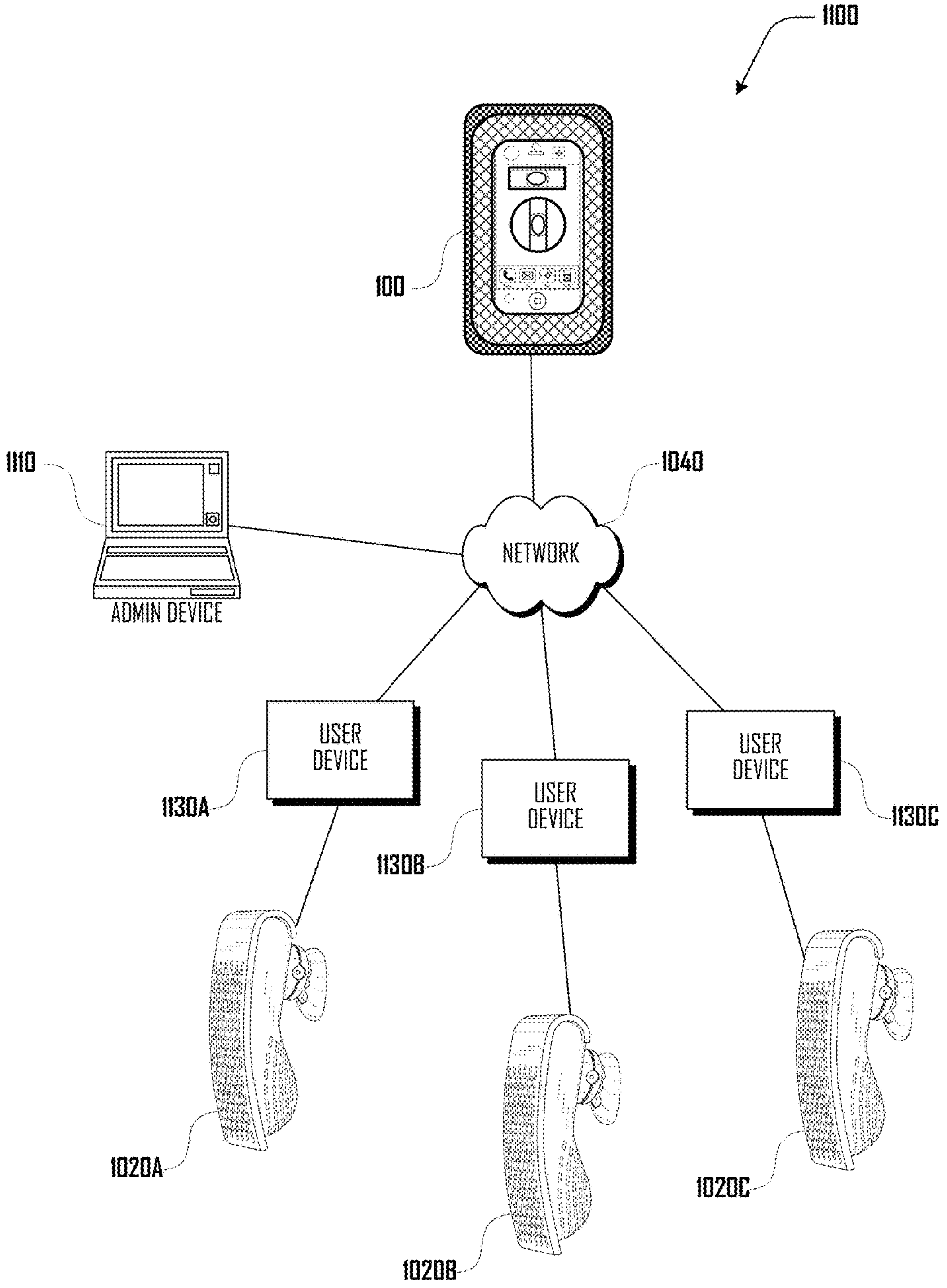
FIG. 11 is a pictorial diagram of another system of interconnected devices, in accordance with various embodiments which includes a plurality of audio devices operably connected to a respective user device that is operably connected to an admin device and a leveling device.

FIG. 11 is a pictorial diagram of another system 1100 of interconnected devices, in accordance with various embodiments, which comprises a plurality of user devices 1130, an admin device 1110 and a leveling device assembly 100, which are all operably connected via a network 1040. Additionally, each user device 1130 is operably connected to an audio device 1020.

As discussed in relation to FIG. 10, various devices may be operably connected via a wireless network 1040, and may be connected in various other ways. In some embodiments, a user device 1130 and audio device 1020 may be embodied together in a helmet, an earpiece, a cellular telephone, a personal data assistant, and the like. Additionally, as discussed above, a determination may be made regarding location of any of an admin device 1110, user device 1130, and audio device 1020, and indications relating to how to achieve a desired leveling status or position, and the like, may be modified or customized based on such a determined location of various devices.

In further embodiments, a determination of a danger zone may be made in relation to objects associated with a leveling device assembly 100, which may include objects being leveled or positioned by the leveling device assembly 100. For example, a danger zone may be defined as an area where an object would fall if it were to be released from a coupling, lose balance, fall down a slope, explode, and the like.

In such embodiments, a danger zone may be determined for an object associated with a leveling device assembly 100, and a further determination may be made whether a given device is located within the defined danger zone. Where a user device 1130 is located in a defined danger zone, an alert may be presented via an audio device 1020, a leveling light 325 or laser 315 (FIG. 3), a speaker, and the like. In some embodiments, such an alert can be provided to a plurality of user devices 1130, wherein some are within the danger zone or such an alert may only be provided to user devices 1130 within the danger zone.

In various embodiments, the admin device 1110 may record a leveling or positioning session, which may include data regarding level position, leveling status, danger zone, position of one or more user device 1130, position of one or more audio device 1020, position of an admin device 1110, and the like. In other embodiments, such data may be recorded by any of a leveling device assembly 100, an admin device 1110, a user device 1130, an audio device 1020, and the like. In further embodiments, and admin device 1110 may obtain an alert, position data, level-status data, define a leveling goal, define a positioning goal, define danger zone parameters, and the like.

In various embodiments, wherein indications relating to achieving a desired leveling status or position are obtained wirelessly, via an audio presentation, or via a visual presentation, such embodiments may be desirable because a leveling device assembly 100 may not be immediately visible to one or more users because of where the leveling device assembly 100 is position on an objected being leveled or positioned.

For example, a user of a leveling device assembly 100, having only a liquid and bubble leveling body 110, may not be able to view such a relatively small indicator when leveling a post with a tractor or backhoe. In such an example, it may be desirable to obtain indications of position and level status which can be perceived from a distance or that can be perceived in noisy environments. Here, it may be desirable for the user to be able to view or hear such indications while driving the tractor or backhoe.

In various embodiments, there may be a plurality of level device assemblies 100 connected via a network 1040, which may each communicate data regarding position status or level status to each other, to a master leveling device assembly 100, to an admin device 1110, to a user device 1130, an audio device 1020, and the like. In such embodiments, there may be more than one leveling and/or positioning goal, and indications may be given to facilitate each leveling device assembly 100 in reaching its leveling and/or positioning goal.

Figure 12:
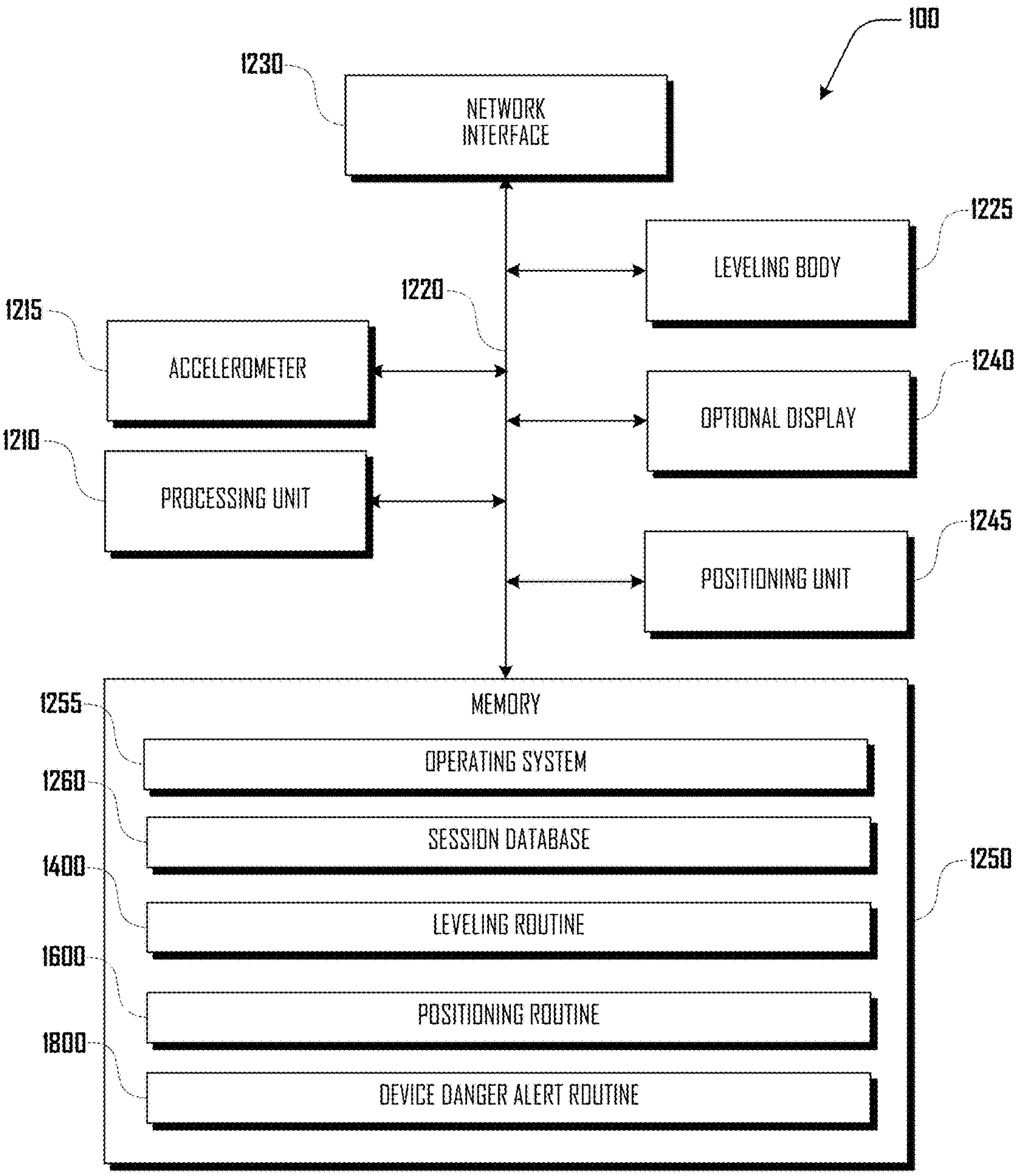
FIG. 12 is a block diagram of a device that provides an exemplary operating environment for various embodiments.

FIG. 12 illustrates several components of an exemplary operating environment 1200 for an embodiment. For example, a leveling device assembly 100 can be embodied in the operating environment 1200 depicted in FIG. 12. Such components may be embodied in whole or in part in a leveling device 105 or may be embodied in whole or in part in other portions of a leveling device assembly. Those of ordinary skill in the art and others will appreciate that the operating environment 1200 may include many more components than those shown in FIG. 12. However, it is not necessary that all of these generally conventional components be shown in order to disclose an enabling embodiment for practicing the embodiments described herein.

As shown in FIG. 12, the operating environment 1200 includes a network interface 1230 for connecting to remote devices (not shown). The network interface 1230 may be a network interface designed to support a local area network ("LAN"), wireless local area network ("WLAN"), personal area network ("PAN"), Worldwide Interoperability for Microwave Access ("WiMax"), telephone network, pager network, powerline connection, serial bus, universal serial bus ("USB") wireless connection, antenna 860, or the like. The network interface 1230 includes the necessary circuitry, driver and/or transceiver for such a connection and is constructed for use with the appropriate protocols for such a connection.

The operating environment 1200 also includes a processing unit 1210, an optional display 1240, an accelerometer 1215, a leveling body 1225, a positioning body 1245, and a memory 1250, all interconnected along with the network interface 1230 via a bus 1220. Those of ordinary skill in the art and others will appreciate that the optional display 1240 may not be necessary in all forms of computing devices and, accordingly, is an optional component.

The memory 1250 may generally comprise random access memory ("RAM"), a read only memory ("ROM") and a permanent mass storage device, such as a disk drive, flash RAM, or the like. The memory 1250 stores the program code necessary for a leveling routine 1400, a positioning routine 1600 and a device danger alert routine 1800. Additionally, the memory 1250 stores an operating system 1255 and a session database 1260. In some embodiments, the memory 1250 or elements stored therein may reside on an admin device 1110, user device 1130, audio device 1020 or leveling device assembly 100.

It will be appreciated that the software components may be loaded from a computer readable medium into memory 1250 of the operating environment 1200 using a drive mechanism (not shown) or network mechanism (not shown) associated with the computer readable medium, such as a floppy, tape, digital video disc (DVD)/CD-ROM drive, flash RAM, network interface card, or the like.

Although an exemplary operating environment 1200 has been described that generally conforms to a conventional general-purpose computing device, those of ordinary skill in the art will appreciate that a operating environment 1200 may be any of a great number of devices capable of functioning as a device, server or operating environment that is within the spirit or scope of the embodiments described herein or can perform at least one function of the embodiments described herein.

In one exemplary embodiment, an admin device 1110, a user device 1130 or an audio device 1020 can configure or interact with the operating environment 1200 using a graphical user interface. An example of a graphical user interface is an interactive web page, e.g., in HTML (HyperText Markup Language), Flash, JavaScript, VBScript, JScript, ASP.NET, PHP (HTML Preprocessor) or XHTML (eXtensible HyperText Markup Language) form, or the like. Resultantly, since users are generally familiar with the user interfaces of web pages, including sophisticated web pages such as Flash-enabled web pages from Macromedia, Incorporated of San Francisco, Calif., consumption of peer to peer device services using a web page based graphical user interface on a peer to operating environment 1200 (e.g., displayed on the peer to peer display 1240) may be made familiar and user friendly.

In various embodiments, a leveling body 110 may comprise various devices operable to determine or calculate the level status of an object, which may include a spirit or bubble level (i.e. a liquid and bubble leveling apparatus) an inclinometer, tilt sensor, and the like. In further embodiments, the positioning unit 1245 may comprise a leveling body 110, a GPS device, a compass, SkyHook Wireless enabled device, cellular triangulating device, and the like.

Figure 13:
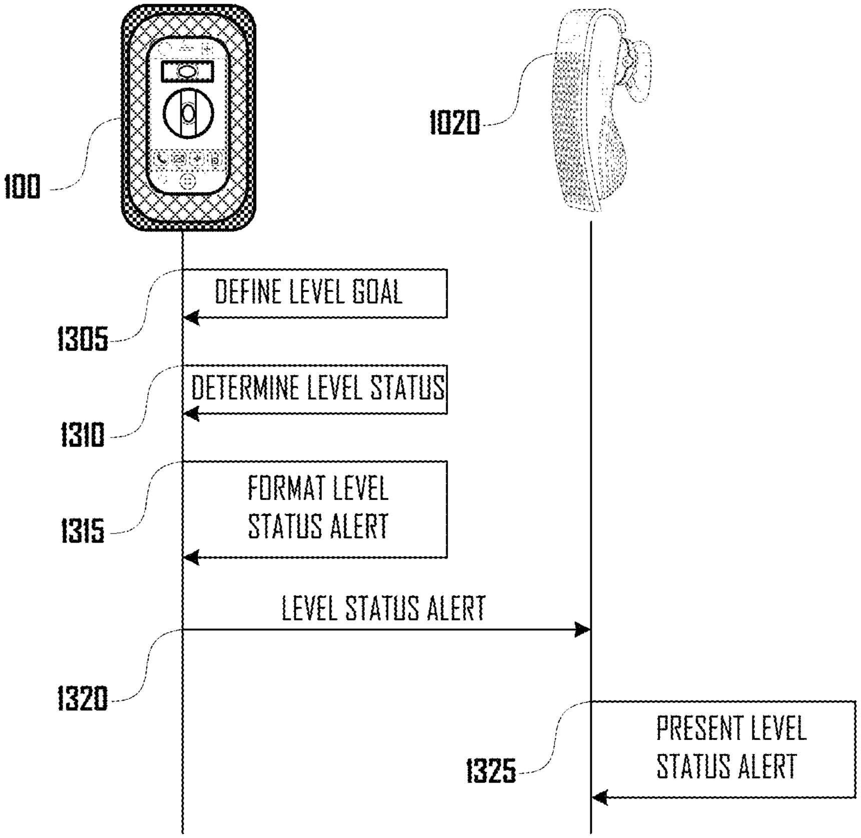
FIG. 13 is a diagram illustrating the actions taken by a leveling device and an audio device in accordance with various embodiments.

FIG. 13 is a diagram illustrating the actions taken by a leveling device 100 and an audio device 1020 in accordance with various embodiments. The actions begin where a level goal is defined 1305. In some embodiments, a default leveling goal may be true level, whereas other leveling goals in relation to true level may be defined 1305.

Level status is determined 1310, and a level status alert is formatted 1315 and the level status alert is sent 1320 to the audio device 1020, where the level status alert is presented 1325. For example, a presented 1325 status alert may be "rotate clockwise ten degrees"; "move right side down"; "level goal achieved"; and the like. In further embodiments, level status alert may be formatted 1315 based on a determined location of an audio device 1020 or other device.

Figure 14:
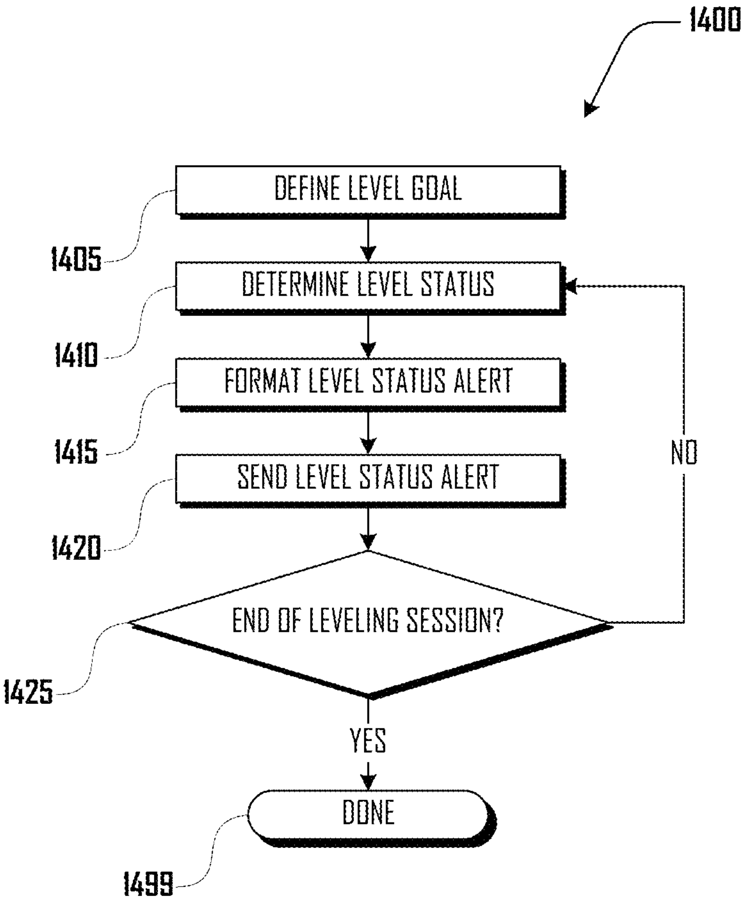
FIG. 14 is a flow diagram illustrating a leveling routine in accordance with various embodiments.

FIG. 14 is a flow diagram illustrating a leveling routine 1400 in accordance with various embodiments. The leveling routine 1400 begins in block 1405 where a level goal is defined, which may be defined via an input on the leveling device assembly 100, or remotely via a user device 1130 or admin device 1110. In further embodiments, a default level goal may be automatically defined as true level.

In block 1410, a level status is determined, which may include degrees or percentage off from level, and the like. In block 1415 a level status alert is formatted and in block 1420 a level status alert is sent 1420. A level status alert may be sent to another device, to a leveling light 120, a speaker 140, and the like.

In decision block 1425 a determination is made whether the leveling session has ended, and if the leveling session has ended the leveling routine 1400 ends in block 1499. However, if the leveling session is not ended, then the leveling routine 1400 cycles back to block 1410, where level status is again determined.

Figure 15:
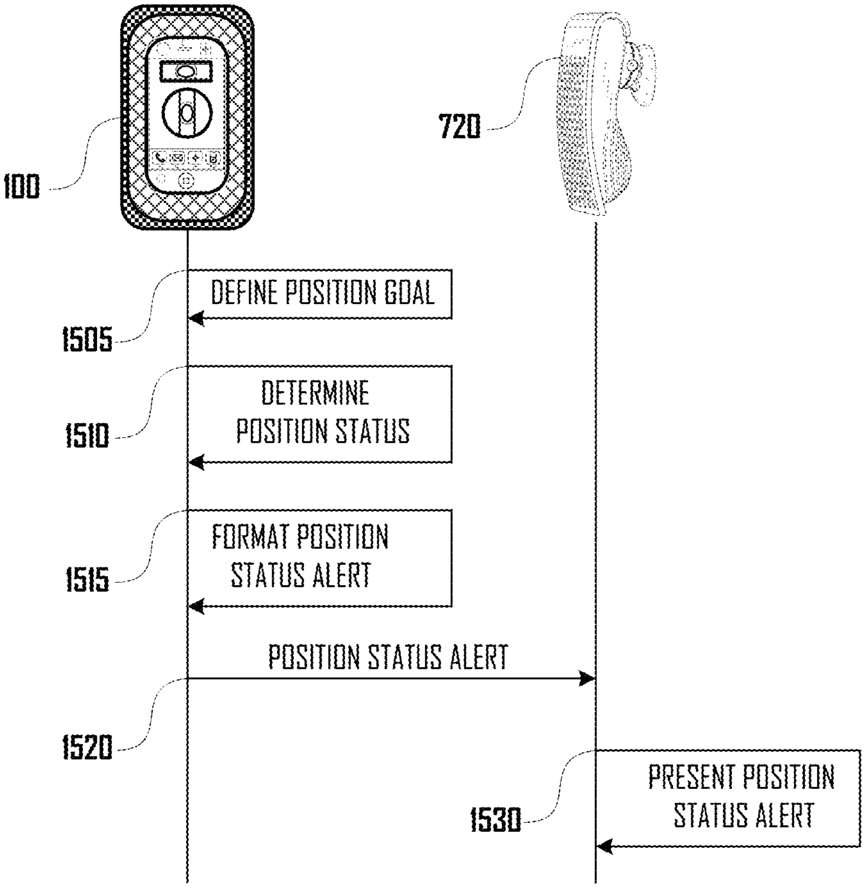
FIG. 15 is a diagram illustrating the actions taken by a leveling device and an audio device in accordance with various embodiments.

FIG. 15 is a diagram illustrating the actions taken by a leveling device 100 and an audio device 1020 in accordance with various embodiments. The actions begin where a goal position is defined 1505, and then position status is determined 1510, a position status alert is formatted 1515 and the position status alert is sent 1520 to the audio device 1020 where the position status alert is presented 1530.

In some embodiments a positioning goal may comprise a compass direction or GPS coordinate or be in relation thereto, and may be defined by an input device on the leveling device assembly 100 or be defined by a user device 1130 or an admin device 1110. Additionally, in various embodiments, the position alert may be formatted 1515 based on an obtained location or position of a user device 1130, admin device 1110, or audio device 1020.

Figure 16:
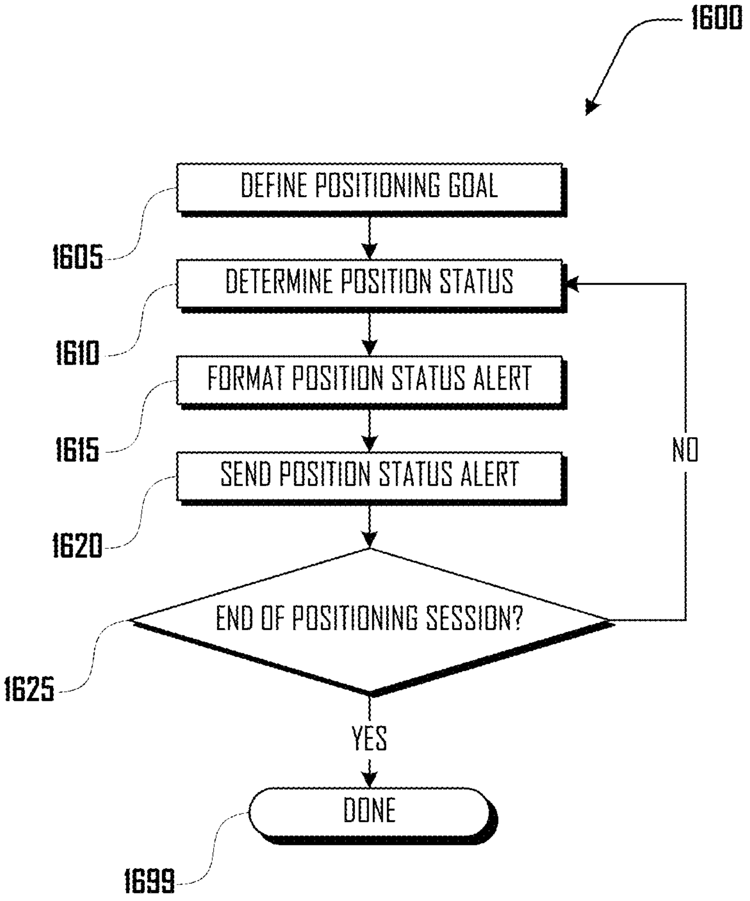
FIG. 16 is a flow diagram illustrating a positioning routine in accordance with various embodiments.

FIG. 16 is a flow diagram illustrating a positioning routine 1600 in accordance with various embodiments. The positioning routine 1600 begins in block 1605 where a positioning goal is defined, which may be defined via an input on the leveling device assembly 100, or remotely via a user device 1130 or admin device 1110. In further embodiments, a default positioning goal may be automatically defined as true level or to comprise true level.

In block 1610, a position status is determined, which may include degrees or percentage off from level, a GPS coordinate, a distance, and the like. In block 1615 a position status alert is formatted and in block 1620 a position status alert is sent 1620. A position status alert may be sent to another device, to a leveling light 120, a speaker 140, and the like.

In decision block 1625 a determination is made whether the positioning session has ended, and if the positioning session has ended the positioning routine 1600 ends in block 1699. However, if the positioning session is not ended, then the positioning routine 1600 cycles back to block 1610, where position status is again determined. In various embodiments, a positioning session may end when indicated by a user.

Figure 17:
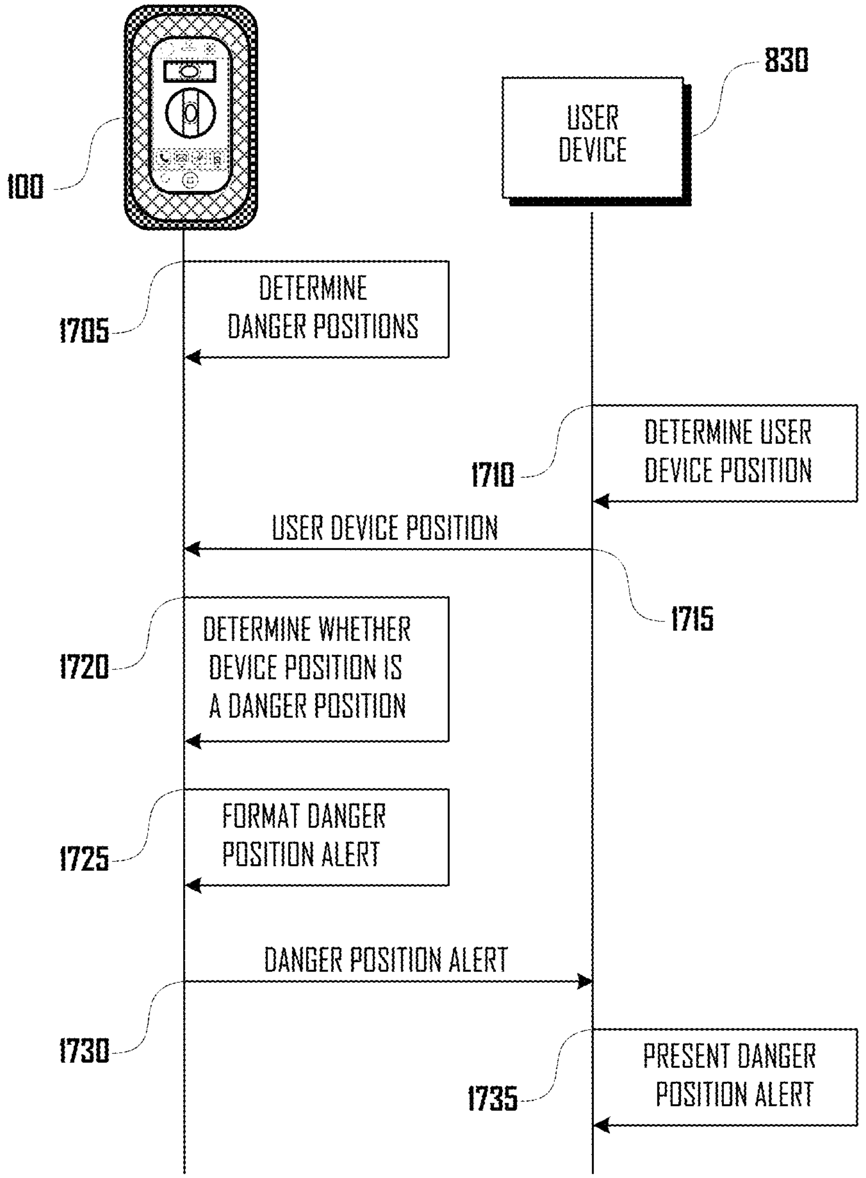
FIG. 17 is a diagram illustrating the actions taken by a leveling device and a user device in accordance with various embodiments.

FIG. 17 is a diagram illustrating the actions taken by a leveling device 100 and a user device 1130 in accordance with various embodiments. The actions begin where danger positions are determined 1705. A leveling device assembly 100 may be associated with various objects and such objects may have characteristics that make them dangerous, such as explosive, crushing, corrosive, and like properties. For example, a large sculpture being installed may need to be leveled, but may create a risk for users leveling and installing the sculpture, because it may fall and crush such a user. Accordingly, in such a situation, a danger zone may be defined as a radius or area around the sculpture, which may take into account center of gravity, height, weight, and the like. Such a defining may be automated or may be defined by a user.

Returning to the actions, the user device 1130 determines 1710 the position of the user device 1130, and the user device position is sent 1715 to the leveling device assembly 100, where a determination 1720 is made whether the device position is equal to a danger position or whether the device position is within a danger zone or area. A danger position alert is formatted 1725 and sent 1730 to the user device 1130, where the danger position alert is presented 1735.

In various embodiments, there may be a plurality of user devices 1130 and each user device 1130 may be sent 1730 the same danger position alert or a danger position alert may be custom formatted 1725 and sent 1730 each user device 1130 based on user device location and identity. For example, if a first user device 1130A is in a danger zone, the first user device 1130A may be sent 1730 a danger position alert such as "User Device A, you are in a danger zone!"; however, a second user device 11306 may not be sent 1730 a danger position alert or may be sent a danger position alert such as "Use device A is in a danger zone!" Accordingly, devices may be alerted to their own danger, to the danger of other devices, and the like.

Figure 18:
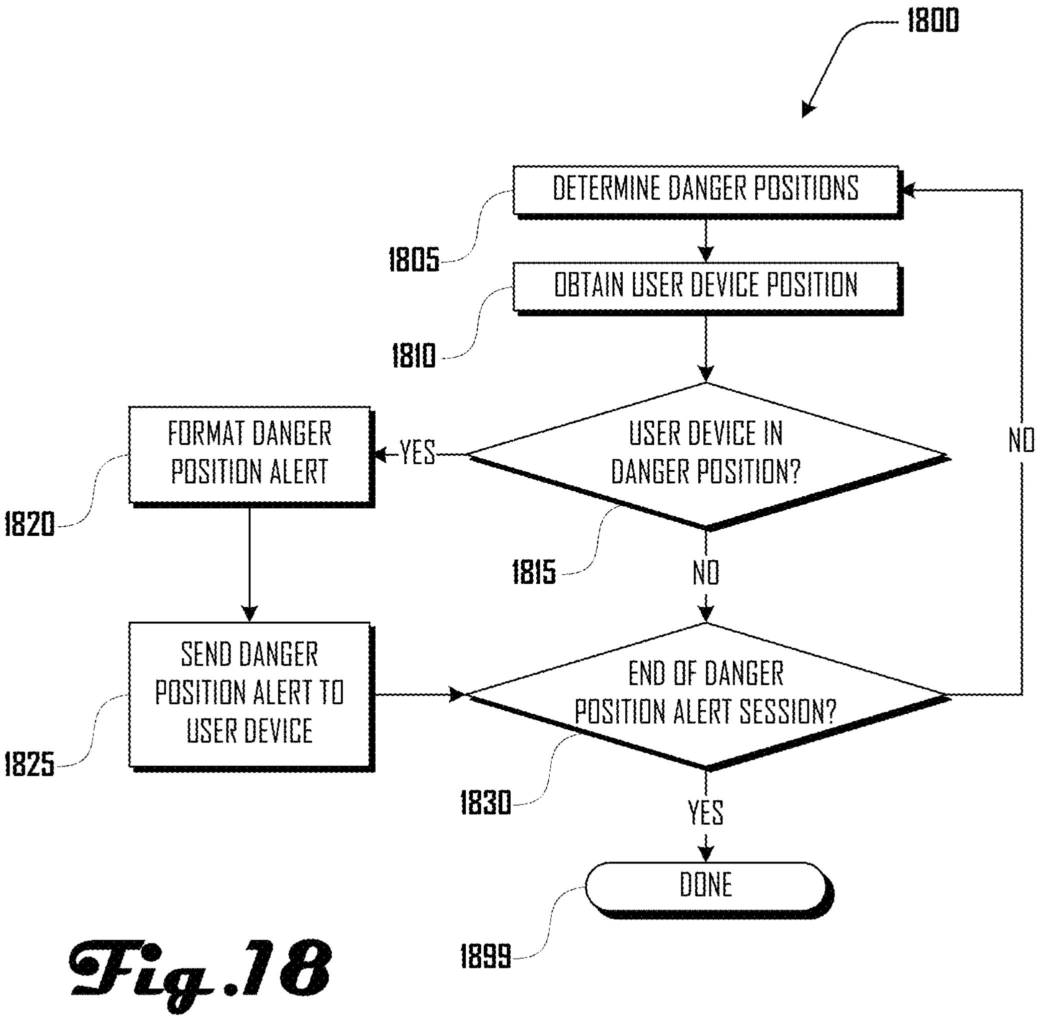
FIG. 18 is a flow diagram illustrating a device danger alert routine in accordance with various embodiments.

FIG. 18 is a flow diagram illustrating a device danger alert routine 1800 in accordance with various embodiments. The device danger alert routine 1800 begins in block 1805 where danger positions are determined, and in block 1810, a user device position is obtained.

In decision block 1815 a determination is made whether the user device 1130 is in a danger position. In various embodiments, such a determination may be made by comparing the obtained user device position to the defined danger positions. If the user device 1130 is not in a danger position the device danger alert routine 1800 continues to block 1830, where a determination is made whether the danger position alert session has ended. However, if the user device 1130 is in a danger position, then the device danger alert routine 1800 continues to block 1820, where a danger position alert is formatted. In block 1825 the danger alert is sent to the user device 1130.

In decision block 1830 a determination is made whether the danger position alert session has ended, and if so, the device danger alert routine 1800 is done in block 1899. However, if the danger position alert session is not ended, then the device danger alert routine 1800 cycles back to block 1805, where danger positions are again determined.

For example, in various embodiments, danger positions and user device positions can be continually determined and/or obtained. Danger positions may change as an object associated with the leveling device assembly 100 changes positions, or as the object associated with the leveling device assembly 100 changes level status. When it is determined that the user device 1130 is in a danger position, an alert can be formatted and sent to the user device 1130 so as to warn a user. This can be done continually in real time or at defined intervals during a danger position alert session.

Figure 19:
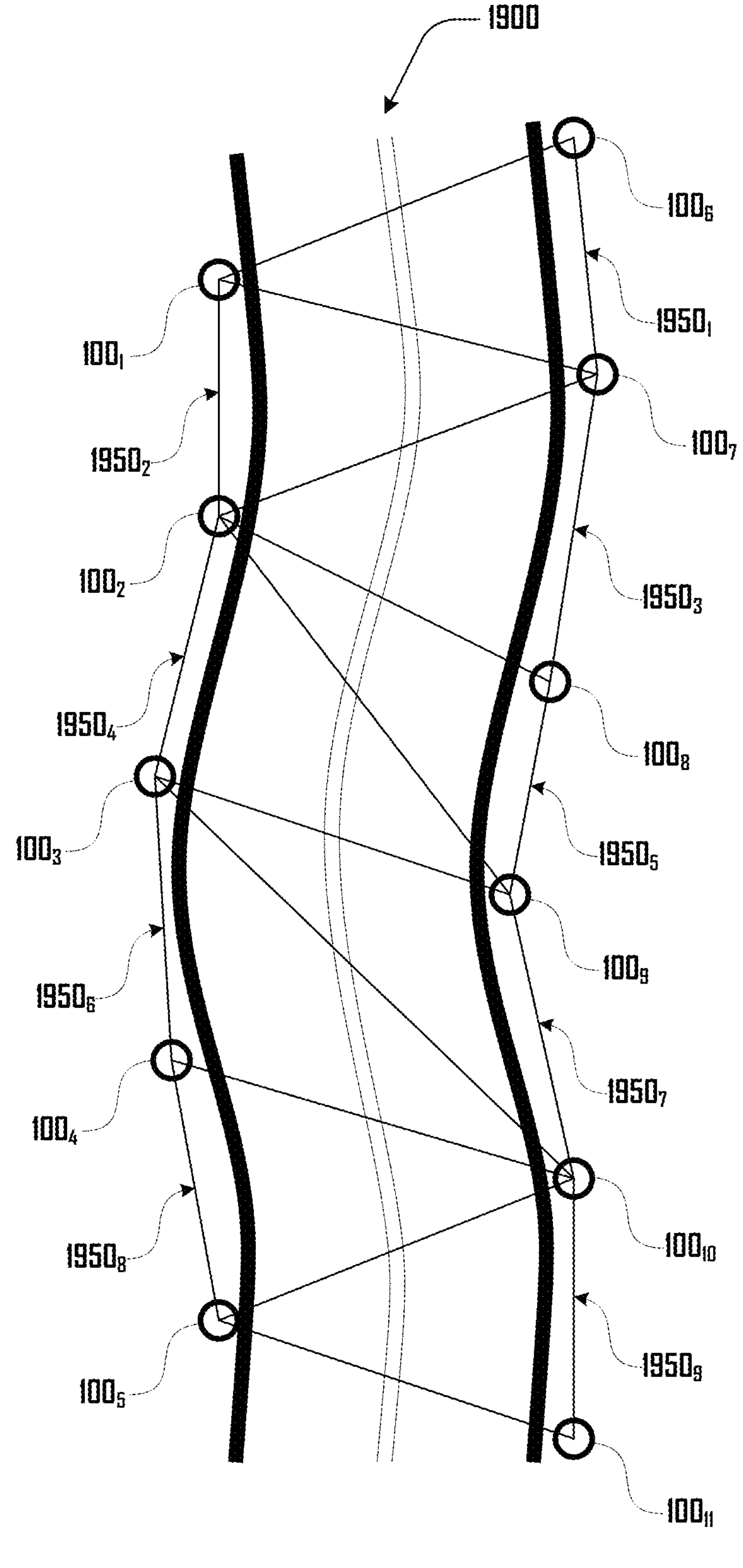
FIG. 19 is a top view of a road having a network of interconnected leveling devices positioned thereabout, which forms a positioning matrix.
Figure 20:
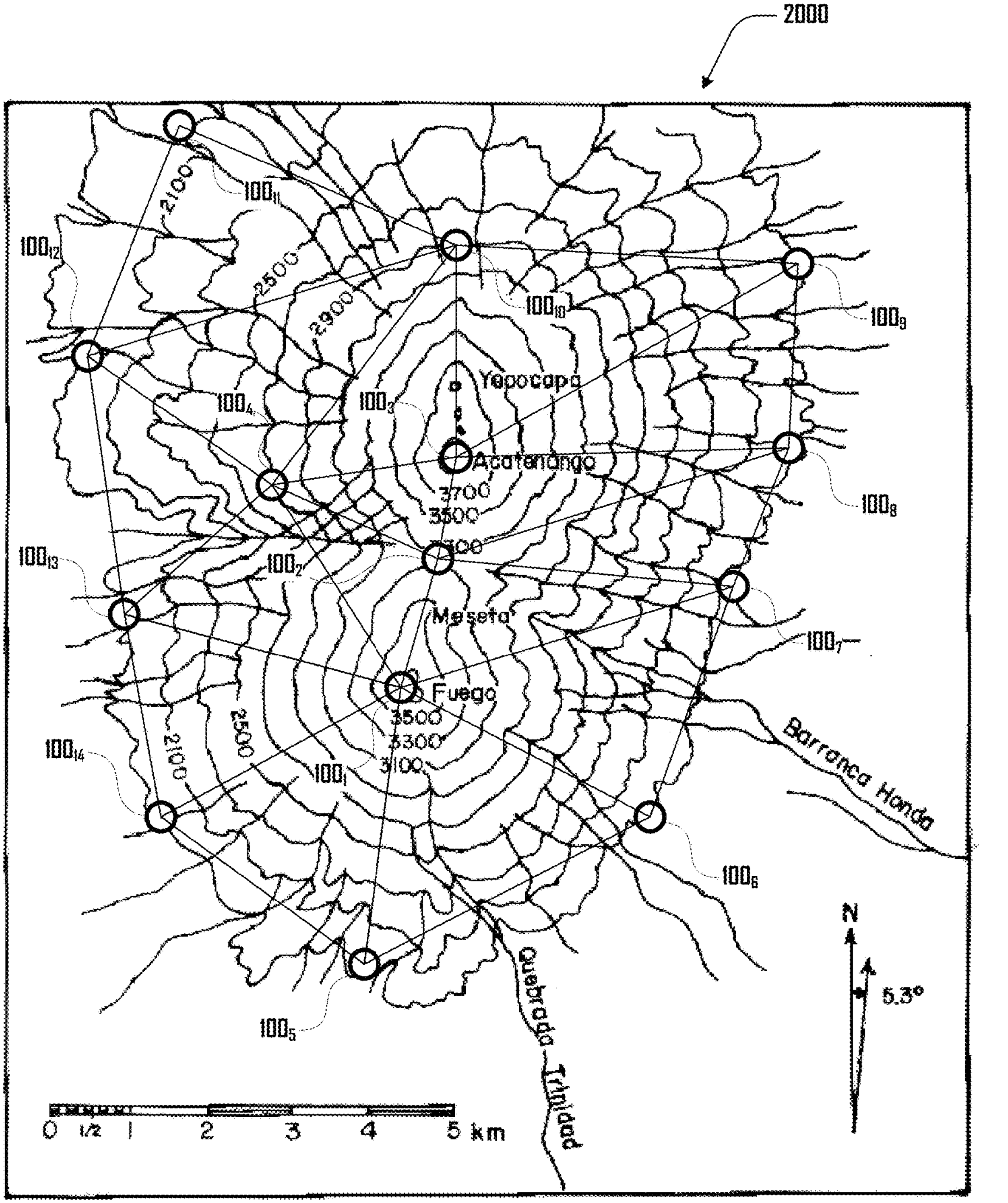
FIG. 20 is a top view of a mountain range having a network of interconnected leveling devices positioned thereabout, which forms a positioning matrix.
Figure 21:
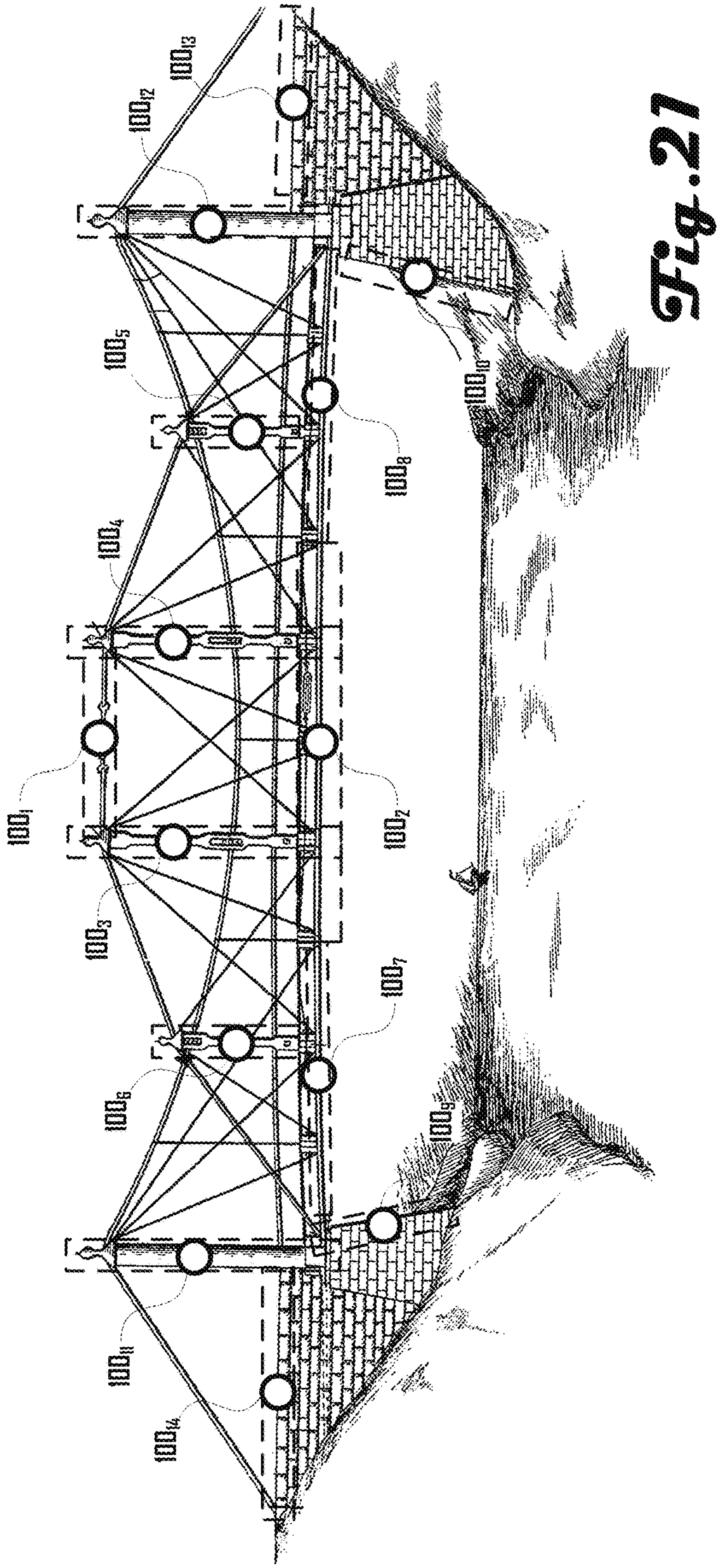
FIG. 21 is a side view of a bridge having a network of interconnected leveling devices positioned thereabout.

The following FIGS. 19, 20 and 21 depict various embodiments of leveling device assembly 100 networks, and uses thereof. In such embodiments, a network of leveling device assemblies 100 may be networked via a wireless network, and may also be connected to various other devices or servers via a wireless network, the internet, or the like.

FIG. 19 depicts a plurality of leveling device assemblies 100 positioned at various intervals along both sides of a road. Adjacent leveling devices form a plurality of triangular motion planes 1950, which may be used to model the movement of portions of the road and ground within each plane 1950 and which collectively form a matrix 1900. For example, motion plane $\mathbf{1950}_1$ is defined by imaginary lines connecting leveling device assemblies $\mathbf{100}_1$, $\mathbf{100}_6$, and $\mathbf{100}_7$. Motion plane $\mathbf{1950}_2$ is defined by imaginary lines connecting leveling device assemblies $\mathbf{100}_1$, $\mathbf{100}_2$, and $\mathbf{100}_7$.

Each leveling device assembly 100 may obtain positioning and level data, which may be used to model movement of each motion plane within the matrix 1900 and thereby model movement of the road and ground as a whole. Additionally data such as accelerometer data, and temperature data may also be obtained.

In an embodiment, data collected or modeled from a matrix 1900 can be presented to various users. For example, road signs may present images that reflect road conditions in real time, which may be based on data obtained from the matrix 1900. Additionally, such data collected from the matrix 1900 can be used by transportation agencies to determine when a road surface may need immediate repair or future repair.

Similarly, FIG. 20 depicts a matrix 2000 comprising a plurality of leveling device assemblies 100, which also forms a plurality of motion planes (not labeled). As shown in FIG. 20, the leveling device assemblies 100 are positioned in various locations on a mountain range, and the motion planes may be various shapes and sizes.

Accordingly, in an acute seismic event, or over time, the pitch and yawl of each plane may reveal a relationship between planes that may not otherwise be observable with other types of point measurement. A matrix 2000 as in FIG. 20 may be applied to locations with seismic activity to reveal shadows of tectonic interaction and movement that may not otherwise be observable by other seismic systems. Such measurements and modeling may be useful in the prediction of acute seismic events such as earthquakes.

In embodiments where leveling device assemblies 100 are positioned in and about the ground or ground features, a leveling device assembly 100 may housed within a hollow cylinder oriented perpendicular to the ground or the gravitational axis. Such cylinders may house the leveling device assembly 100 at, above, or below grade.

FIG. 21 depicts a plurality of leveling device assemblies 100 positioned at various points on a bridge. Here, each leveling device assembly 100 may provide positioning, leveling, seismic, and acceleration data, which may be associated or attributed to a portion, part or plane of the bridge on which the leveling device assembly 100 is positioned.

Accordingly, based on data obtained from the leveling device assemblies 100, modeling of the movement, strain, and position of the bridge may be achieved in various embodiments. For example, various parts of the bridge may be identified as being high or low strain areas, which may be correlated with traffic volume, or temperature changes. Such modeling may be used to determine areas or parts of the bridge that are in need of repair, or that need to be reinforced to prevent damage or catastrophic failure of the structure. In further embodiments, such a network of leveling device assemblies 100 may be applied to various structures.

Figure 22B:
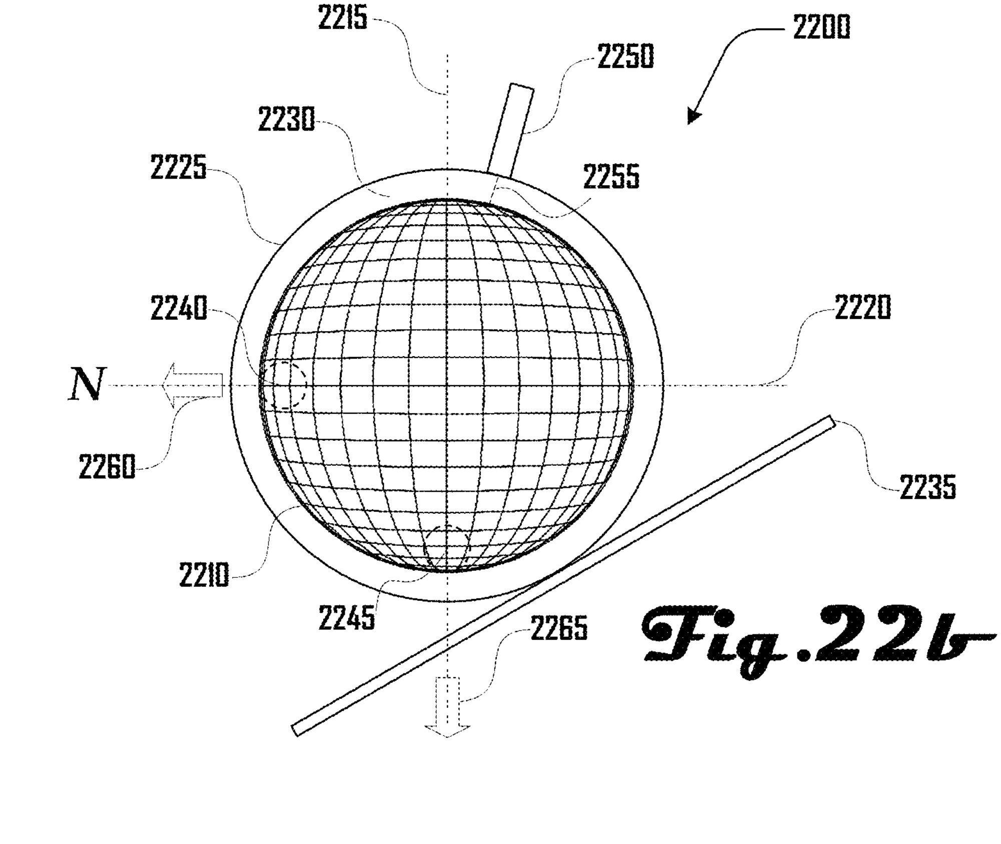

FIGS. 22*a* and 22*b* are a side view of a positioning sphere 2200 in accordance with various embodiments. FIG. 22*a* depicts the positioning sphere 2200 in a level position, and FIG. 22*b* depicts the positioning sphere in a non-level position. The positioning sphere 2200 comprises a data ball 2210, which is suspended in a suspension media 2230 and contained within a shell 2225. The data ball 2210 may rotate freely within the suspension media 2230 and shell 2225. Additionally, the shell 2225 is coupled to a leveling plate 2235, which is an extended substantially flat member.

In some embodiments, the surface of the data ball 2210 is encoded with data, which relates to a position on the data ball 2210. For example, the surface of the data ball 2210 may be encoded with data like a compact disc ("CD"), digital versatile disc ("DVD"), BlueRay disc, and the like, which can be read by the laser 2255 of a reader 2250. Accordingly, as the data ball 2210 rotates within the suspension media 2230, the change in position can be tracked as the reader 2250 reads the data that passes in view of the laser 2255.

In some embodiments, the data ball 2210 comprises a gravity body 2245, which is a body that is heavier than other portions of the data ball 2210 and therefore the gravity body 2245 is attracted to the earth's gravitational center via a gravitational force 2265. Accordingly, a vertical plane 2215 of the data ball 2210 is kept in alignment with the earth's gravitational center despite movement of the shell 2225 or structures attached thereto such as the leveling plate 2235.

In further embodiments the data ball 2210 comprises a compass body 2240, which is a magnetized body that is attracted to the earth's polar north. Accordingly, the compass body 2240 will be attracted to polar north via magnetic forces 2260 and a plane of the data ball 2210 will be aligned along a horizontal axis 2220 to magnetic north despite any change in position of the shell 2225 and structures attached thereto such as the leveling plate 2235.

FIG. 22*a* depicts the positioning sphere 2200 in a level position as indicated by the leveling plate 2235 being parallel to depicted horizontal axis 2220, and FIG. 22*b* depicts the positioning sphere in a non-level position, as indicated by the leveling plate 2235 not being parallel to depicted horizontal axis 2220. However, despite the leveling plate 2235 and shell 2225 being in a different position, the data ball 2210 retains the same orientation and alignment because the gravity body 2245 remains attracted to the earth's gravitational center via gravitational forces 2265, and the compass body 2240 remains oriented toward magnetic north via magnetic forces 2260.

In various embodiments, the position on the data ball 2210 being read in FIG. 22*a* by the reader 2250 may be considered a desired or zero position because the leveling plate 2235 is level, and the compass body 2240 naturally orients the data ball 2210 toward magnetic north. Accordingly, any changes in position from such a desired state may be tracked as the data ball 2210 rotates in relation to the reader 2250.

In some embodiments, the desired position may be changed. For example, a position wherein the leveling plate 2235 is perpendicular to level or any other orientation may be defined as a desired position or zero position.

Figure 24:
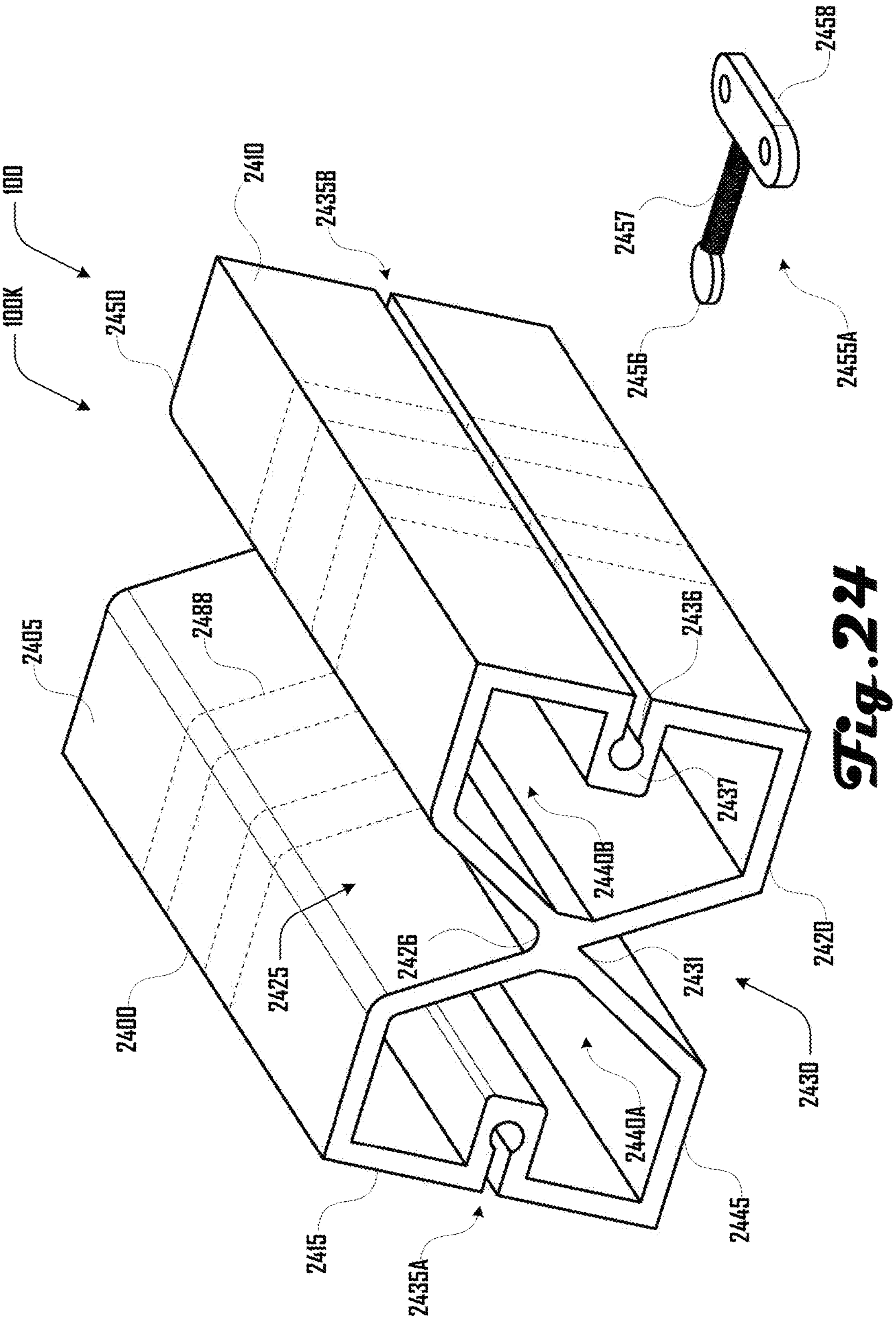
FIG. 24 shows a perspective view of a leveling device assembly in accordance with an embodiment.

FIG. 24 shows a perspective view of a leveling device assembly 100K in accordance with an embodiment. The leveling device assembly 100K comprises housing 2400, which may comprise a first, second, third and fourth face 2405, 2410, 2415, 2420. The first face 2405 may include an elongated sloped trench 2425, which extends from a first end 2445 to a second end 2450. The second and third faces 2410, 2415 may comprise an elongated coupling slot 2435A, 2435B respectively. The fourth face 2420 may include an angular notch 2430 that extends from the first end 2445 to the second end 2450. The housing 2400 may comprise one or more device cavity 2440A, 2440B.

In an embodiment, the housing 2400 may have a substantially cuboid profile aside from features such as the sloped trench 2425, angular notch 2430 and one or more coupling slot 2435A, 2435B. For example the first, second, third and fourth face 2405, 2410, 2415, 2420 and first and second end 2445, 2450 may have a substantially rectangular profile, and where the first, second, third and fourth face 2405, 2410, 2415, 2420 and first and second end 2445, 2450 are square to other and meet at a right angle. Such a configuration may be desirable in and embodiment because it makes each side of the leveling device assembly 100K operable to engage a planar surface so that the level status of the planar surface may be detected and indicated by the leveling device assembly 100K.

Additionally, in an embodiment, it may be desirable to detect the level status of objects that are non-planar, or to detect the level status of corners, or the like. Accordingly, in an embodiment, sloped trench 2425 and angular notch 2430 may make the leveling device assembly 100K operable to engage non-planar objects or features.

For example, the sloped trench 2425 may be configured to engage various sizes of cylindrical objects. The sloped trench 2425 may be uniform along its length extending from the first end 2445 to the second end 2450 and being aligned with a central axis of the first face 2405.

In an embodiment, the curve of the sloped trench 2425 may be a Witch of Agnesi curve having the Cartesian equation $y(x^2+a^2)=a^3$ or the parametric equation of $x=at$, $y=a/(1+t^2)$. The Witch of Agnesi curve may be desirable in some embodiments because it may provide stability when coupled with cylindrical objects, while providing the ability to couple with cylindrical, ovoid, or curved objects having a wide range of diameters. Although the Witch of Agnesi curve may be desirable in some embodiments, any other suitable curve or substantially curved profile may be employed in other embodiments.

The angular notch 2430 may be configured to engage angular objects and surfaces, such as a corner where planar faces meet. The angular notch 2430 may be uniform along its length extending from the first end 2445 to the second end 2450 and being aligned with a central axis of the fourth face 2420. In one embodiment, a notch central apex 2431 may define a 90° angle.

In some embodiments the angular notch 2430 and sloped trench 2425 may be on opposing faces of the housing 2400. Additionally, the angular notch 2430 and sloped trench 2425 may also be aligned in a similar plane. For example, a trench central apex 2426 of the sloped trench 2425 may be aligned with the notch central apex 2431 in a common location. In some embodiments, the angular notch 2430 and sloped trench 2425 may not be aligned or may not be on opposing faces.

One or more coupling slot 2435A, 2435B may be located on one or more face 2405, 2410, 2415, 2420. In an embodiment, coupling slots 2435A, 2435B may be an elongated slot that extends from the first end 2445 to the second end 2450. The coupling slots 2435A, 2435B may comprise a slot opening-passage 2436 and a slot inner-cavity 2437.

The slot opening-passage 2436 may be narrower than the slot inner-cavity 2437. For example, as depicted in FIG. 24, the slot opening-passage 2436 may be a substantially uniform rectangular opening, which extends inwardly and opens up into the slot inner-cavity 2437, which may be wider than the slot opening-passage 2436.

The leveling device assembly 100K may further include a coupling pin 2455A, which is configured to couple with the housing 2400 via coupling slots 2435A, 2435B. The coupling pin 2455A may comprise a coupling-pin head 2456, a coupling-pin shaft 2457, and a coupling-pin bow 2458. In an embodiment, the coupling-pin head 2456 is configured pass within the slot opening-passage 2436 in a first orientation and configured to couple within the slot inner-cavity 2437 in a second orientation. The coupling pin 2455A may be inoperable to pass within the slot opening-passage 2436 in the second orientation.

For example, the coupling-pin head 2456 may have a length that corresponds to the height of the slot inner-cavity 2437, and the coupling-pin head 2456 may have a width that corresponds to the height of the opening-passage 2436. When inserting the coupling pin 2455A into the slot opening-passage 2436 the coupling-pin head 2456 may be oriented such that the coupling-pin head 2456 may slide within the slot opening-passage 2436 and into the slot inner-cavity 2437. The coupling pin 2455A may then be rotated (e.g., 90°) such that the length coupling-pin head 2456 turns to engage the slot inner-cavity 2437. The coupling pin 2455A may thereby be coupled or held within a coupling slot 2435A, 2435B.

In an embodiment, the coupling of one or more coupling pin 2455A within one or more coupling slots 2435A, 2425B may facilitate the leveling device assembly 100K being secured to or coupled with various objects. For example, a first and second coupling pin 2455A may be coupled on opposing faces of the housing 2400 via coupling slots 2435A, 2425B, and an elastic band may extend between the first and second coupling pin 2455A. The elastic band may extended around various object (e.g., pipes, beams, or the like), such that the leveling device assembly 100K can be coupled or held thereto.

Figure 25A:
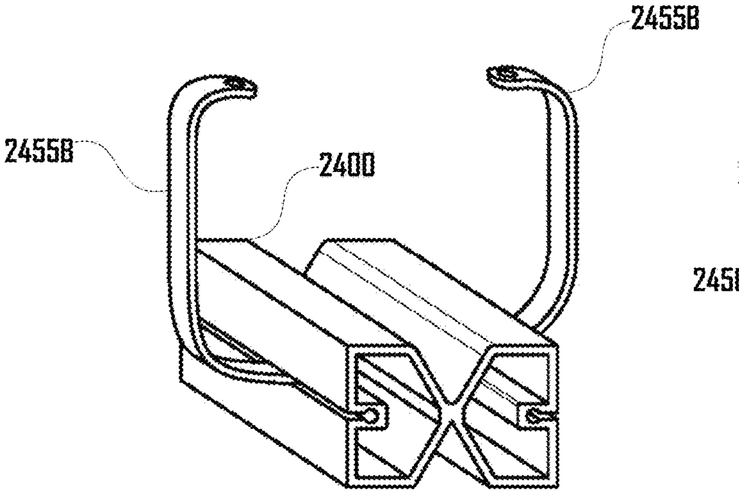
FIGS. 25*a*, 25*b* and 25*c* depict embodiments of a coupling pin and the leveling device assembly of FIG. 24.
Figure 25B:
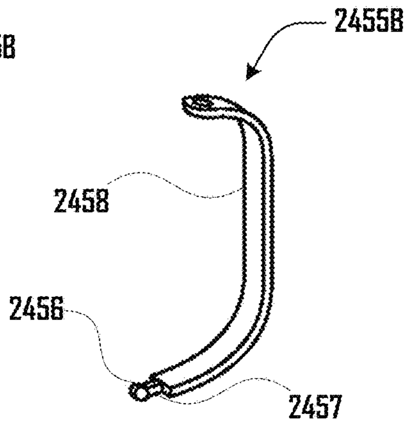
Figure 25C:
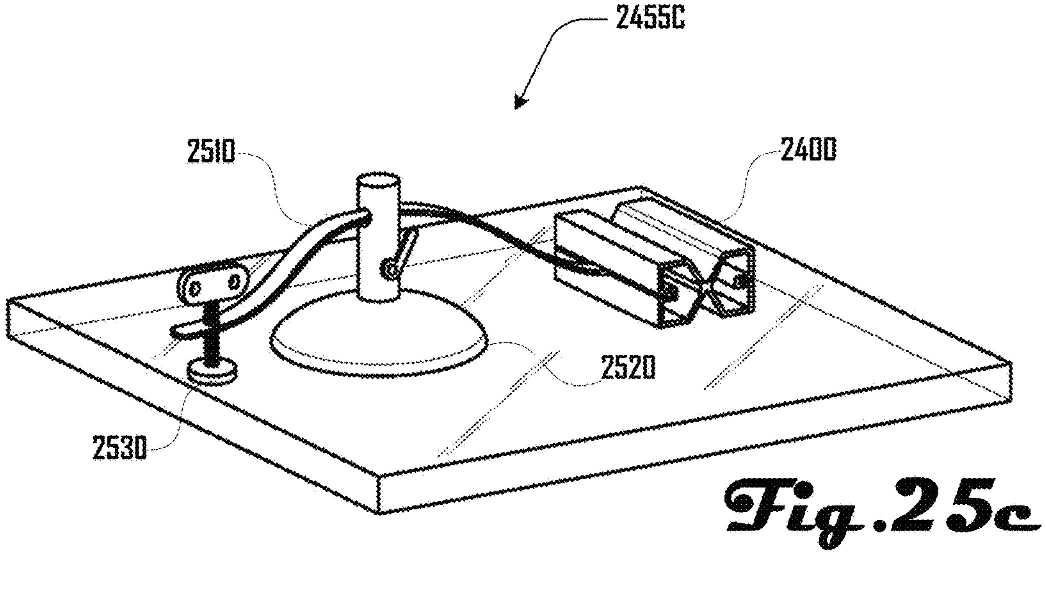

In other embodiments, a coupling pin 2455A may include additional features or structures, which provide for coupling of the leveling device assembly 100K to various objects. For example, FIGS. 25*a*, 25*b* and 25*c* depict embodiments of a coupling pin 2455B, 2455C and the leveling device assembly 100K of FIG. 24. For example, FIG. 25*b* depicts an embodiment of a coupling pin 2455B, which includes an extended coupling arm 2458. FIG. 25*a* depicts a first and second coupling pin 2455B coupled within coupling slots 2435A, 2425B (FIG. 24). The coupling arms 2458 of the first and second coupling pin 2455B may be operable to attach to various objects, such as a pipe, or the like.

In another embodiment, as depicted in FIG. 25*c*, the housing 2400 may be held against a surface by a suction coupling pin 2455C. The suction coupling pin 2455C may comprise a suction arm 2510, a suction cup 2520, and a soft shoe 2530 at a distal end of the suction arm 2510. For example, the suction coupling pin 2455C may be operable to couple with a surface such as glass, and allow the housing 2400 to be held thereto.

The housing 2400 may define one or more one or more device cavity 2440A, 2440B. For example, FIG. 24 depicts a first and second device cavity 2440A, 2440B, which extend from the first end 2445 to the second end 2450. In some embodiments, one or more first and second device cavity 2440A, 2440B may house a portion of a leveling device (not shown in FIG. 24), which may have any suitable components, features, abilities, or a combination thereof, as described herein in one or more embodiments. For example, a leveling device disposed within the housing 2400 may comprise various leveling, positioning, and acceleration functionalities. A leveling device disposed within the housing 2400 may comprise elements such as a compass, a leveling body, a global positioning system (GPS), an accelerometer, an electronic timing device, a compass device, an azimuth-finding device, a vector detecting device, image capturing device, audio recording device, and the like.

However, in some embodiments, a leveling device 105 may lack one or more of these functionalities and related functional elements, and may merely be a processor or computer.

The housing 2400 may also be magnetic. For example, the housing may comprise a magnetic portion 2488 on any of the faces 2405, 2410, 2415, 2420 or ends 2445, 2450. In an embodiment, the housing 2400 may comprise a plurality of magnetic strips 2488 that may be oriented parallel or perpendicular to the axies of faces 2405, 2410, 2415, 2420 or ends 2445, 2450. In one embodiment, a plurality of magnetic strips 2488 may be disposed on the first face 2405, which at least extend from the second face 2410 to the third face 2415 and parallel to the first and second end 2445, 2450.

In some embodiments, corners where faces 2405, 2410, 2415, 2420 or ends 2445, 2450 meet may be rounded or truncated. For example, such a corner may be flatly, convexly, or concavely truncated. Such an embodiment may be desirable because it may allow the housing 2400 to be adaptable to engage with a wider variety of surfaces and object contours.

In some embodiments, caps (not shown) may be operable to cover and engage with the ends 2445, 2450. Such caps may include an extension of coupling slots 2435A, 2535B and my also conform to the profile of the ends 2445, 2450. In an embodiment, caps on the ends 2445, 2450 may provide a water-tight or air-tight seal between the device cavities 2440A, 2440B and the external environment. In an embodiment, caps on the ends 2445, 2450 may support a vacuum or positive pressure within the device cavities 2440A, 2440B with respect to the outside environment.

Figure 26A:
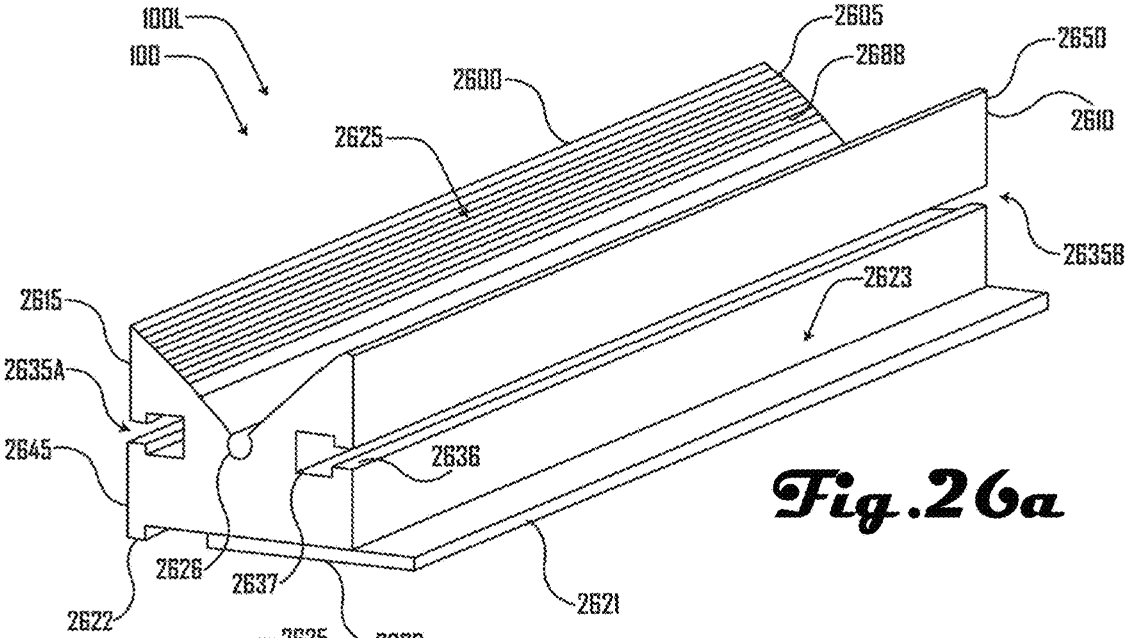
FIGS. 26*a* and 26*b* depict an embodiment of a leveling device housing in accordance with a further embodiment.
Figure 26B:
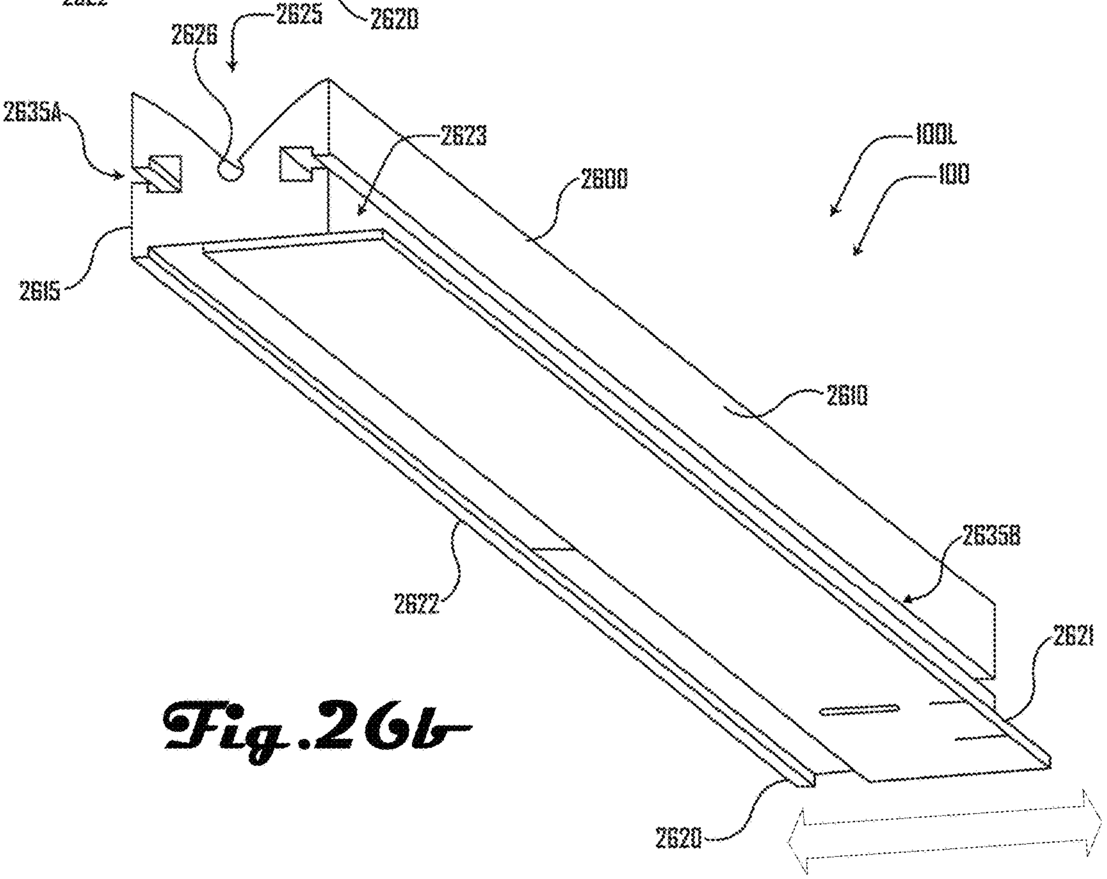

FIGS. 26*a* and 26*b* show perspective views of a leveling device assembly 100L in accordance with a further embodiment. The leveling device assembly 100L comprises a housing 2600, which may comprise a first, second, third and fourth face 2605, 2610, 2615, 2620. The first face 2605 may include an elongated sloped trench 2625, which extends from a first end 2645 to a second end 2650. The second and third faces 2610, 2615, or sidewalls, may comprise an elongated coupling slot 2635A, 2635B respectively. The fourth face 2620, or base, may comprise a squaring plate 2621 that is slidably coupled about the base 2620 and also comprise a base lip 2622.

Figure 27:
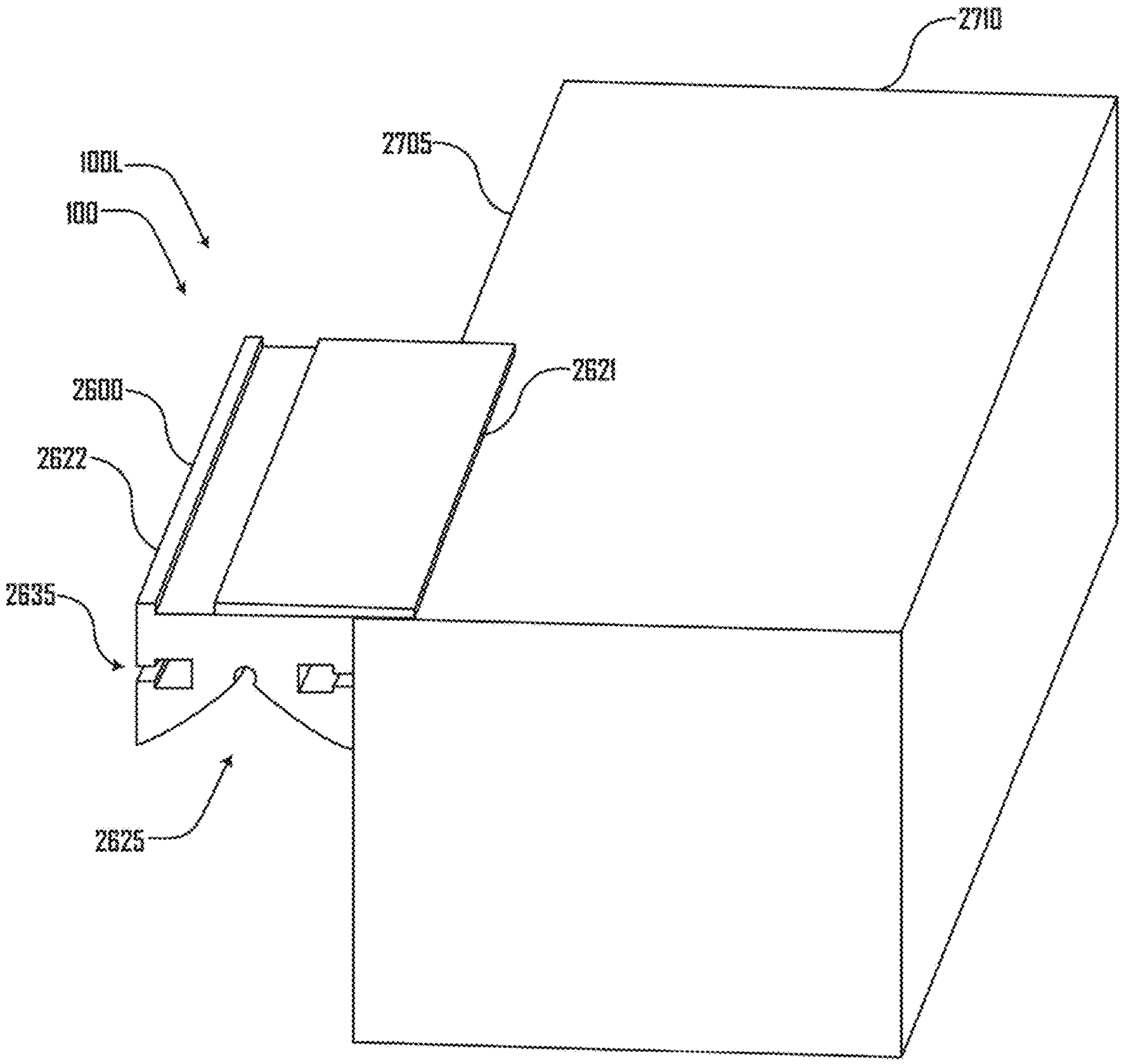
FIG. 27 depicts the device housing of FIGS. 26*a* and 26*b* coupled with an edge via an extended squaring plate of the device housing.

The squaring plate 2621 may be substantially planar and operable to assume an extended position wherein the squaring plate 2621 extends perpendicular to and past a face of at least one sidewall 2610, 2615 (e.g., as depicted in FIGS. 26*a*, 26*b*, 27 and 32*a*). The squaring plate 2621 may also be operable to assume a stowed position wherein the squaring plate 2621 is disposed between the sidewalls 2610, 2615 (e.g., as depicted in FIGS. 28*a*, 28*b*, 29*b* and 32*b*). In the extended configuration, the squaring plate 2621 and sidewall 2610 may define a squaring corner 2623, which as shown in FIG. 27, may be used to square the device 100L to an edge 2705 of an object 2710.

The squaring plate 2621 may be slidably coupled at the base 2620 via any suitable structure including a pin-in-slot configuration, or the like. In some embodiments, the squaring plate 2621 may be spring loaded. The squaring plate 2621 can be any suitable size in various embodiments, and may include any suitable edge. The squaring plate 2621 may also comprise one or more suitable material. For example, in some embodiments, the squaring plate 2621 may comprise a metal rail embedded in the front protruding edge of the body of the squaring plate 2621, which acts as a straightedge.

In an embodiment, the housing 2600 may have a substantially cuboid profile aside from features such as the sloped trench 2625 and one or more coupling slot 2635A, 2635B. For example the, sidewalls 2610, 2615 and base 2620 and first and second end 2645, 2650 may have a substantially rectangular profile, and where the, second, third and fourth face, 2610, 2615, 2620 and first and second end 2645, 2650 are square to each other and meet at a right angle. In a stowed configuration, the squaring plate 2621 and base lip 2622 may define a substantially contiguous base-face 2620 that extends between the sidewalls 2610, 2615 and between the first and second ends 2645, 2650. In various embodiments, however, the base lip 2622 may be absent and the squaring plate 2621 may define a substantially contiguous base-face 2620.

Such a cuboid and squared configuration may be desirable in an embodiment because it makes each side of the leveling device assembly 100L operable to engage a planar surface so that the level status of the planar surface may be detected and indicated by the leveling device assembly 100L.

Additionally, in an embodiment, it may be desirable to detect the level status of objects that are non-planar, or to detect the level status of corners, or the like. Accordingly, in an embodiment, the sloped trench 2625 may make the leveling device assembly 100L operable to engage non-planar objects or features.

Figure 32A:
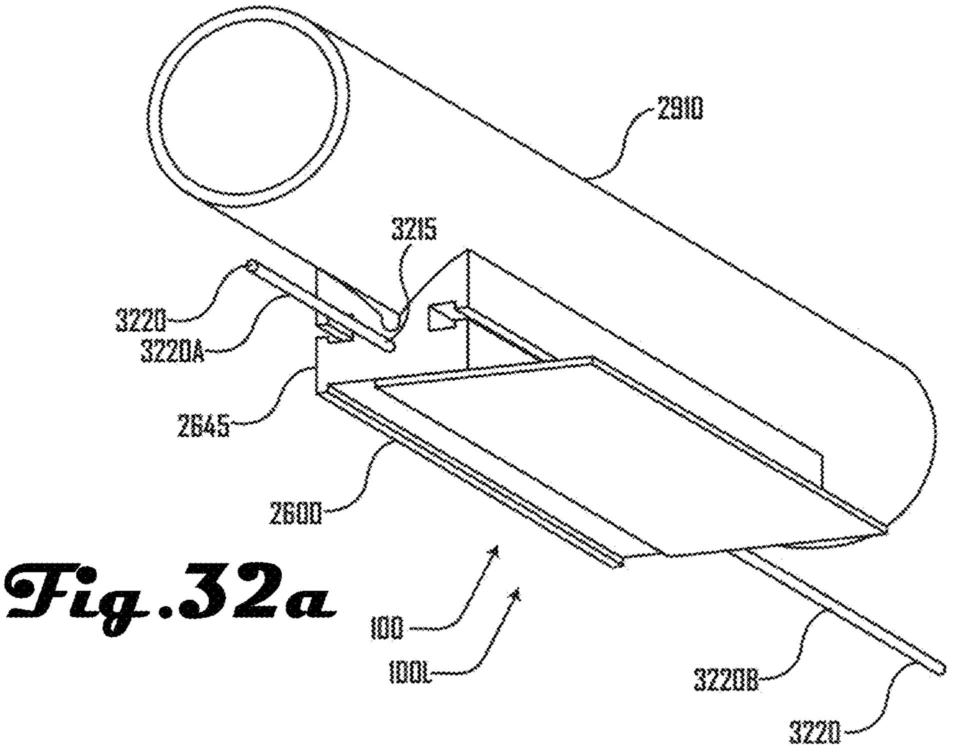
FIGS. 32*a* and 32*b* depict embodiments of laser assemblies associated with the housing of FIGS. 26*a* and 26*b*.

For example, the sloped trench 2625 may be configured to engage various sizes of cylindrical objects as depicted in FIGS. 30 and 32*a*. The sloped trench 2625 may be uniform along its length extending from the first end 2645 to the second end 2650 and being aligned with a central axis of the first face 2605.

One or more coupling slots 2635A, 2635B may be located on one or more faces 2605, 2610, 2615, 2620. In a preferred embodiment, matching coupling slots 2635A, 2635B may be respectively disposed on the sidewalls 2610, 2615. In one embodiment, coupling slots 2635A, 2635B may be an elongated slot that extends from the first end 2645 to the second end 2650. The coupling slots 2635A, 2625B may comprise a slot opening-passage 2636 and a slot inner-cavity 2637.

The slot opening-passage 2636 may be narrower than the slot inner-cavity 2637. For example, as depicted in FIGS. 26*a* and 26*b*, the slot opening-passage 2636 may be a substantially uniform rectangular opening, which extends inwardly and opens up into the slot inner-cavity 2637, which may be wider than the slot opening-passage 2636.

In an embodiment, the sloped trench 2625 may define an elongated coupling slot 2626 disposed at the central apex of the sloped trench 2625. In some embodiments, the coupling slot 2626 of the sloped trench 2625 may have the same size and/or profile as the coupling slots 2635A, 2635B on the sidewalls 2610, 2615, but in some embodiments the size and/or profile may be different. For example, as depicted in FIGS. 26*a* and 26*b*, the coupling slots 2635A, 2635B may have a rectangular profile, whereas the coupling slot 2626 may have a circular profile.

The housing 2600 may define one or more device cavity (not shown). In some embodiments, the one or more device cavity may house a portion of a leveling device (not shown in FIG. 26), which may have any suitable components, features, abilities, or a combination thereof, as described herein in one or more embodiments. For example, a leveling device disposed within the housing 2600 may comprise various leveling, positioning, and acceleration functionalities. A leveling device disposed within the housing 2600 may comprise elements such as a compass, a leveling body, a global positioning system (GPS), an accelerometer, an electronic timing device, a compass device, an azimuth-finding device, a vector detecting device, image capturing device, audio recording device, and the like. However, in some embodiments, a leveling device may lack one or more of these functionalities and related functional elements, and may merely be a processor or computer.

The housing 2600 may also be magnetic. For example, the housing may comprise a magnetic portion 2688 on any of the faces 2605, 2610, 2615, 2620 or ends 2645, 2650. In an embodiment, the housing 2600 may comprise a plurality of magnetic strips 2688 that may be oriented parallel or perpendicular to the axes of faces 2605, 2610, 2615, 2620 or ends 2645, 2650. In one embodiment, a plurality of magnetic strips 2688 may be disposed on the first face 2605, which at least extend from the second face 2610 to the third face 2615 and parallel to the first and second end 2645, 2650.

In some embodiments, corners where faces 2605, 2610, 2615, 2620 or ends 2645, 2650 meet may be rounded or truncated. For example, such a corner may be flatly, convexly, or concavely truncated. Such an embodiment may be desirable because it may allow the housing 2600 to be adaptable to engage with a wider variety of surfaces and object contours.

In addition to appliances like a coupling pin 2455, coupling pin with extended arm 2455B, or suction coupling pin 2455C as depicted in FIGS. 24 and 25*a-c* (which are equally applicable to the housing 2600), various other appliances or accessories may be applied to and used with the housing 2600 (or housing 2400) in various embodiments.

Figure 28A:
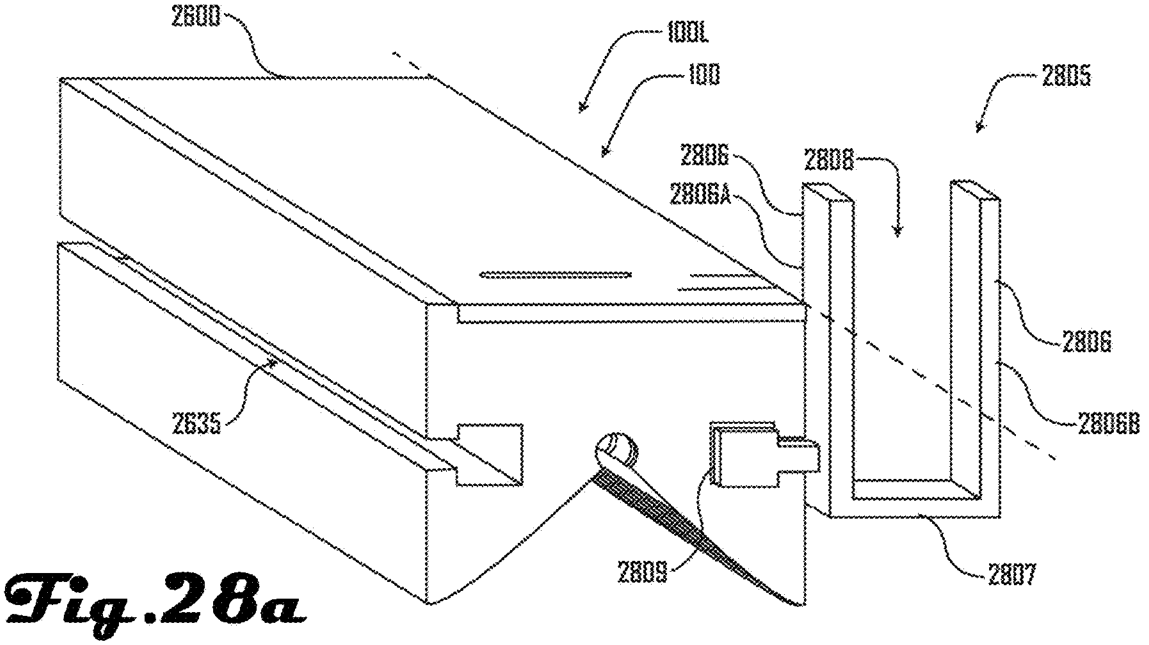
FIGS. 28*a* and 28*b* depict an embodiment of a coupling bracket coupled with the housing of FIGS. 26*a* and 26*b*.
Figure 28B:
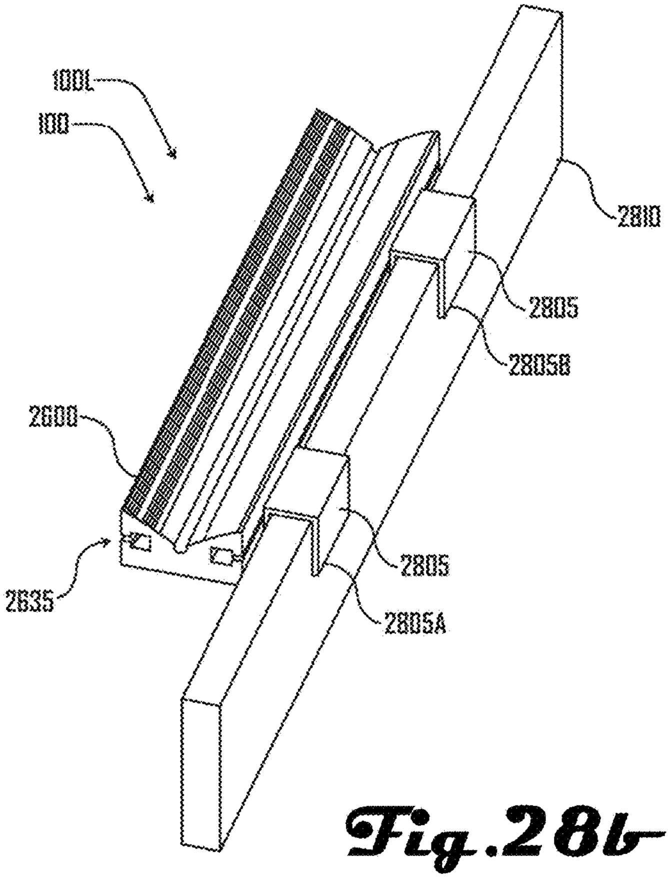

For example, FIGS. 28*a* and 28*b* depict a coupling bracket 2805 that includes a first and second arm 2808A, 2808B and span 2807 that define a coupling cavity 2808. The coupling bracket 2805 also includes a pin 2809 that is configured to couple with the coupling slots 2635 and in some embodiments with center coupling slot 2626. The pin 2809 may be operable to rotatably enter and couple with the slot 2635 along its length as described herein, or may be configured to only enter a slot 2635 at the first or second end 2645, 2650. In other words, the dimensions of the pin 2809 may not be configured for rotatable coupling via the length of a slot 3635 in some embodiments.

As depicted in FIG. 28*b*, for example, coupling brackets 2805A, 2805B may be configured to couple with dimensional lumber 2810 and thereby couple the housing 2600 to the dimensional lumber 2810 along a parallel axis. Use of one or a plurality of coupling brackets 2805 may be desirable. Accordingly, the generally U-shaped coupling cavity 2808 may be configured to correspond to various standard dimensional lumber sizes including 2-by, 4-by, and the like. In further embodiments, the arms 2806 and/or span 2807 may be configured to assume different sizes or may be elastic. Additionally, while the pin 2809 is depicted as being coupled to the first arm 2806A, it may alternatively be coupled with the span 2807, or may be coupled to any portion of the arms 2806 or span 2807 in any suitable configuration or orientation. Coupling brackets 2805 may also be configured to couple with various cuboid, circular, or irregularly shaped objects.

Figure 29A:
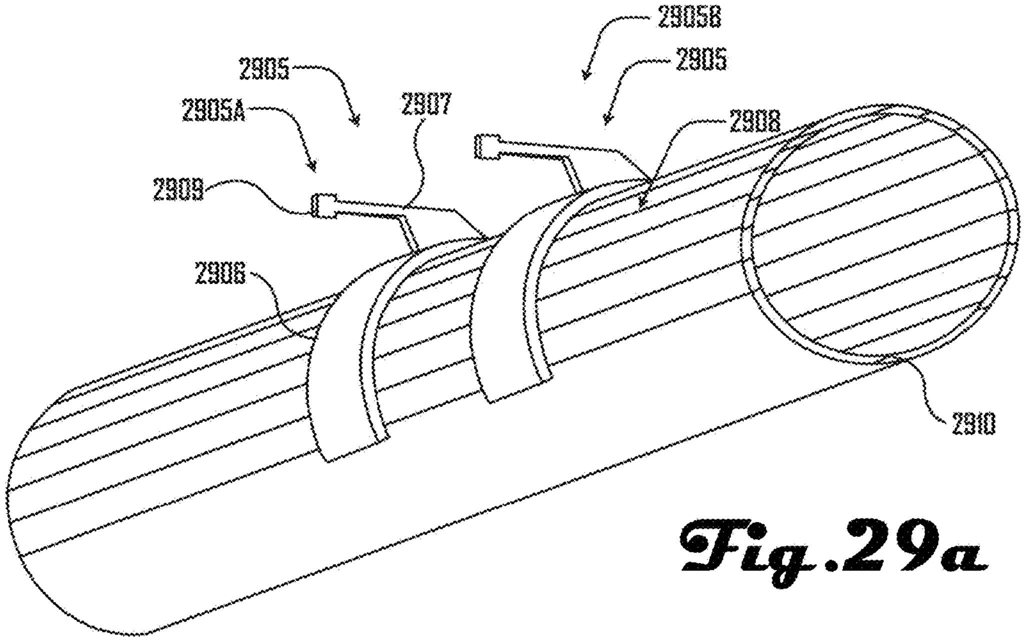
FIGS. 29*a* and 29*b* depict another embodiment of a coupling bracket coupled with the housing of FIGS. 26*a* and 26*b*.
Figure 29B:
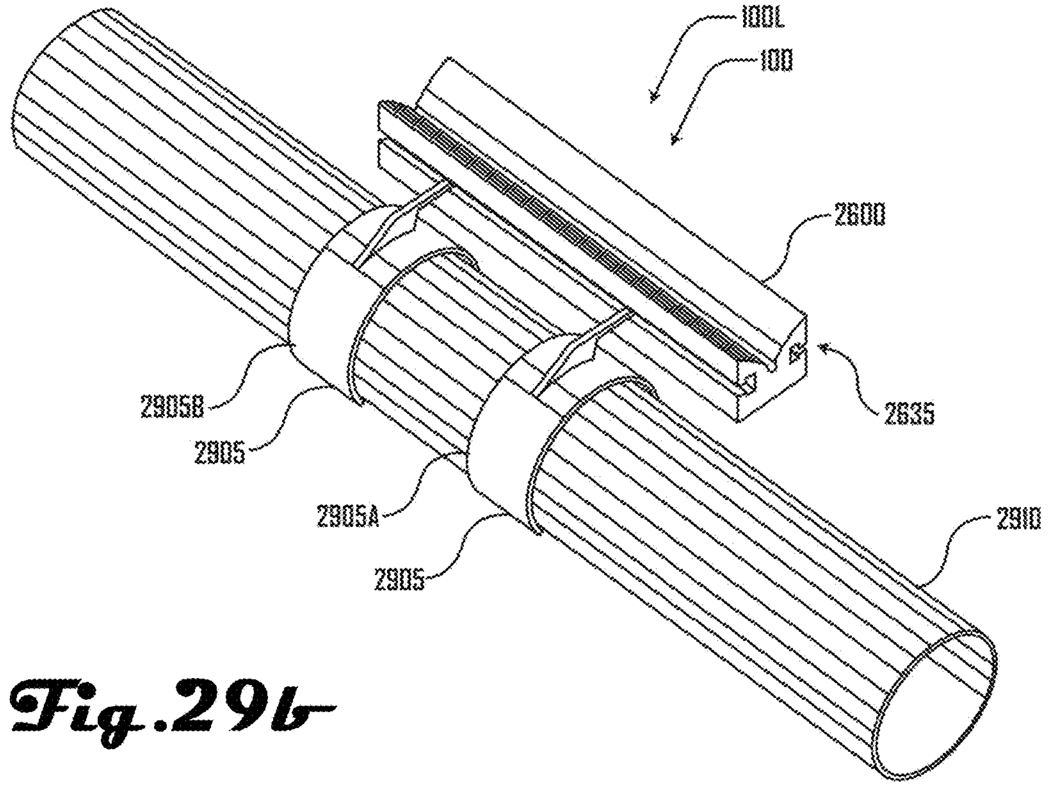

For example, FIGS. 29*a* and 29*b* depict a coupling bracket 2905 that is configured to couple with a circular pipe 2910. The coupling bracket 2905 comprises arms 2906 that define a crescent-shaped coupling cavity 2808 that is configured to couple with circular objects such as a pipe 2910. A limb 2907 extends from a portion of the arms 2906 and includes a coupling pin 2909 at a distal end, which is configured to couple with a coupling slot 2635 of the housing 2600 as discussed herein. In various embodiments, one or more coupling bracket 2905 may be used to couple the housing 2600 with an object.

The coupling bracket 2905 may be various suitable sizes to accommodate various sizes of circular, oval or other shaped objects. Additionally, in various embodiments, the arms 2906 of the coupling bracket 2905 may be elastic, magnetic, or comprise a surface is that is configured to provide for improved coupling with objects. For example, the arms 2906 may be elastic or biased toward the center of the coupling cavity 2908 to provide for gripping to an object. The arms 2906 may also comprise rubber, silicone, an adhesive or textured surface that provides for gripping to desired objects such as a pipe 2910. Additionally, while the limbs 2907 are shown configured to extend parallel to a tangent of the arms 2906, in further embodiments, the limbs 2907 may extend at various desirable angles or directions. The limbs 2907 may also be rotatably coupled to the arms 2906 so as to provide for customized extension direction of the limbs 2907.

Figure 30A:
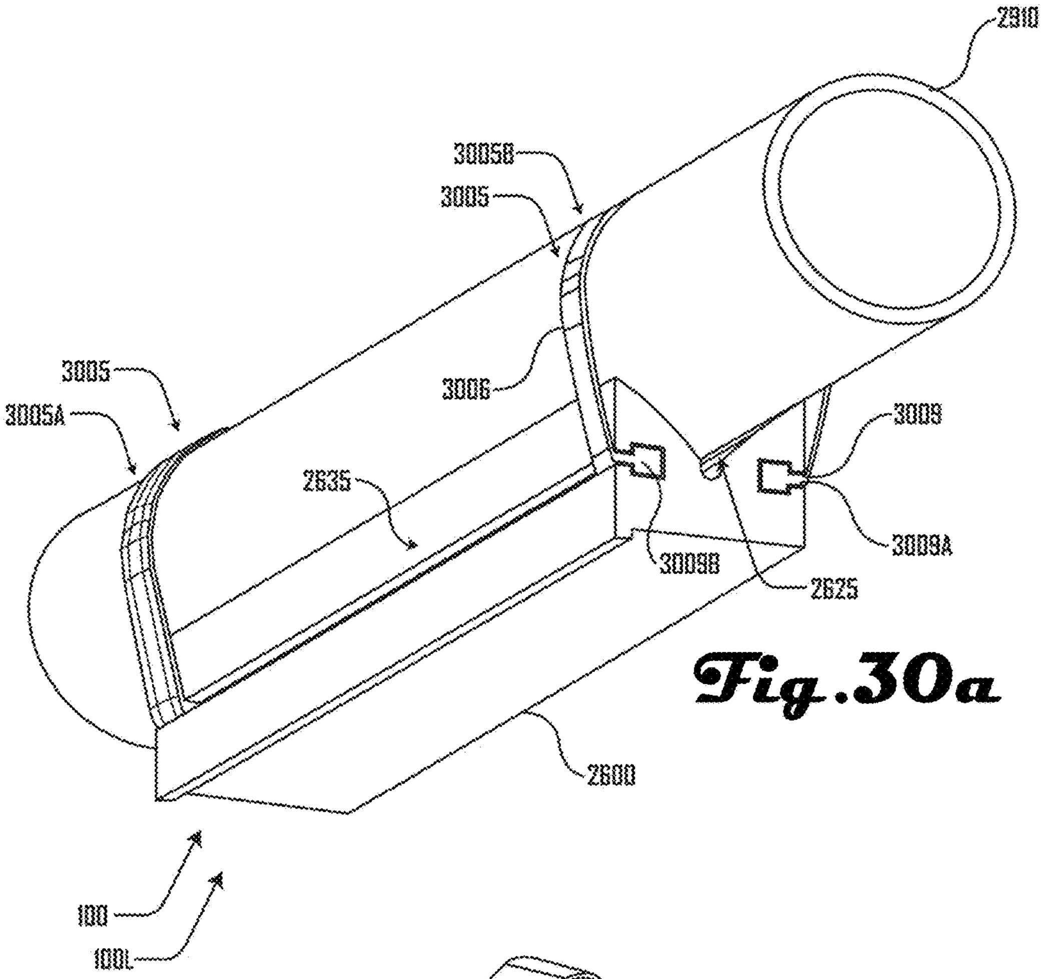
FIGS. 30*a* and 30*b* depict an embodiment of a coupling strap in accordance with an embodiment.
Figure 30B:
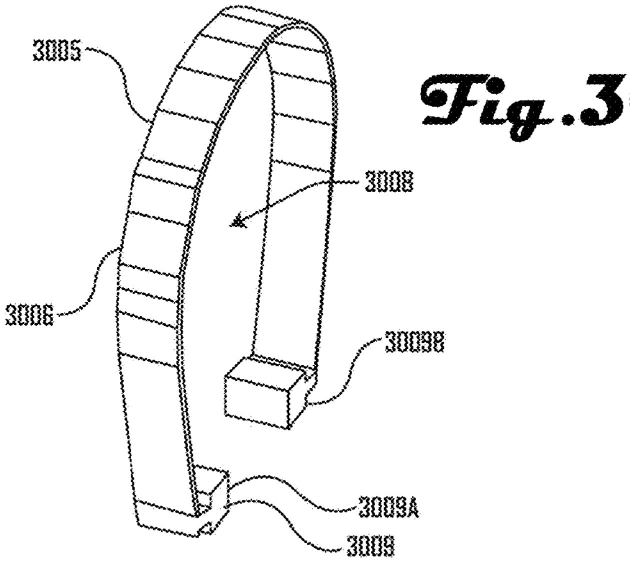

The housing 2600 may be coupled directly to objects in accordance with some embodiments. For example, FIGS. 30*a* and 30*b* depict a coupling strap 3005 that is operable to surround a portion of an object and thereby couple the housing 2600 to the object. The coupling strap 3005 comprises an elongated strap body 3006 with coupling pins 3009 on the ends of the strap 3006. The coupling pins 3009 may be configured to couple with coupling slots 2635 as discussed herein and thereby define a coupling loop 2908 that surrounds an object and thereby couples the housing 2600 to the object. For example, FIG. 30*a* depicts a pair of coupling straps 3005A, 3005B that are encircling a pipe 2910, with the pipe 2910 residing within the sloped trench 2625 defined by the housing 2600 and within the coupling loops 2908 defined by the respective straps 3005.

In various embodiments, a portion of the coupling strap 3005 may be elastic so the coupling strap 3005 can accommodate various sizes of objects and so that the object can be held securely within the sloped trench 2625, or against other faces of the housing 2600 such as the sidewalls 2410, 2415 or base 2420.

Figure 31A:
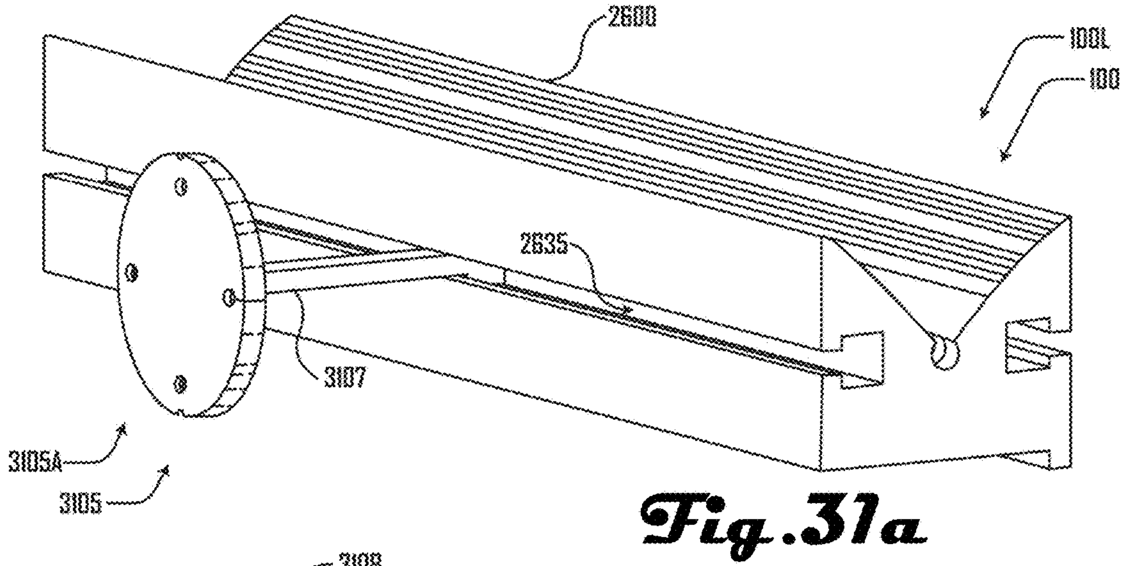
FIGS. 31*a-d* depict various embodiments of a coupling base.
Figure 31B:
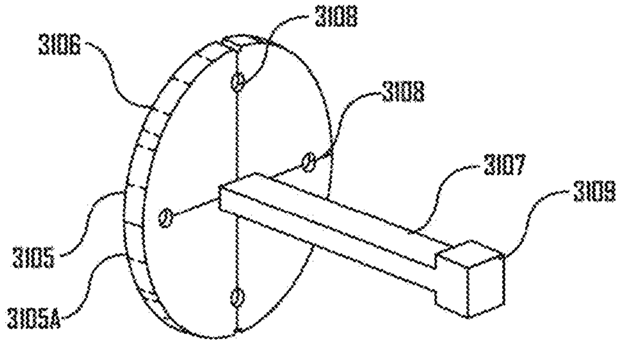
Figure 31C:
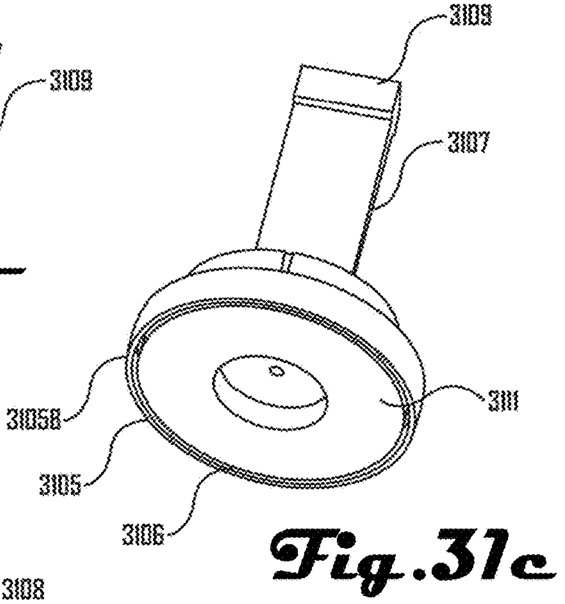
Figure 31D:
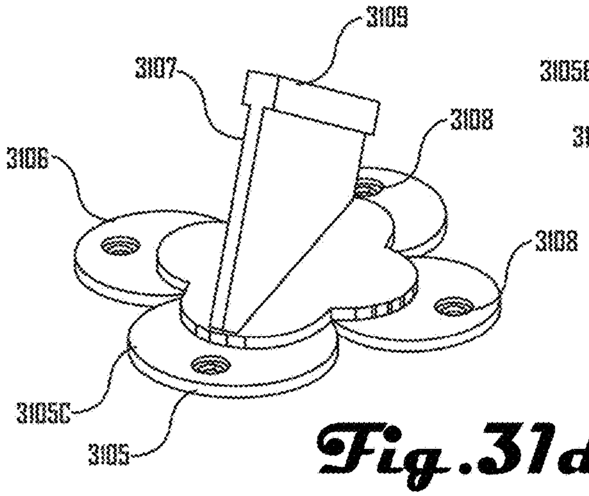

FIGS. 31*a-d d*depict various embodiments 3105A, 3105B, 3105C of a coupling base 3105. The coupling base 3105 comprises a base member 3106 having a limb 3107 extending therefrom, with a coupling pin 3109 disposed at a distal end of the limb 3107. The coupling pin 3109 may be configured to couple with one or more coupling slot 2635 as discussed herein. In some embodiments, (e.g., 3105A, and 3105C, the base member 3106 may define one or more coupling holes 3108. In various embodiments, the coupling holes 3108 may be used to secure the base member 3106 to an object via screws, nails, or the like. In further embodiments, the base member 3106 may couple with desired objects in other ways. For example FIG. 31*c* depicts a coupling base 31056 having a magnet 3111. In further embodiments, a coupling base 3106 may include an adhesive, suction cup, hook, stake, or other desirable coupling structure.

In various embodiments, (e.g., 3105A, and 3105B) the limb 3107 and pin 3109 may be configured to couple the housing 2600 substantially parallel to the coupling base 3106, however, in some embodiments (e.g., 3105C), the limb 3107 and pin 3109 may be configured to couple the housing 2600 at an angle that is not parallel to the coupling base 3106. In some embodiments, such a coupling orientation or angle may be static; however, in other embodiments, the limb 3107 and/or pin 3109 may be rotatably coupled to the coupling base 3106 such that a desired orientation of the housing 2600 may be achieved. For example, the angle of the housing 2600 relative to the base 3106 may be configured, or the rotation orientation of the housing 2600 at a given angle may be configured.

As discussed herein (and as depicted in FIG. 3*a,* for example), a housing 2600 or leveling device 100 may comprise one or more laser assembly 3215 that is configured to project a laser 3220 coincident with an axis of the housing 2600. FIG. 23*a* depicts a housing 2600 that comprises a laser assembly 3215 that is configured to project a laser 3220A extending from the first end 3245 of the housing 2600 that is coincident with a housing axis extending between the first and second end 3245, 3250. A second laser 3220B is depicted being projected from the second end 3250 by a second laser assembly (not shown). Such a configuration may be desirable because the lasers 3220 may represent an axis that is parallel to an axis of an object associated with the housing 2600 (e.g., the pipe 2910 disposed in the sloped trench 2625 of the housing 2600). The configuration of laser assemblies 3215 depicted in FIG. 32*a* is only an example, and as discussed herein, lasers 3220 may be projected from any suitable portion of the housing 2600 and may represent various suitable axes.

Figure 32B:
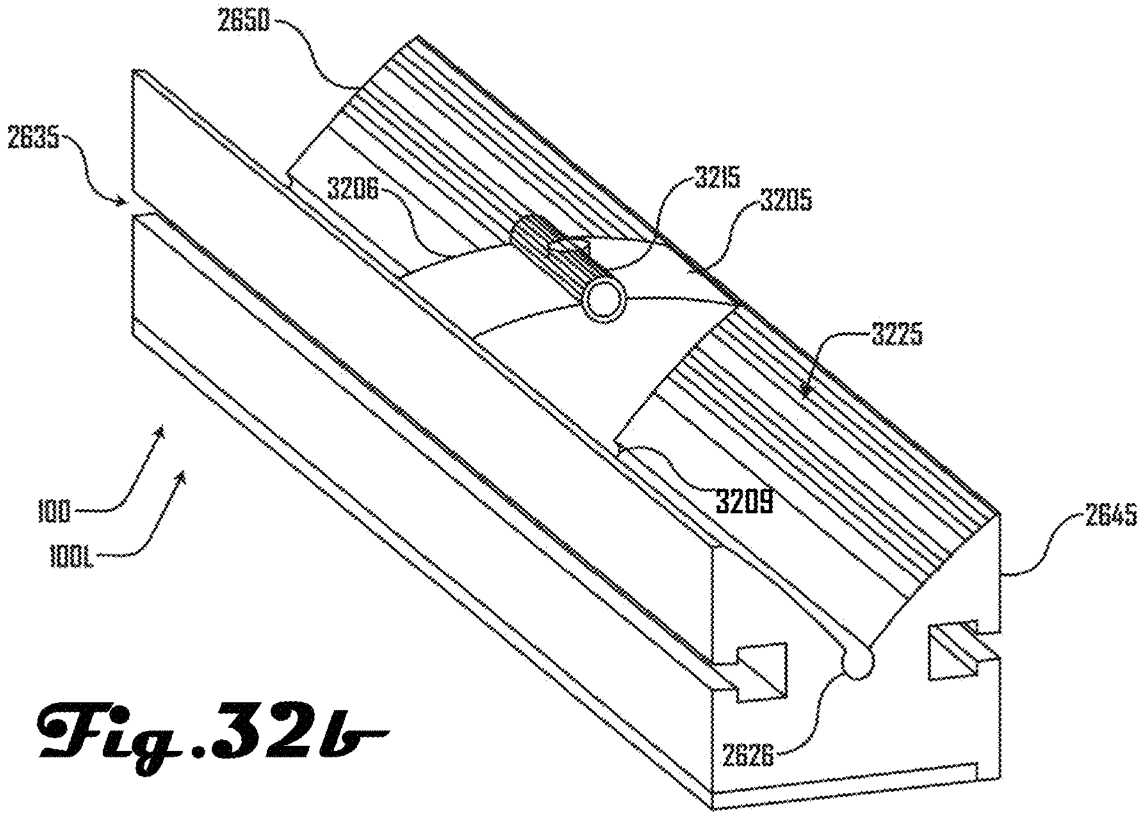

FIG. 32*b* depicts a housing 2600 with a removable laser appliance 3205 coupled to the housing 2600 via the coupling slot 2626 at the center of the sloped trench 2625. The laser appliance 3205 comprises a laser appliance body 3206 that conforms to the walls of the sloped trench 2625 and includes a coupling pin 3209 that is configured to couple within the coupling slot 2626 as described herein. A laser assembly 3215 is disposed on a top end of the body 3206 and is configured to project a first and second laser toward and past the first and second ends 3245, 3250 respectively, along a common axis that is coincident with an axis of the housing 2600. In some embodiments, the laser assembly 3215 may be disposed in any suitable portion of the body 3206 including at a central location or as a portion of the pin 3209. In some embodiments, a laser appliance 3205 may be configured to couple with the housing 2600 in other places. For example, a laser appliance may couple within or about one or more of the coupling slots 2635 on the sidewalls 2610, 2615 of the housing 2600.

Housings 2400, 2600 are shown as example embodiments of housings in accordance with the present invention; however, these example housings 2400, 2600 should not be construed to limit the many variations of these housings that are within the scope and spirit of the present invention. For example, any of the disclosed portions of the housings 2400, 2600 may be absent, in plural, or interchanged among embodiments as desired. Disclosure related to one embodiment is equally applicable to disclosure related to another embodiment. Appliances discussed herein may also be adapted to any suitable housing embodiment.

Figure 33A:
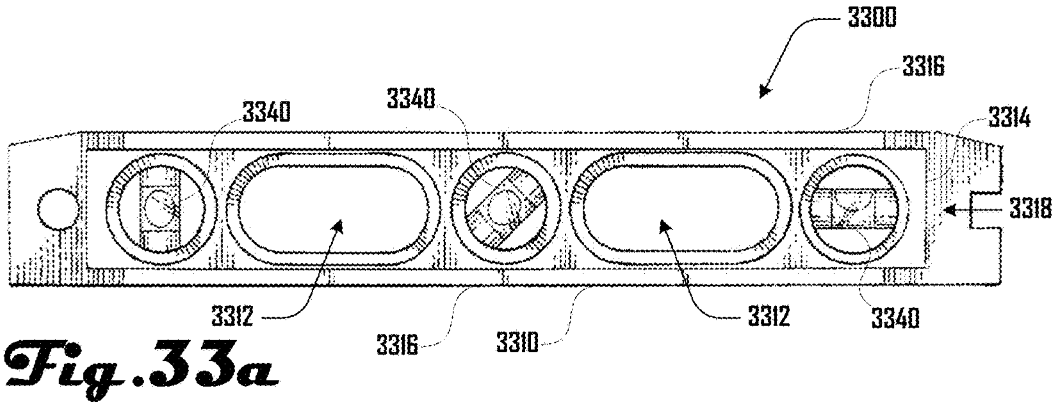
FIGS. 33*a*, 33*b* and 33*c* illustrate leveling devices in accordance with some embodiments.
Figure 33B:
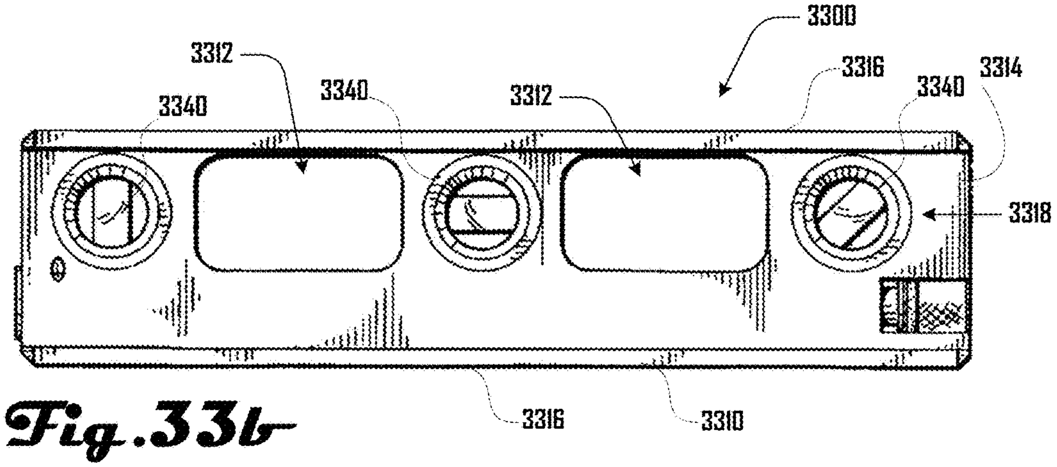
Figure 33C:
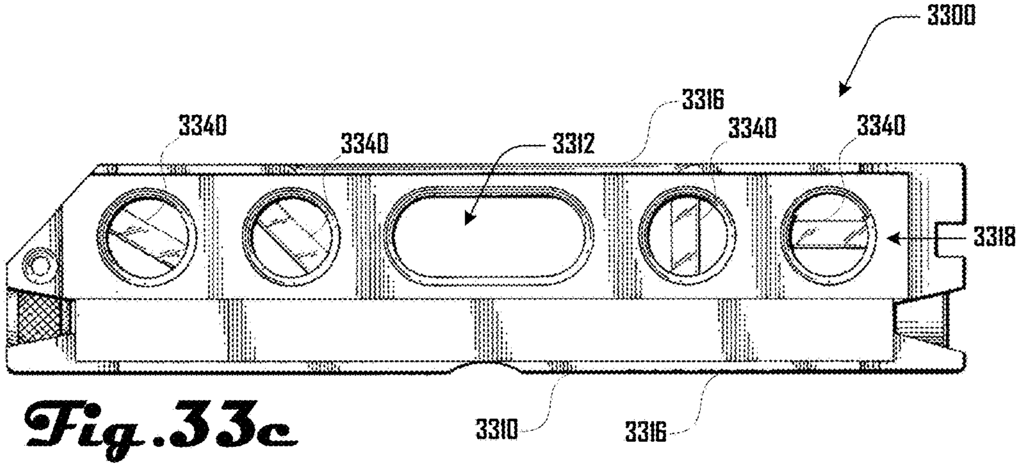

Turning to FIGS. 33*a-c,* 34*a,* 34*b,* 35*a,* 35*b,* 35*c,* 36*a,* and 36*b,* in a further aspect, the following disclosure relates to an aftermarket leveling and positioning system that is configured to couple with a bubble-level to provide enhanced capabilities to the bubble-level. For example, as illustrated in FIGS. 33*a,* 33*b* and 33*c,* embodiments of a bubble-level 3300 can include bubble level units 3340 that identify the level status of the level 3300 relative to various faces of the level body 3310.

However, such levels 3300 often lack electronic components that are configured to provide functionalities such as electronic sensing of position, orientation, level status, and the like as described herein. Additionally, such levels 3300 often lack electronic components configured for wireless communication and the like, which can include communication with user devices, other level systems, servers, or the like. In other words, many conventional levels are "dumb-levels" that lack various electronic functionalities that users desire.

Figure 35A:
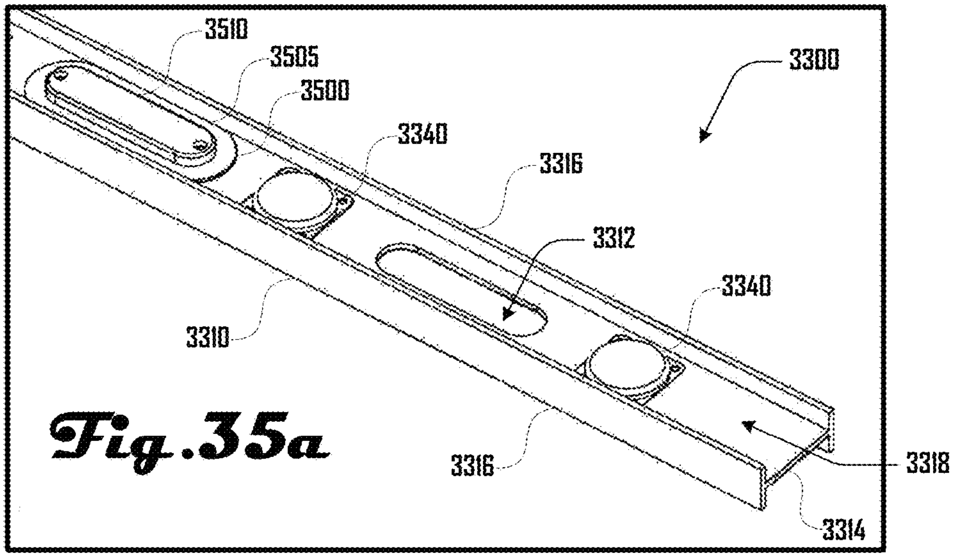
FIGS. 35*a*, 35*b*, 35*c*, 36*a* and 36*b* illustrate a leveling device in accordance with one embodiment.
Figure 35B:
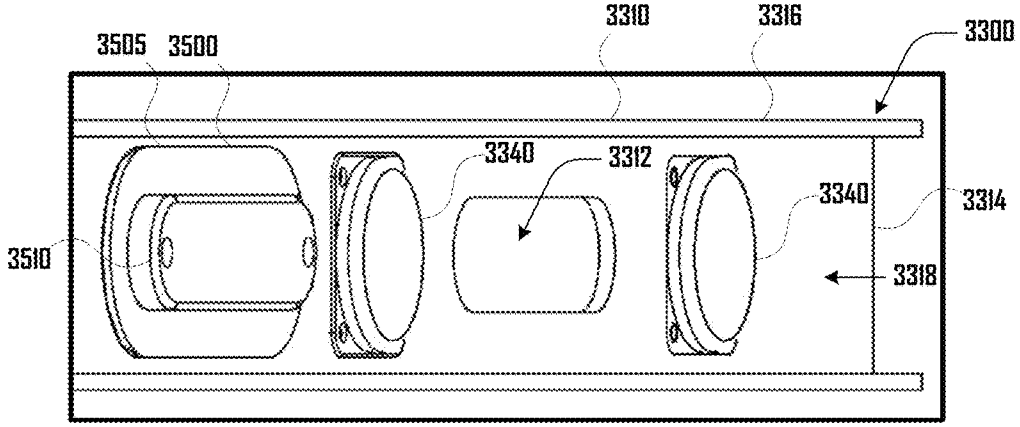
Figure 35C:
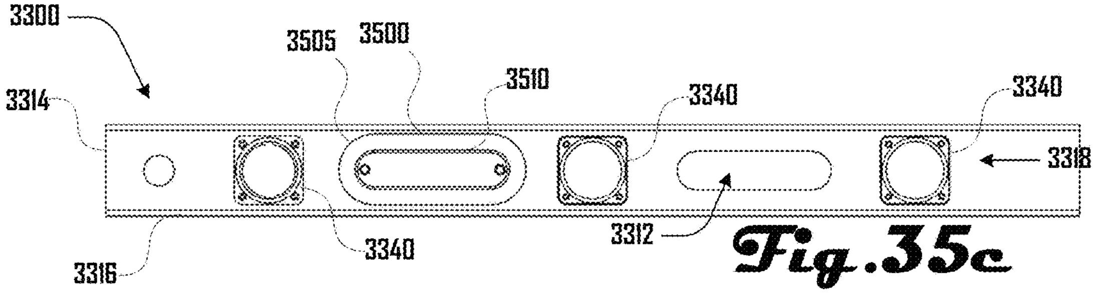
Figure 36A:
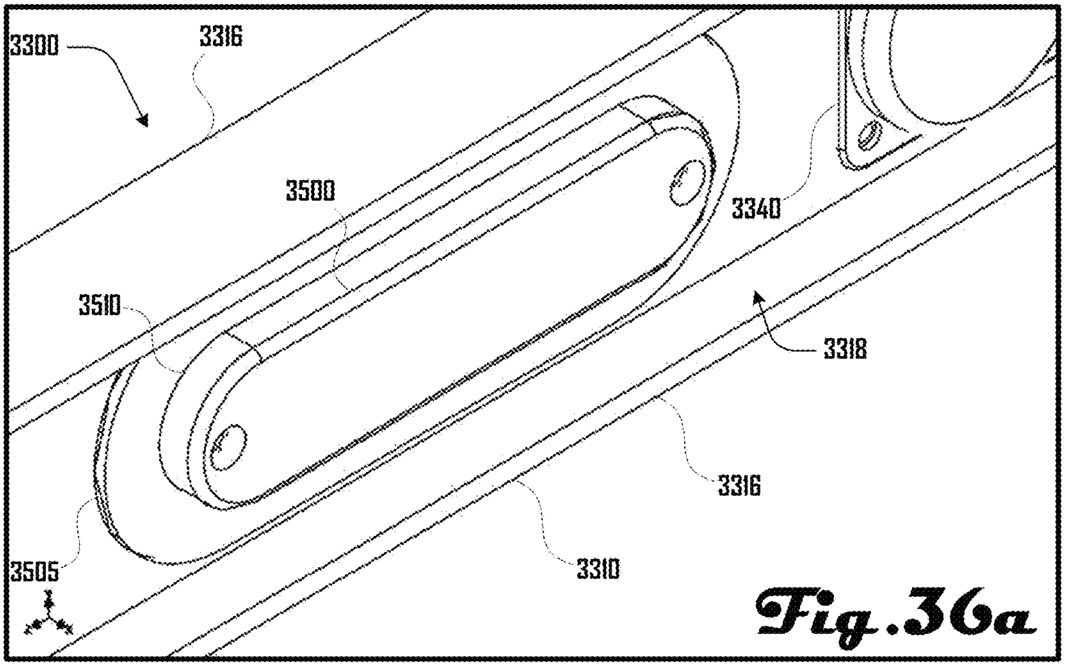
Figure 36B:
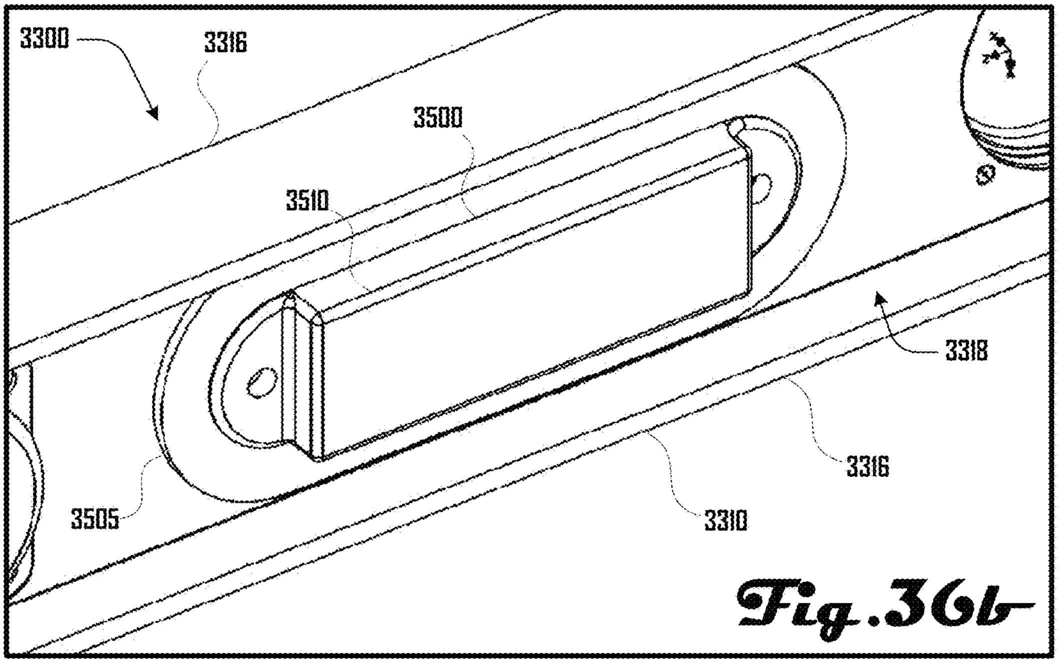

Accordingly, various embodiments described herein provide for a leveling system 3500 that can be coupled with a "dumb-level" to provide such functionalities (e.g., FIGS. 35*a,* 35*b,* 35*c,* 36*a,* and 36*b*). For example, various embodiments of a leveling system 3500 are configured to couple with standard features or structures of a conventional bubble level 35300. In further examples, the leveling system 3500 is configured to couple with a level 3300 that a user already has or that has been bought in a store. In other words, various embodiments of the leveling system 3500 can be configured to couple with commercially available bubble levels that lack electronic functionalities. This can be desirable because users can buy the leveling system 3500 to retrofit an existing level 3300 that the user has or buys regardless of the type or brand of level. Accordingly, a leveling system 3500 can convert a "dumb-level" into a "smart-level" and a plurality of leveling systems 3500 can convert a set of "dumb-levels" into a "smart-level" network where the smart levels are able to communicate and provide robust functionalities to users.

In further aspects of the present disclosure, a novel housing 3700 for a leveling system 3810 is illustrated, which can comprise one or more light bar 3820, 3830 configured to provide a leveling indication. In some example embodiments, as illustrated in FIGS. 37, 38, 39*a* and 39*b* such light bars 3820, 3830 can be integrally disposed within the housing 3700; however, in further embodiments, such a light bar 3820, 3830 can be configured to couple with and retrofit a "dumb-level" as discussed above. Accordingly, some embodiments of a light bar 3820, 3830 can be associated with the leveling system 3500 discussed above.

Leveling systems 3500, 3810 can provide a wide variety of electronic functionalities including leveling, positioning, networking and the like. Further examples of such functionalities are described in detail herein and any of the embodiments discussed below can comprise such functionalities in various suitable ways.

Figure 34A:
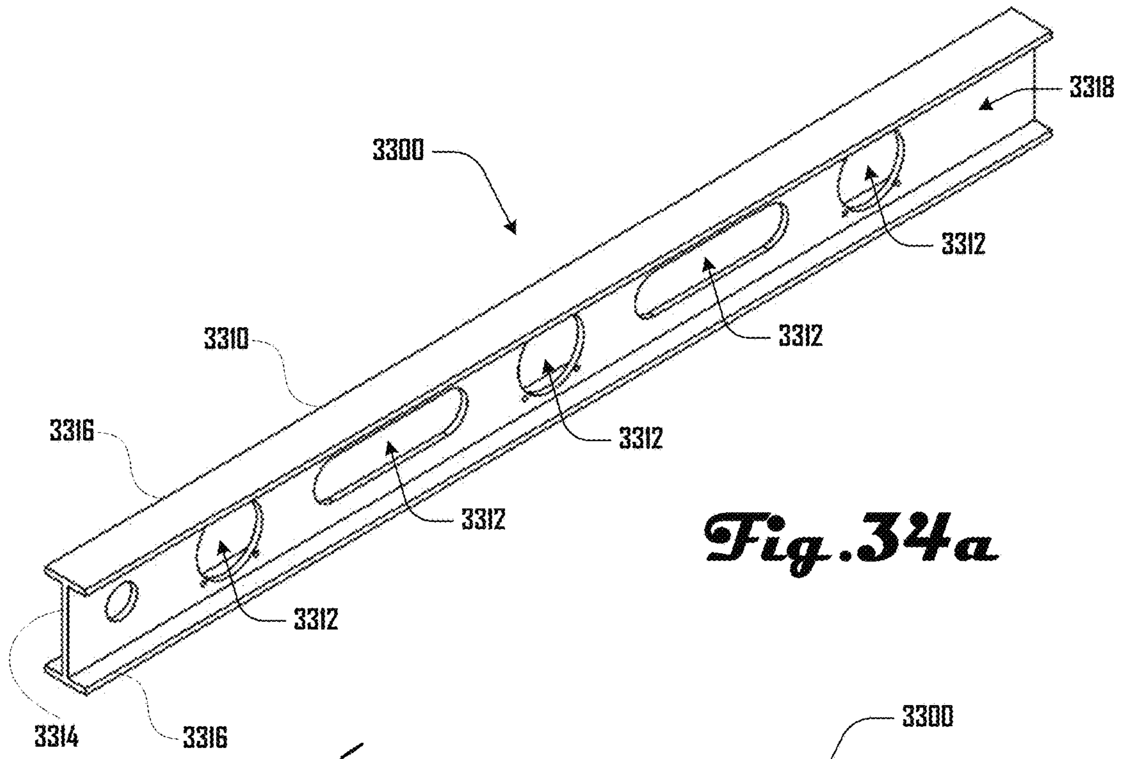
FIGS. 34*a* and 34*b* illustrate a leveling device having and H-shaped profile.
Figure 34B:
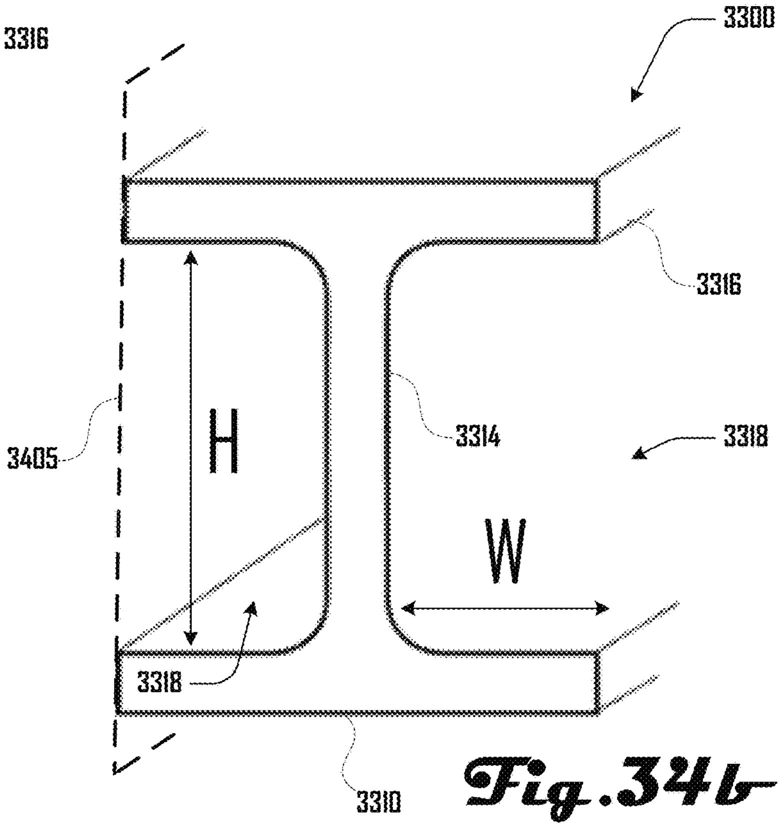

Returning to FIGS. 33*a,* 33*b,* 33*c,* 34*a* and 34*b,* a level 3300 can comprise a body 3310 that includes one or more orifices 3312 defined by a web 3314 of the body 3310. A pair of flanges 3316 can be disposed on opposing ends of the web 3314 in an "I" configuration where the flanges 3316 are disposed in parallel planes with the web 3314 disposed in a perpendicular plane. The web 3314 and flanges 3316 can define a first and second slot 3318, which as illustrated in FIG. 34*b* can have a width W defined by the distance between the web 3314 and an edge plane 3405 of the flanges 3316. The slots can also have a height H defined by a distance between respective flanges 3316.

As shown in FIGS. 33*a,* 33*b,* and 33*c,* a level 3300 can comprise one or more bubble level units 3340 that are configured to indicate the level status of the level 3300 relative to various faces of the level body 3310. In various embodiments, the level 3300 is without or lacking one or more functionalities or elements including a power source, networking capability, electronically identifying a level status, electronically identifying an orientation, electronically detecting a rotation, and the like. However, in some embodiments a level 3300 can comprise hardware or elements, including a laser, a speaker, a screen, a light indicator, or the like.

In various embodiments, a level 3300 can comprise one or more orifices 3312. For example, such orifices can be present in the level 3300 to reduce the weight of the level 3300 by having open spaces or holes within the web 3314 of the level body 3310. In some examples, such orifices 3312 can be in the shape of an oval or circle, but in further embodiments, such an orifice 3312 can be any suitable size and shape.

As illustrated in FIGS. 35*a,* 35*b,* 35*c,* 36*a* and 36*b,* a leveling system 3500 can be disposed within an orifice 3312. For example, FIGS. 35*a,* 35*b* and 35*c* illustrate a level comprising a first open orifice 3312 and a second orifice (not labeled) having a leveling system 3500 disposed therein. The leveling system 3500 can comprise a rim 3505 that surrounds the orifice 3312 and a level housing 3510 wherein leveling system components are disposed. In various embodiments, the size and shape of the rim 3505 and level housing 3510 can be configured to adapt to various sizes of orifices 3312, which can be desirable for providing compatibility with many types of levels 3300 available on the market.

In other words, where the leveling system 3500 is configured to be an aftermarket product that couples with and adds functionalities to “dumb-levels” or “semi dumb levels,” it can be desirable for the leveling system 3500 to be compatible with as many consumer leveling products as possible. Accordingly, the rim 3505 can be configured to fit within a slot 3318 defined by the flanges 3316 and web 3314 and also configured to completely or partially engage or surround the edges of an orifice 3312. For example, as illustrated in FIGS. 35*a,* 35*b* and 35*c,* the rim 3505 is illustrated having a length and width that is greater than the orifice 3312.

Similarly, the level housing 3510 can be configured to fit within an orifice 3312 and therefore can be sized to have dimensions that are less than or equal to the size of the orifice 3312. For example, in some embodiments the level housing 3510 can be configured to engage a portion of the level body 3310 that defines the orifice 3312 and/or can be configured to not engage a portion of the level body 3310 that defines the orifice 3312. In some embodiments, the level housing 3510 can be configured to reside within the slot 3318 and to not extend further than the edge planes 3405 of the flanges 3316 (FIG. 34*b*). In some embodiments, the level housing 3510 can be configured extend within one or both of the slots 3318.

The level housing 3510 and one or more rims 3505 can be configured to be coupled with the level body 3310 in various suitable ways. For example, in one embodiment, one or both of the level housing 3510 and rim 3505 can be coupled to a portion of the level body 3310 via an adhesive, weld, magnet, friction fit, or the like. In another embodiment a first and second rim 3505 can be disposed within opposing slots 3318 and engage the level housing 3510 such that the level housing is held within the orifice 3312.

In further embodiments, a leveling system 3500 can couple with a level 3300 in various other suitable ways. For example, in some embodiments, a leveling system 3500 can reside within one or both slots 3318 and can engage internal portions of the flanges 3316 that define the slot(s) 3318. In various embodiments wherein the leveling system 3500 is an aftermarket product, the leveling system 3500 can be configured to engage with slots 3318 of various sizes. For example, structures such as spring loaded feet, a deforming material, an adhesive, a magnet, or the like can be employed to couple a leveling system 3500 within different sizes of slots 3318.

In some embodiments, the leveling system 3500 can be self-calibrating. For example, when coupled with a level 3300 the nature of the coupling can be used to infer various leveling statuses relative to the level body 3310 such as being level to top faces of the flanges 3316, an edge plane of the flanges 205, ends of the level body 3310, or the like. However, in some embodiments, a user can calibrate the leveling system 3500 when coupled with a level.

For example, a method of calibrating a level system 3500 to a level 3300 can include coupling the level system 3500 to the level 3300, attaining a leveled status for a first bubble level 3340 of the level 3300 and indicating the first leveled status via a first input to the level system 3500. The method can further include attaining a leveled status for a second bubble level 3340 of the level 3300 and indicating the second leveled status via a second input to the level system 3500. The method can further include attaining a leveled status for a third bubble level 3340 of the level 3300 and indicating the third leveled status via a third input to the level system 3500.

In some embodiments, any of the first, second or third bubble level 3340 can be the same bubble level 3340. Additionally, in various embodiments, the inputs discussed above can comprise an indication of a leveled status relative to a portion of the level body 3310. For example, the user can indicate that the leveled status is associated with top faces of the flanges 3316, an edge plane of the flanges 3405, ends of the level body 3310, a leveled status of 45° degrees to such portions, or the like. Accordingly, in various embodiments, the level system 3500 can comprise various suitable input interfaces including one or more button, touch-screen, or the like. Additionally, the level system 3500 can comprise various indicators including a speaker, light, screen, or the like.

Figure 37:
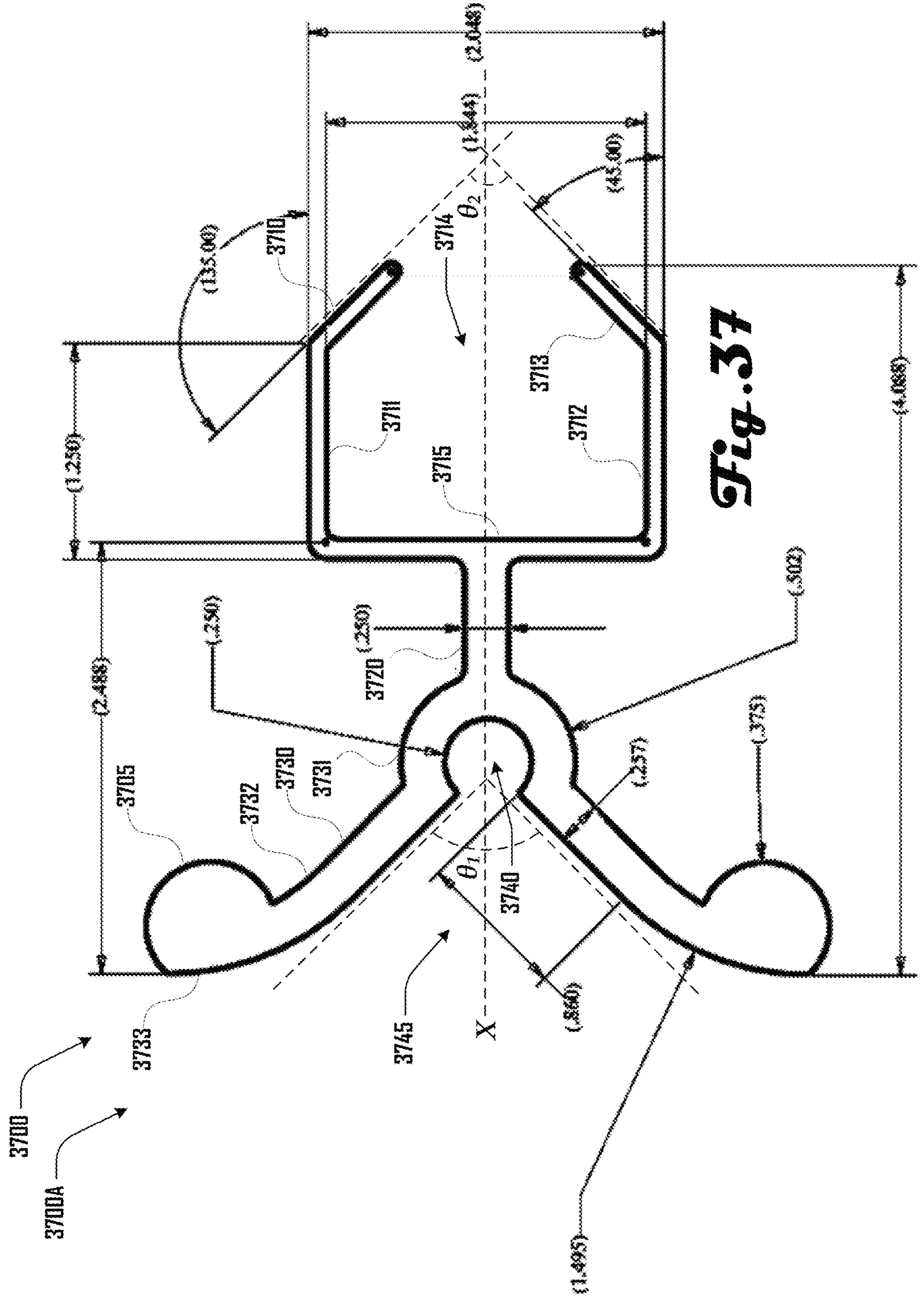
FIGS. 37, 38, 39*a* and 39*b* illustrate a leveling device in accordance with another embodiment.
Figure 38:
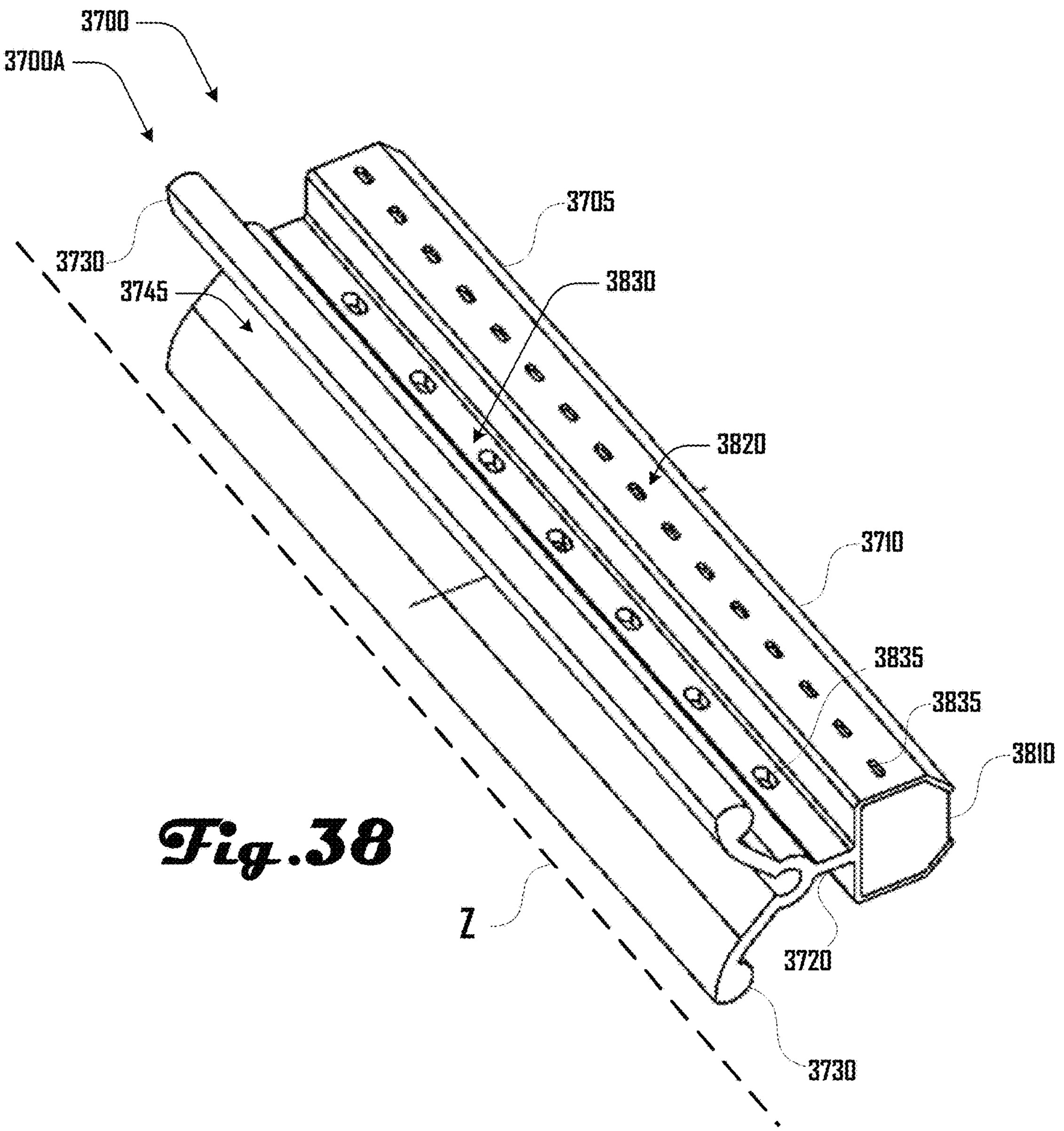
Figure 39A:
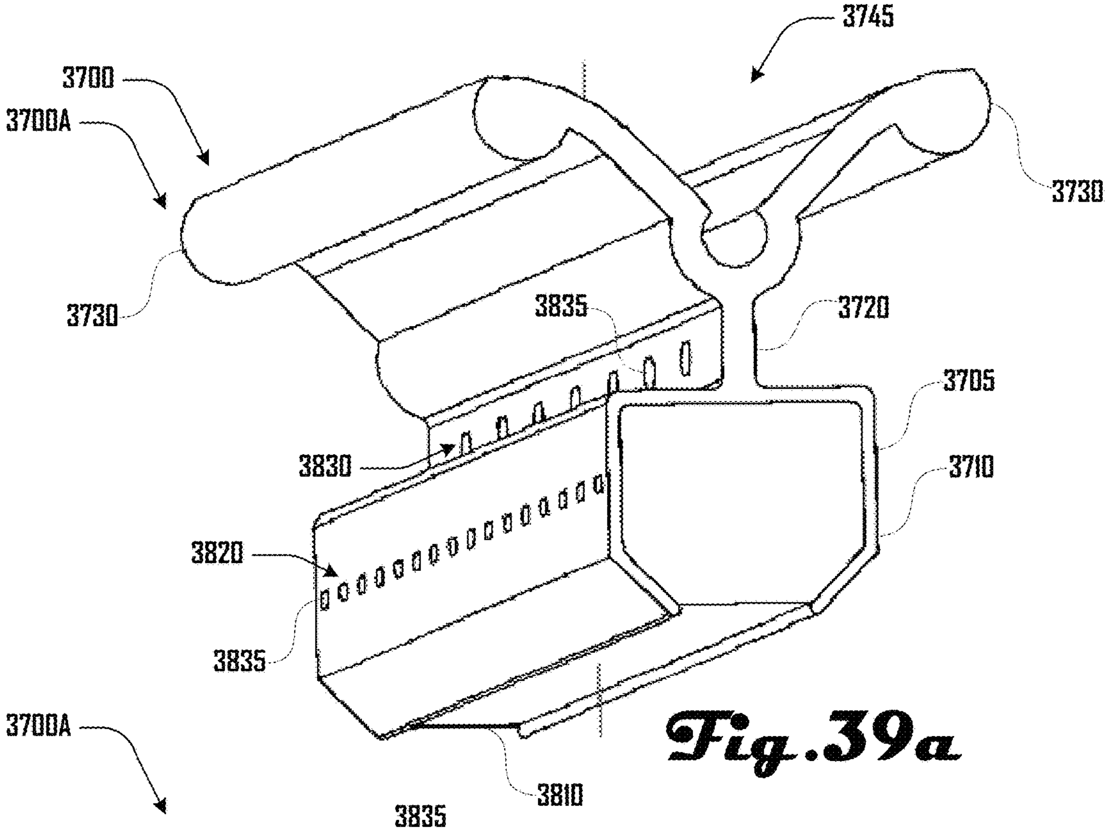
Figure 39B:
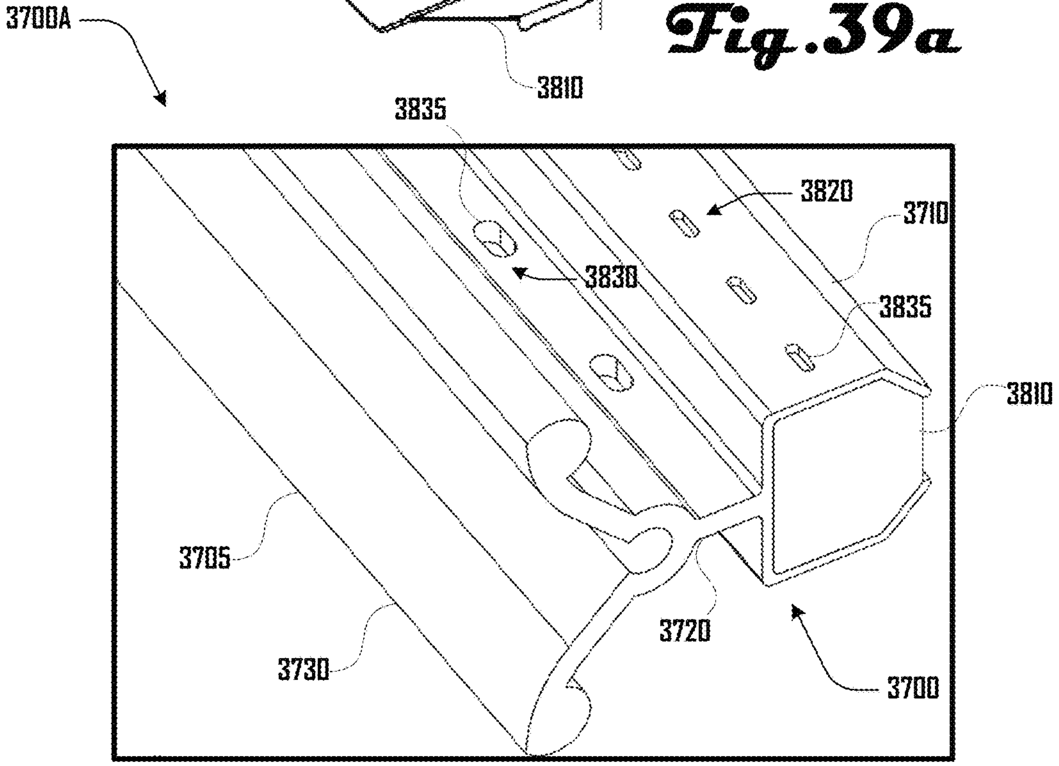
Figure 40:
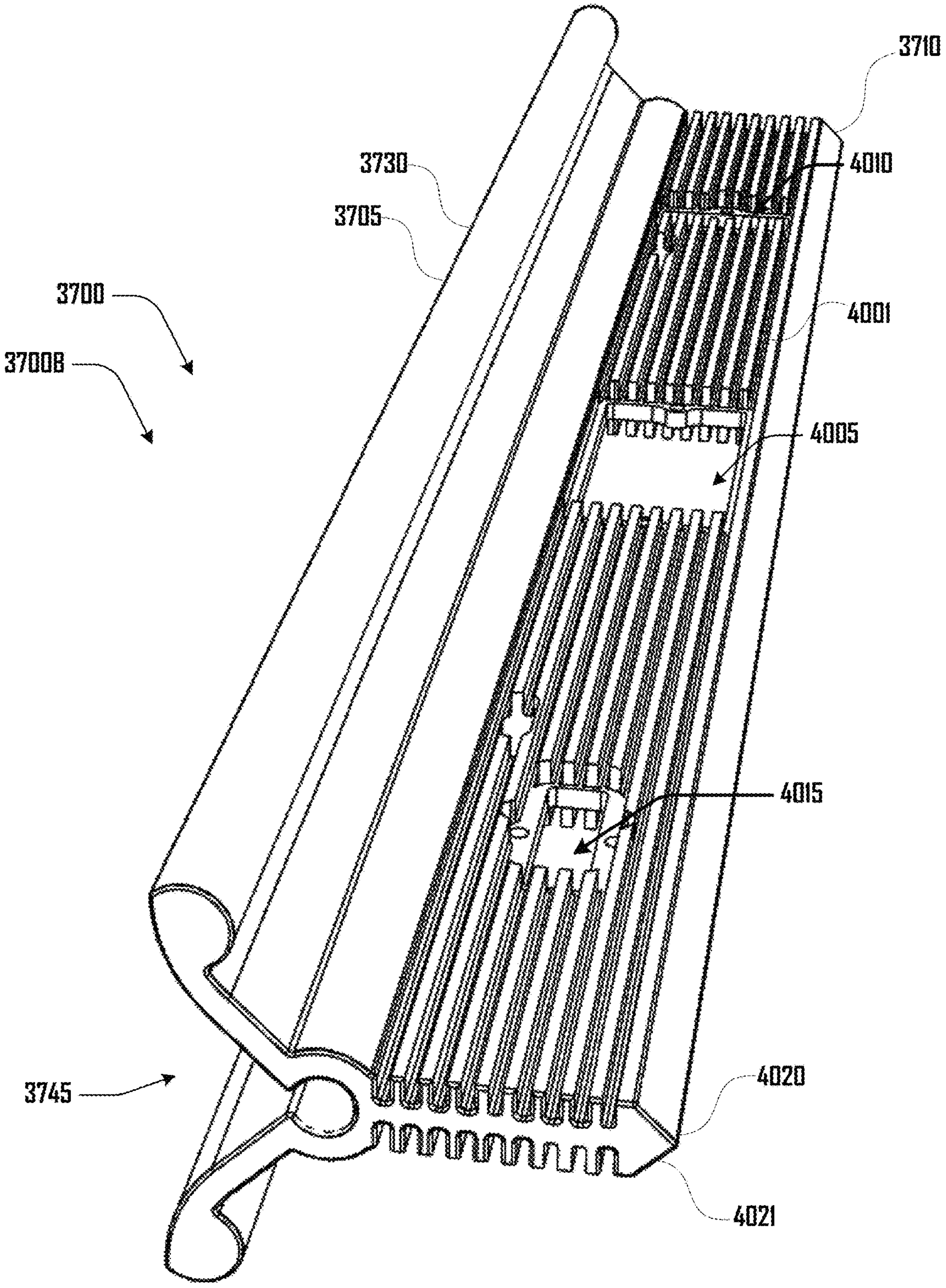
FIGS. 40, 41*a*, 41*b*, 42*a*, 42*b* and 42*c* illustrate a leveling device in accordance with a further embodiment.
Figure 41A:
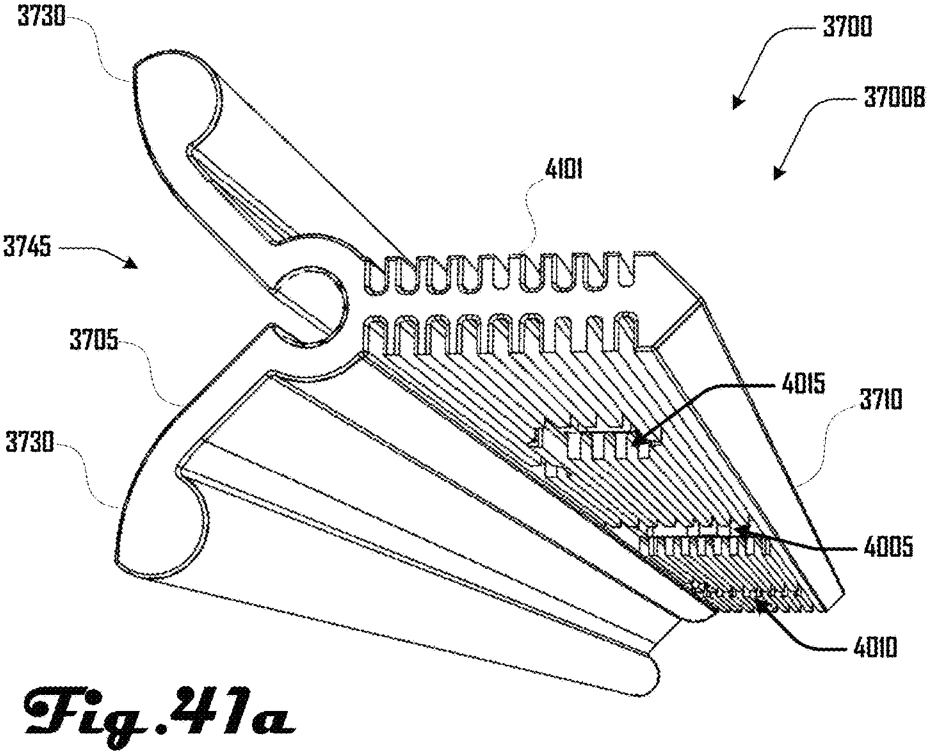
Figure 41B:
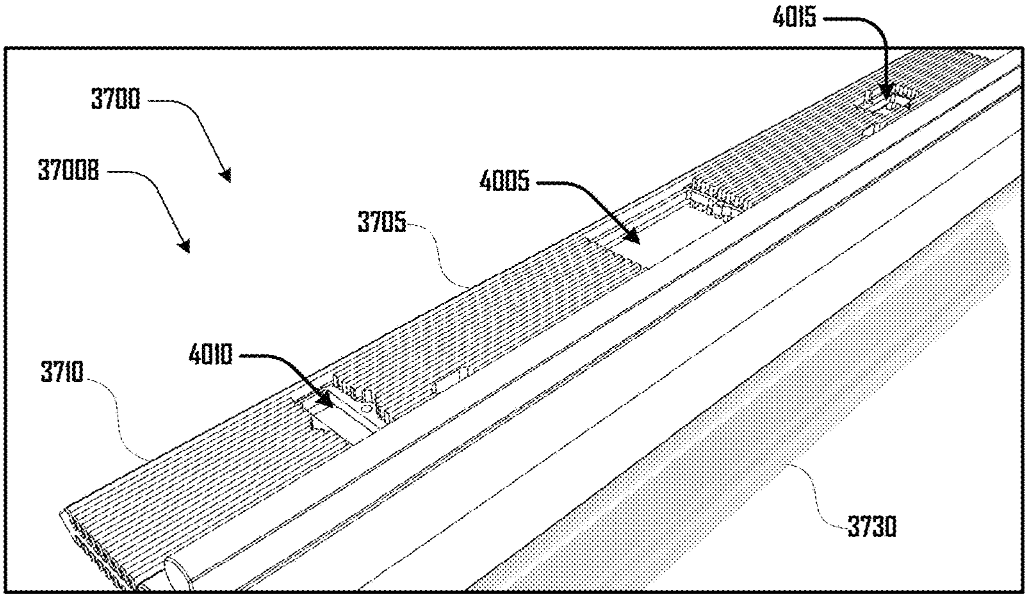
Figures 42A, 42B, 42C:
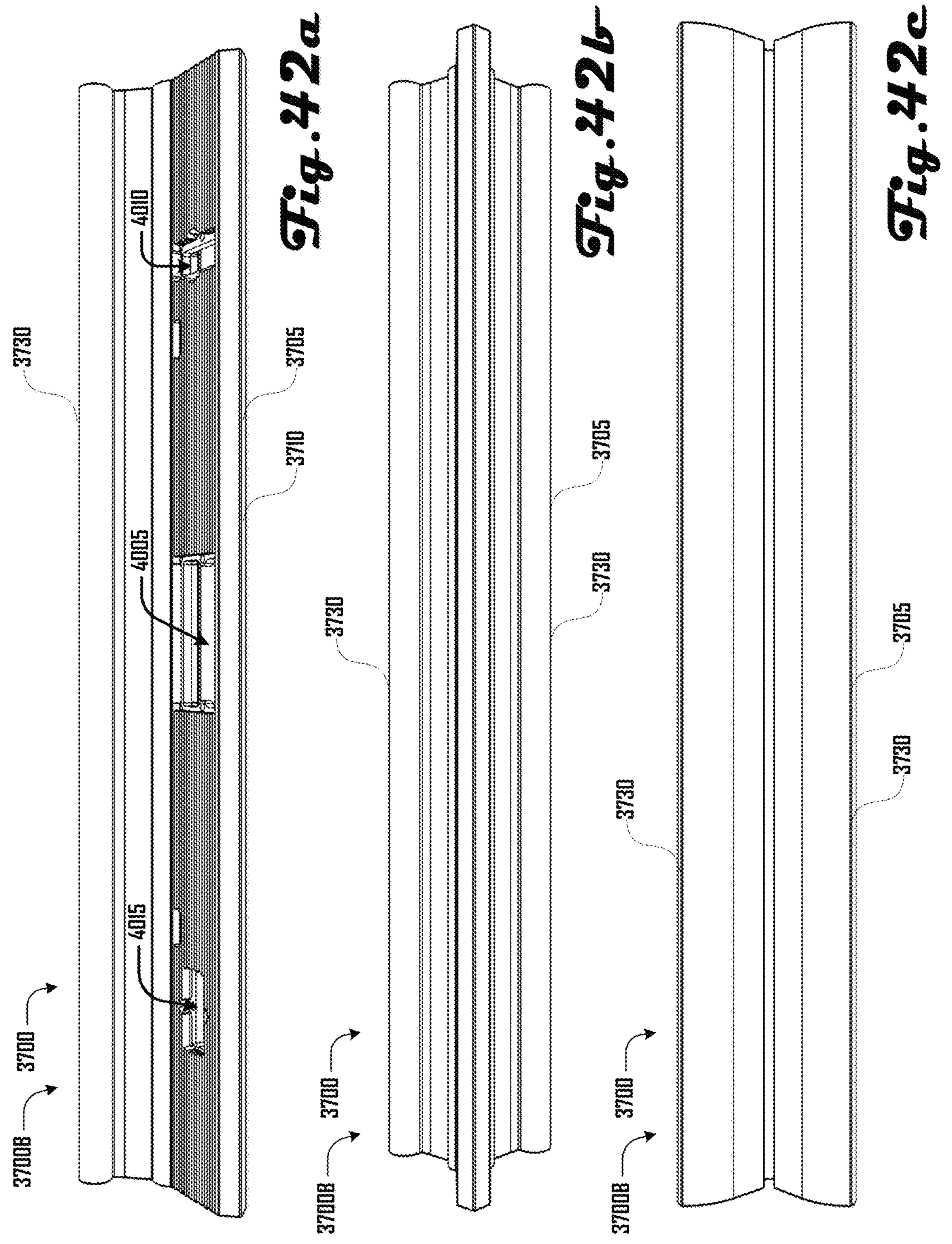

Turning to FIGS. 37, 38, 39*a* and 39*b,* a housing 3700 for a leveling system 3810 is disclosed, which can comprise one or more light bar 3820, 3830 configured to provide a leveling indication. The housing 3700 includes a housing body 3705 that defines shaft body 3710, with the shaft body being defined by a pair of arms 3711 that comprise an upper arm 3712 and arm tips 3713. The arms 3711 extend from a cap 3715 to collectively define a shaft 3714, in which a leveling system 3810 can be disposed as shown in FIGS. 38, 39*a* and 39*b.*

A neck 3720 extends from the cap 3715 and a pair of arms 3730 extend from the neck 3720. The arms 3730 comprise a base 3731 that extends to an arm shaft 3732 that extends to an arm head 3733. The arms 3730 define a channel 3740 that opposes the neck 3720, which opens into a coupling slot 3745 defined at least in part by the arms 3730.

Figure 45:
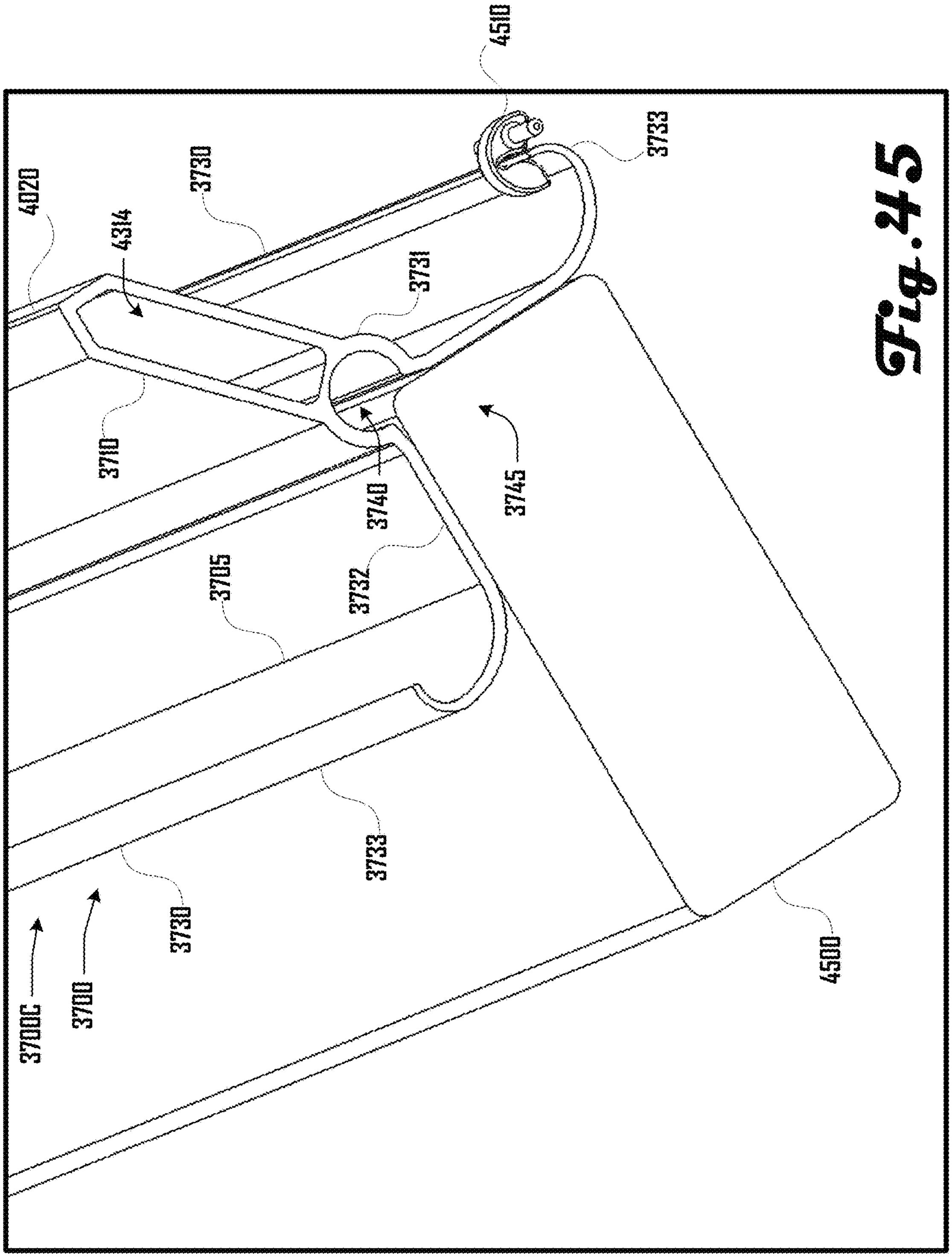
Figure 46:
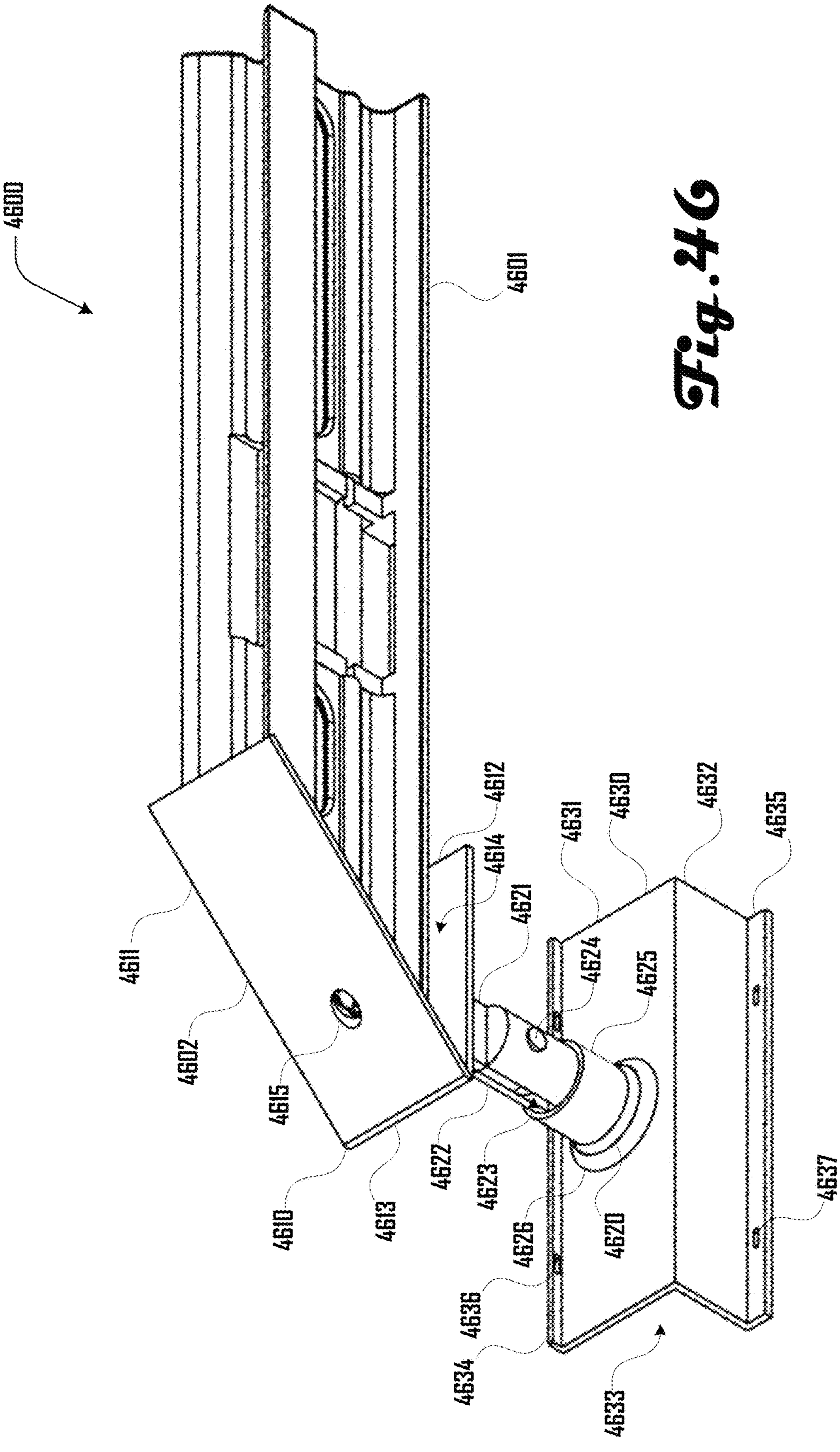
FIGS. 46, 47, 48, 49, 50, 51 and 52 illustrate various perspectives of a leveling device coupling assembly in accordance with an embodiment.
Figure 47:
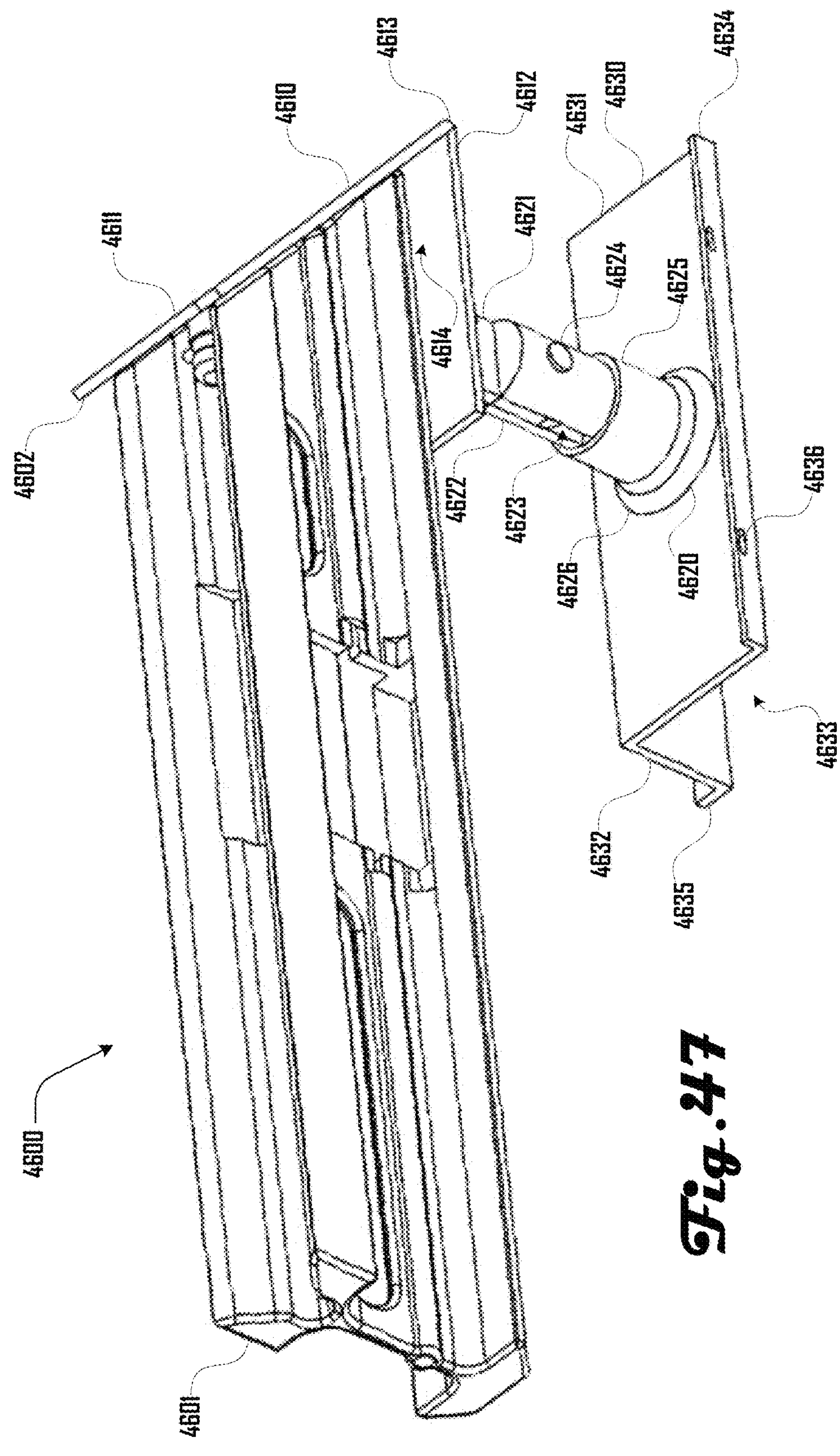

As shown in this example, internal faces of the arms 3730 can be planar and disposed relative to each other at angle $\theta_1$. In various embodiments, it can be desirable for angle $\theta_1$ to be substantially 90° such that the coupling slot 3745 can engage with 90° corners of a workpiece or other object (e.g., as illustrated in FIG. 45).

Additionally, shown in this example, the planes of the faces of the arms 3730 can intersect at, in or near the channel 3740 defined by the base 3731 of the arms. For example, in some embodiments the channel 3740 can comprise a circular C-shaped profile that opens into the coupling slot 3745 with planes of faces of the arms 3730 intersecting within the channel 3740. In one embodiment, such an intersection can be at the center of a circular portion that defines the channel 3740. In other words, such an intersection can have an equal radius from at least portion of the base(s) 3731 that define the channel 3740.

Additionally, in some embodiments the arm tips 3713 can include respective planar faces having planes that meet at angle $\theta_2$ as illustrated in FIG. 37. In some embodiments, angle $\theta_2$ can be substantially 90° such that the body 3710 can engage with 90° internal corners of a workpiece or other object. Accordingly in some embodiments, respective planar faces of the arm tips 3713 and arms 3730 can be parallel and disposed at an angle of 90°.

In various embodiments, the intersection of respective planar faces of the arm tips 3713 and arms 3730 can be disposed along a common axis X, which as shown in FIG. 37 defines a single axis of symmetry for the housing 3700. Although various example embodiments herein illustrate a housing 3700 having only one axis of symmetry X, further embodiment can have a plurality of axis of symmetry or may have no axis of symmetry.

Additionally, although a specific embodiment of a housing 3700 is illustrated in FIGS. 37, 38, 39*a* and 39*b*, and specific example dimensions and specifications of the housing 3700 are provided in FIG. 37, it should be clear that this is intended to illustrate only one of many embodiments of a housing 3700 that are within the scope and spirit of the present disclosure.

In various embodiments, the housing 3700 can be configured to act as a leveling body. In other words, the housing 3700 can be configured to engage with various objects to detect the level or position status of the object. For example, the housing 3700 can extend along axis Z as shown in FIG. 38 and comprise a beveled side which makes it possible to extend the level housing 3700 into a 90 deg. interior corner and flat portions can be configured to couple with various suitable surfaces. The housing 3700 can be made of various suitable materials and manufactured in various suitable ways. For example, in one embodiment, the housing 3700 can be made of extruded aluminum, which can be machined for hole placement and flatness.

As illustrated in FIGS. 38, 39*a* and 39*b*, some embodiments can comprise one or more light bar 3820, 3830, which can act as a level status indicator. For example, the level system 3810 can use visual cues of lights 3835 disposed along axis Z to indicate the level status of the housing 3700. In various embodiments, the lights 3835 can respond to visually mimic a tube filled with a liquid. For example, in one embodiment, as the angle changes off horizon or verticality, the light bar 3820, 3830 can reflect this change by its length (i.e., the number of lit lights 3835) to indicate the value of such a change. In one example, measuring verticality or perfect plumb can comprise a light column up to a mid-point or center. The display can be in real time and give the illusion of mass so the lights 3835 can slosh when the level housing alignment changes.

In further embodiments, level or position status can be indicated in various ways by a light bar 3820, 3830, including intensity of the lights 3835, color of the lights 3835, blinking, changing intensity, and the like. Further embodiments can include light bars 3820, 3830 disposed along any suitable axis and/or surface of a housing 3700. In a further embodiment, a light bar 3820, 3830 can be an aftermarket product which can be coupled with a "dumb-level" to provide enhanced leveling indications. For example, referring to the embodiments of FIGS. 35*a*, 35*b*, 35*c*, 36*a* and 36*b*, a light bar 3820, 3830 can be coupled to the level body 3310 and operably coupled with the leveling system 3500 such that output by the leveling system 3500 generates a display of leveling status via the light bar 3820, 3830. An aftermarket light bar 3820, 3830 can be coupled in various suitable locations on a level body 3310 including within the slot 3318, on a flange 3316 within the slot 3318, on the web 3314 within the slot 3318, or the like.

FIGS. 40, 41*a*, 41*b*, 42*a*, 42*b* and 42*b* illustrate another embodiment 3700B of a housing 3700. In this example, the neck 3720 can be absent and/or truncated and the shaft body 3710 can comprise a plurality of fins 4001 that extend in parallel along the length of the shaft body 3710. The shaft body 3710 can further define a plurality of hardware slots 4005, 4010, 4015 configured to hold various suitable hardware components as described herein. For example, any of the hardware slots 4005, 4010, 4015 can be configured to hold a portion of a leveling system 3500, 3810 a light bar 3820, 3830, or the like. Additionally, in further embodiments, portions of a leveling system 3500, 3810 a light bar 3820, 3830, or the like, can be disposed between fins 4001. For example, a light bar 3820, 3830 can be configured to be disposed between fins 4001. Such a leveling system 3500, 3810 can include any functionality, hardware or the like, of leveling systems disclosed herein.

Figure 43A:
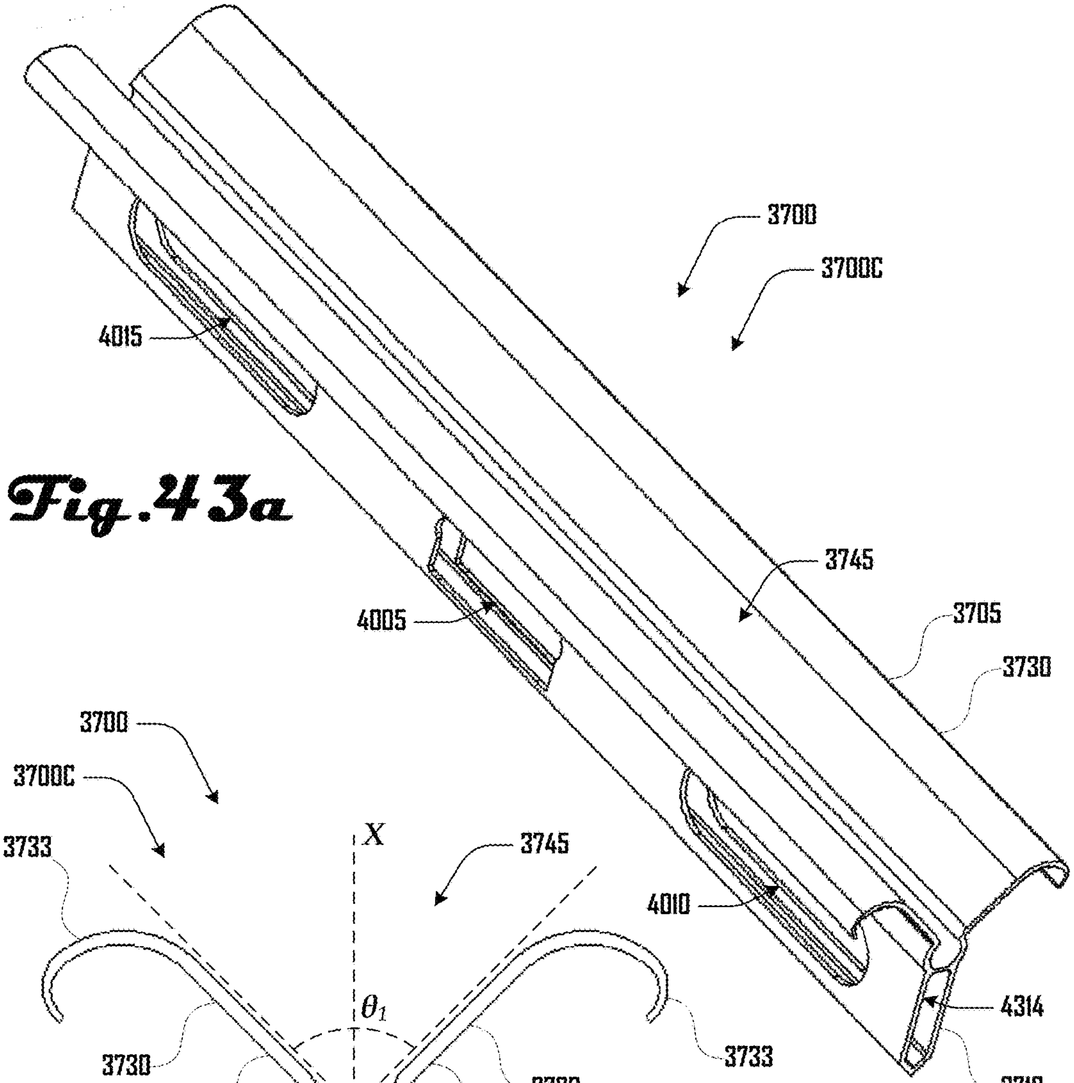
FIGS. 43*a* and 43*b* illustrate a leveling device in accordance with yet another embodiment.
Figure 43B:
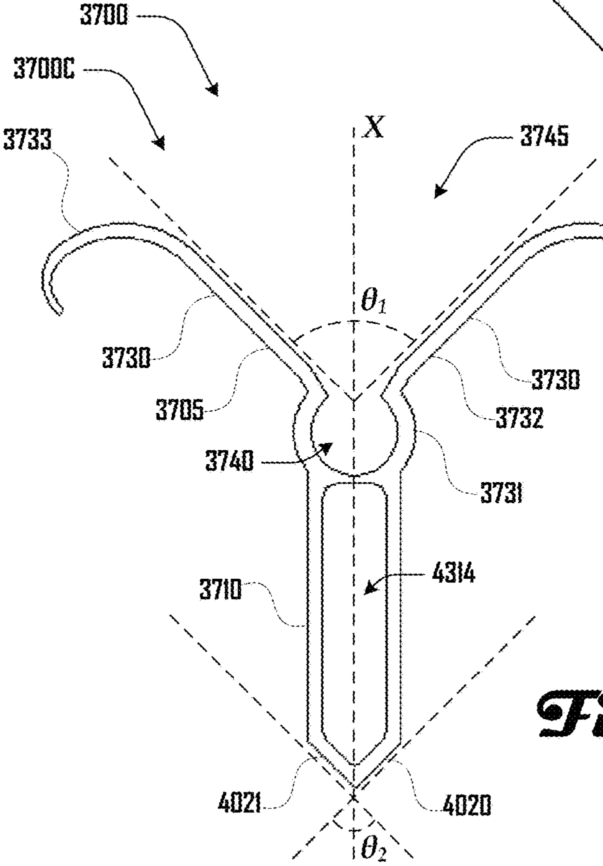

FIGS. 43*a*, 43*b* and 45 illustrate a further embodiment of a leveling device housing 3700 in accordance with a further embodiment 3700C. In this example embodiment 3700C, the housing 3700 includes an elongated housing body 3705 that defines cavity body 3710, with the cavity body 3710 defining a cavity 4314 and a tip 4020, which can comprise a pair of planar faces 4021. In various embodiments, a suitable leveling system (as described in detail above) can be disposed within the cavity 4314.

A pair of arms 3730 extend from the cavity body 3710 that comprise a base 3731 that extends to an arm shaft 3732 that extends to an arm head 3733. The arms 3730 define a channel 3740 that opposes the cavity body 3710, which opens into a coupling slot 3745 defined at least in part by the arms 3730.

As shown in this example, internal faces of the arms 3730 can be planar and disposed relative to each other at angle $\theta_1$. In various embodiments, it can be desirable for angle $\theta_1$ to be substantially 90° such that the coupling slot 3745 can engage with 90° corners of a workpiece 4500 or other object (e.g., as illustrated in FIG. 45).

Additionally, as shown in this example, the planes of the faces of the arms 3730 can intersect at in or near the channel 3740 defined by the base 3731 of the arms. For example, in some embodiments the channel 3740 can comprise a circular C-shaped profile that opens into the coupling slot 3745 with planes of faces of the arms 3730 intersecting within the channel 3740. In one embodiment, such an intersection can be at the center of a circular portion that defines the channel 3740. In other words, such an intersection can have an equal radius from at least portion of the base(s) 3731 that define the channel 3740.

Additionally, in some embodiments the planar faces 4021 of the tip 4020 can meet at angle $\theta_2$as illustrated in FIG. 43*b*. In some embodiments, angle $\theta_2$ can be substantially 90° such that the tip 4020 can engage with 90° internal corners of a workpiece or other object. Accordingly in some embodiments, respective planar faces of the tip 4020 and arms 3730 can be parallel and disposed at an angle of 90°.

In various embodiments, the intersection of respective planar faces of the tip 4020 and arms 3730 can be disposed along a common axis X, which as shown in FIG. 43*b* defines a single axis of symmetry for the housing 3700. Although various example embodiments herein illustrate a housing 3700 having only one axis of symmetry X, further embodiment can have a plurality of axis of symmetry or may have no axis of symmetry.

As shown in FIG. 43*a* the housing 3700 can comprise a plurality of slots 4005, 4010, 4015, defined by the cavity body 3710, which expose a portion of the cavity 4315. In various embodiments, suitable leveling components or portions of a leveling system as described herein can be disposed in the slots 4005, 4010, 4015. Such leveling components or portions of a leveling system can include computer/electronic components or non-computer/electronic components such as a bubble level.

Figure 44A:
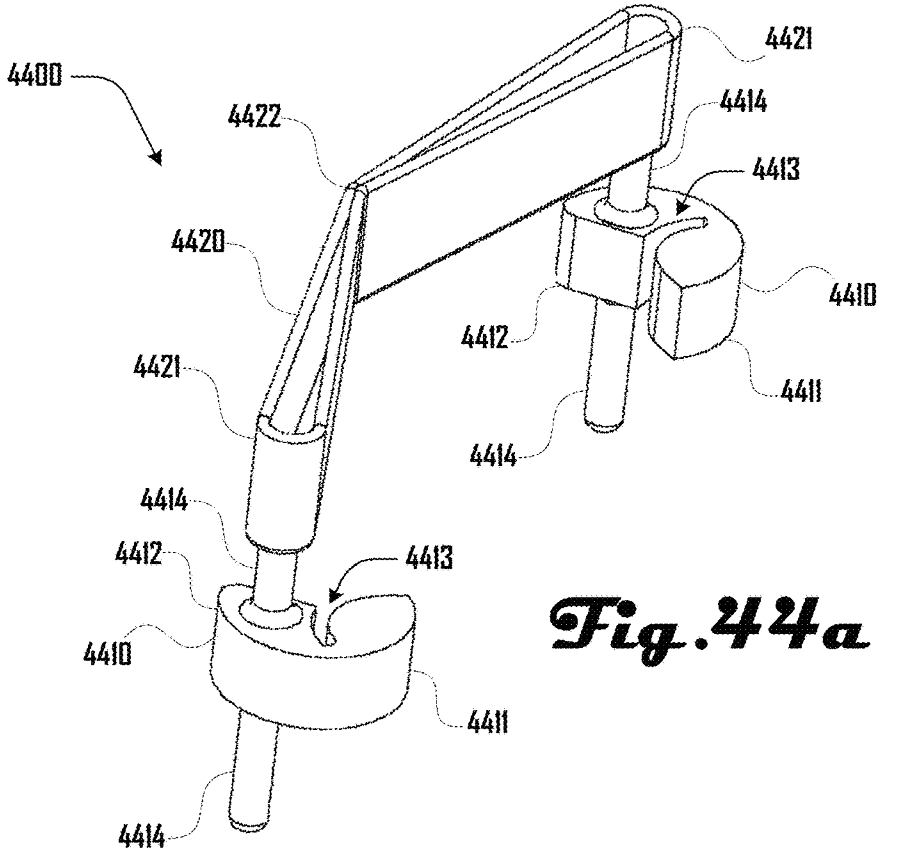
FIGS. 44*a*, 44*b* and 45 illustrate a buckle assembly and portions thereof in accordance with an embodiment.
Figure 44B:
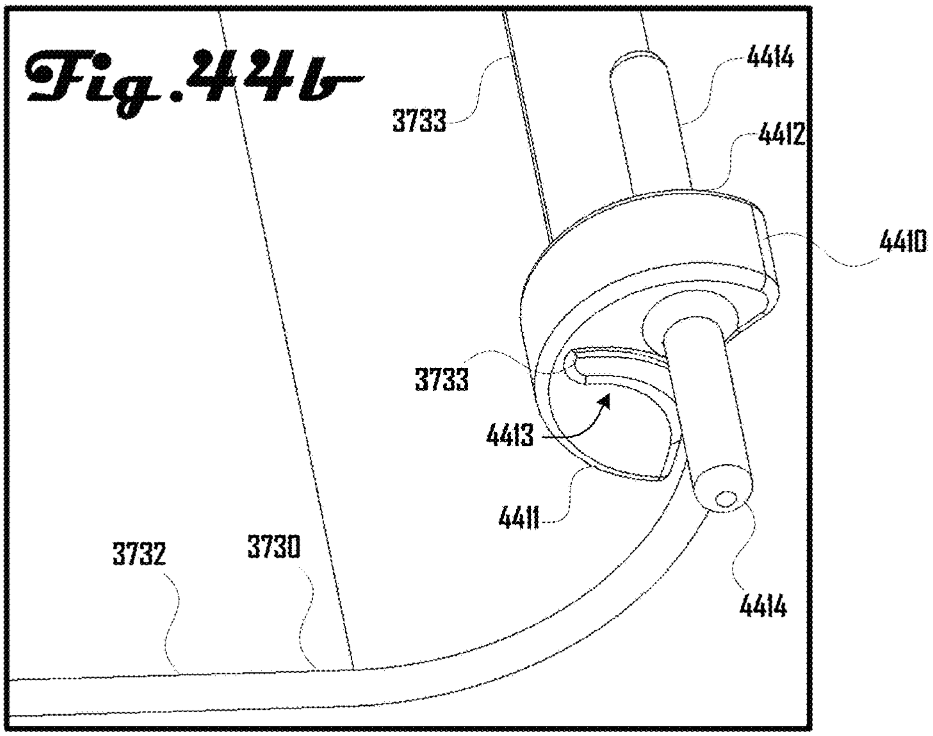

Turning to FIGS. 44*a*, 44*b* and 45, a buckle assembly 4400 is shown which includes a first and second tip-coupler 4410, which are joined by a band 4420 that spans between the tip couplers 4410. The tip couplers 4410 comprise first and second body portions 4411, 4412, which are separated by a coupling slot 4413. In this example, a pair of bars 4414 extend from the second body portion 4412 along a shared axis, which can be perpendicular to faces of the body portions 4411, 4412 and parallel to faces of that define the coupling clot 4413.

As shown in FIGS. 44*b* and 45, the coupling slot 4413 can be configured to correspond to the shape of an end of the arm heads 3733 of the arms 3730 of a housing 3700. For example, as shown in the embodiment 7300C of FIGS. 43*a*, 43*b*, 44*a*, 44*b* and 45, the coupling slot 4413 can be configured to correspond to arm heads 3733 that curl downward toward cavity body 3710.

However, the coupling slot 4413 can be configured to couple with various suitable shapes, sizes and designs of arm heads 3733. For example, as illustrated in the embodiment 3700A of FIGS. 37, 38, 39*a* and 39*b* and the embodiment 3700B of FIGS. 40, 41*a*, 41*b* and 42*a-c*, the arm heads 3733 can be rounded and bulbous in some embodiments and the coupling slot 4413 can be configured to couple with such a configuration.

As illustrated in FIG. 44*a*, a pair of tip-couplers 4410 can be joined via the band 4420, which includes looped ends 4421 configured to couple with the bars 4414 of tip-couplers 4410. The band 4420 can also comprise a seam 4422 between the ends 4421, which joins sides of the band 4420 along a length. The band 4420 can comprise any suitable material, which can include rubber, elastic, a plastic, or the like. Accordingly, in various embodiments, the band 4420 can be elastic.

In various embodiments, the buckle assembly 4400 can be used to secure a leveling device housing 3700 to a workpiece (or secure a workpiece to a leveling device housing 3700). For example, as shown in FIG. 45, a workpiece 4500 can be positioned within the coupling slot 3745 abutting the arms 3730, and tip-couplers 4410 can be coupled on opposing arm heads 3733 of the housing 3700 and a band 4420 (FIG. 44*a*) can be coupled to respective arms 4414 of the tip-couplers 4410 such that the band 4420 surrounds and holds the workpiece 4500. FIG. 45 illustrates an example step where a single tip-coupler 4410 is coupled to a first arm head 3733 and before a second tip-coupler 4410 is coupled to a second arm head 3733 and a band 4420 attached to the tip-couplers 4410.

FIGS. 46, 47, 48, 49, 50, 51 and 52 illustrate various perspectives of a leveling device coupling assembly 4600 in accordance with an embodiment, which comprises a leveling device 4601 and a leveling device coupler assembly 4602. In various embodiments, the leveling device 4601 can comprise any suitable leveling device, or the like as described herein, or as described in any application incorporated herein by reference, including U.S. provisional Application No. 62/569,263, filed Oct. 6, 2017.

As shown in the example embodiment of FIGS. 46-52, the leveling device coupler assembly 4602 can comprise a coupling head 4610 that includes a top plate 4611 and a base plate 4612 that are coupled along an edge 4613. The top and base plates 4611, 4612 can define a coupling slot 4614, in which the leveling device 4601 can couple with the coupling head 4610 of the leveling device coupler assembly 4602. For example, in the embodiment of FIGS. 46-52, the top and base plates 4611, 4612 can comprise planar plates coupled at the edge 4613 to define an angle therebetween that is less than or equal to 90 degrees and greater than or equal to 0 degrees. However, in further examples, any other suitable coupling head 4610 can be configured for coupling with various configurations of leveling devices 4601, so the example embodiment of FIGS. 46-52 should not be construed as limiting on the wide variety of coupling heads that are within the scope and spirit of the present disclosure.

Additionally, the top plate 4611 can define a beam port 4615, which can comprise a hole in the top plate 4611 that allows a laser or other beam to pass through the top plate 4611. For example, where the leveling device 4601 projects a laser to indicate a level position or status, the beam port 4615 allows such a laser to project though the top plate 4611 while the leveling device 4601 is coupled with the leveling device coupler assembly 4602.

The coupling head 4610 can be coupled to a joint assembly 4620. For example, a tongue 4621 can extend from the base plate 4612 and be rotatably held within a slot 4623 defined by a joint shaft 4622, with the tongue 4621 being rotatably coupled to the joint shaft 4622 via a pin 4624. The joint assembly 4620 can further comprise a joint base 4620 coupled to the joint shaft 4622, which can include shaft coupling cylinder 4625 and a foot rim 4626.

The joint assembly 4620 can be coupled to a base coupler 4630, which can include a coupler top plate 4631 and a coupler sidewall plate 4632, which extends from the coupler top plate 4631 and defines a coupling slot 4633. For example, as shown in FIGS. 46-52, the coupling slot can be at a 90 degree angle, which can be desirable for the base coupler 4630 coupling with 90 degree edges of dimensional lumber, metal beams, corners of a room, corners of a building, or the like.

However in further embodiments, the base coupler 4630 can have various other suitable configurations or shapes, which may be desirable for coupling with various other locations, articles, structures, surfaces or the like. For example, a base coupler can be configured for coupling with flat surfaces (e.g., the ground, a wall, a face of dimensional lumber, a face of a metal beam, and the like), rounded surfaces (e.g., pipes, and the like), irregular surfaces (e.g., via a tripod, monopod, stake, or the like), or other desirable locations, articles, structures, surfaces or the like. Accordingly, the example of a base coupler 4630 defining a coupling slot 4633 having a 90 degree angle should not be construed to be limiting on the wide variety of base couplers that are within the scope and spirit of the present disclosure.

Additionally, the coupler top plate 4631 is shown comprising a first rim 4634 comprising first coupling holes 4636 and the coupler sidewall plate 4635 is shown comprising a second rim 4635 comprising second coupling holes 4637. In various examples, the first and second coupling holes 4636, 3637 can be configured for engaging with straps, cords, rope, or the like, which can be used to couple the base coupler 4630 to various objects. For example, where the base coupler 4630 engages with a 90 degree edge of a beam, the straps can wrap around the beam and engage with the first and second coupling holes 4636, 3637 to secure the base coupler 4630 to the beam. In various embodiments, such straps, or the like can include magnetic coupling straps as discussed in U.S. provisional Application No. 62/569,263, filed Oct. 6, 2017, which is incorporated herein.

In various embodiments, the joint assembly 4620 can be configured for movement of the coupling head 4610 relative to the coupling base 4630 and where a leveling device 4601 is coupled with the coupling head 4610, movement of the leveling device 4601 relative to the coupling base 4630. For example, the joint assembly 4620 can provide for rotation about the pin 4624 and rotation about the shaft coupling cylinder 4625 and/or foot rim 4626 (see. e.g., FIGS. 49, 50 and 52). In various examples, the rotatable coupling associated with the the shaft coupling cylinder 4625 and/or foot rim 4626 can provide for 360 degree rotation. In some examples the shaft coupling cylinder 4625 and foot rim 4626 can rotate relative to each other. In some examples, the joint shaft 4622 can rotate within the shaft coupling cylinder 4625. In some examples, the tongue 4621 can have limited range of motion within the slot 4623, including 180 degrees or less, based at least in part on the configuration of the shaft coupling cylinder 4625, joint shaft 4622, or the like.

Additionally, while one example joint assembly 4620 is shown in FIGS. 46-52, alternative configurations are within the scope and spirit of the present disclosure. For example, a joint assembly can be coupled to the coupling head 4610 and coupling base 4630 in an opposite manner (e.g., with the lounge 4621 extending from the coupling base 4630. Additionally, one or more suitable rotatable coupling providing any suitable number of degrees of freedom can also be present in further embodiments.

Figure 53:
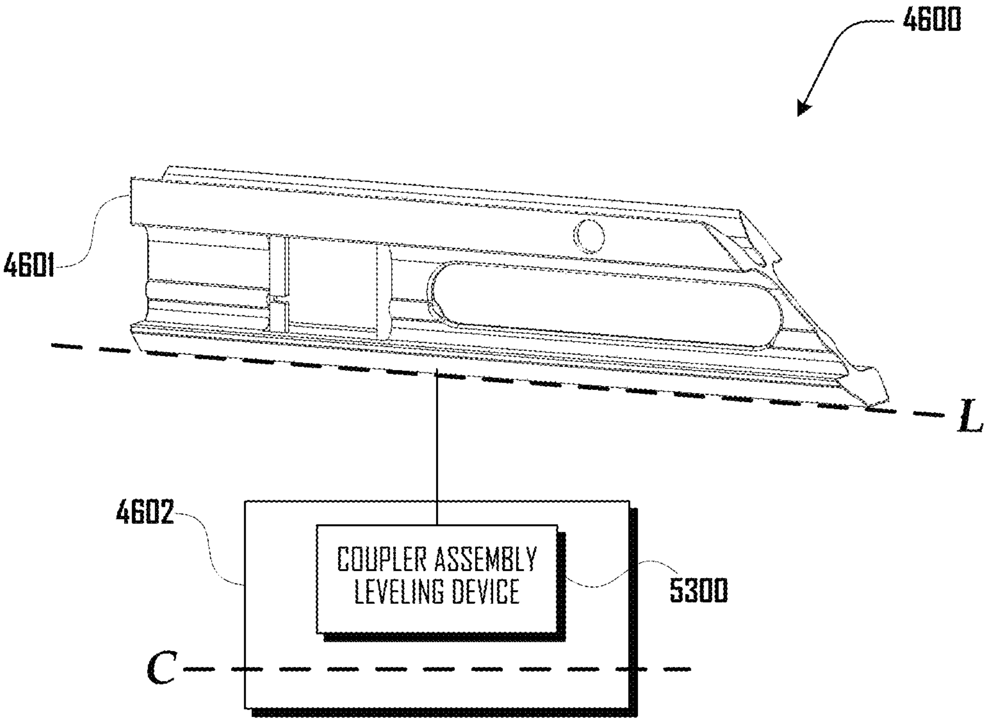
FIG. 53 illustrates a leveling device coupling assembly network in accordance with an embodiment.

Turning to FIG. 53, a network diagram of a leveling device coupling assembly 4600 of one embodiment is illustrated, which comprises a leveling device 4601 and a leveling device coupler assembly 4602. The leveling device coupler assembly 4602 further comprises a coupler assembly leveling device 5300, which can have any of the leveling and/or positioning capabilities of a leveling device, or the like as discussed herein and in documents incorporated herein by reference. Any such features can be present or absent in any suitable configuration. Accordingly, the coupler assembly leveling device 5300 can be a simple or complex device that has or lacks any features or capabilities as discussed.

As shown in FIG. 53, the leveling device 4601 can be operably connected to the coupler assembly leveling device 5300, via a wired and/or wireless communication channel, which can include Bluetooth, near-field communication, a wired connection, Wi-Fi connection, or the like. In various embodiments, the coupler assembly leveling device 5300 can be configured to communicate leveling and/or positioning data with the leveling device 4601, such that the leveling device 4601 can detect or sense a level and/or position status of an object associated with the leveling device coupler assembly 4602.

Figure 48:
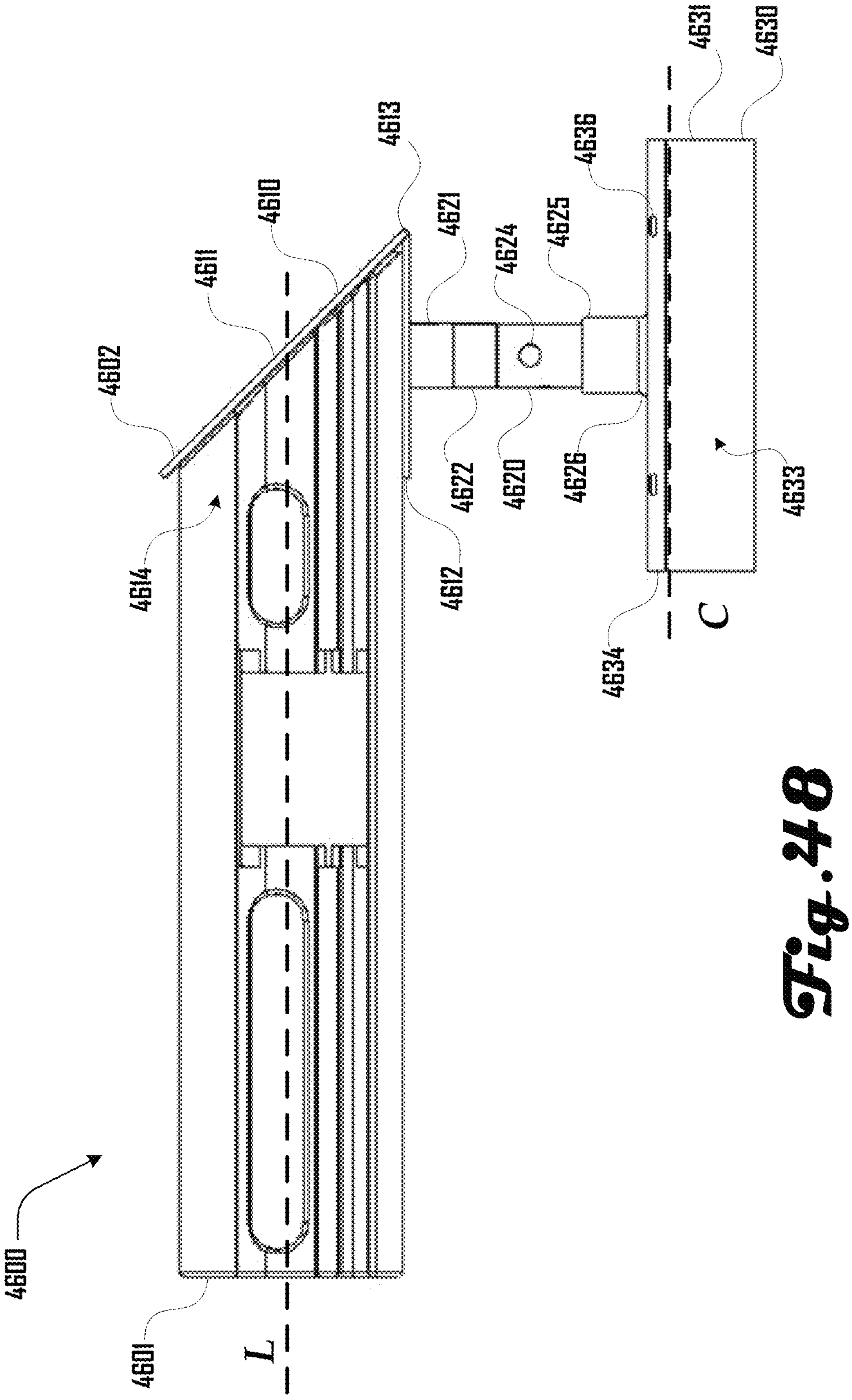
Figure 49:
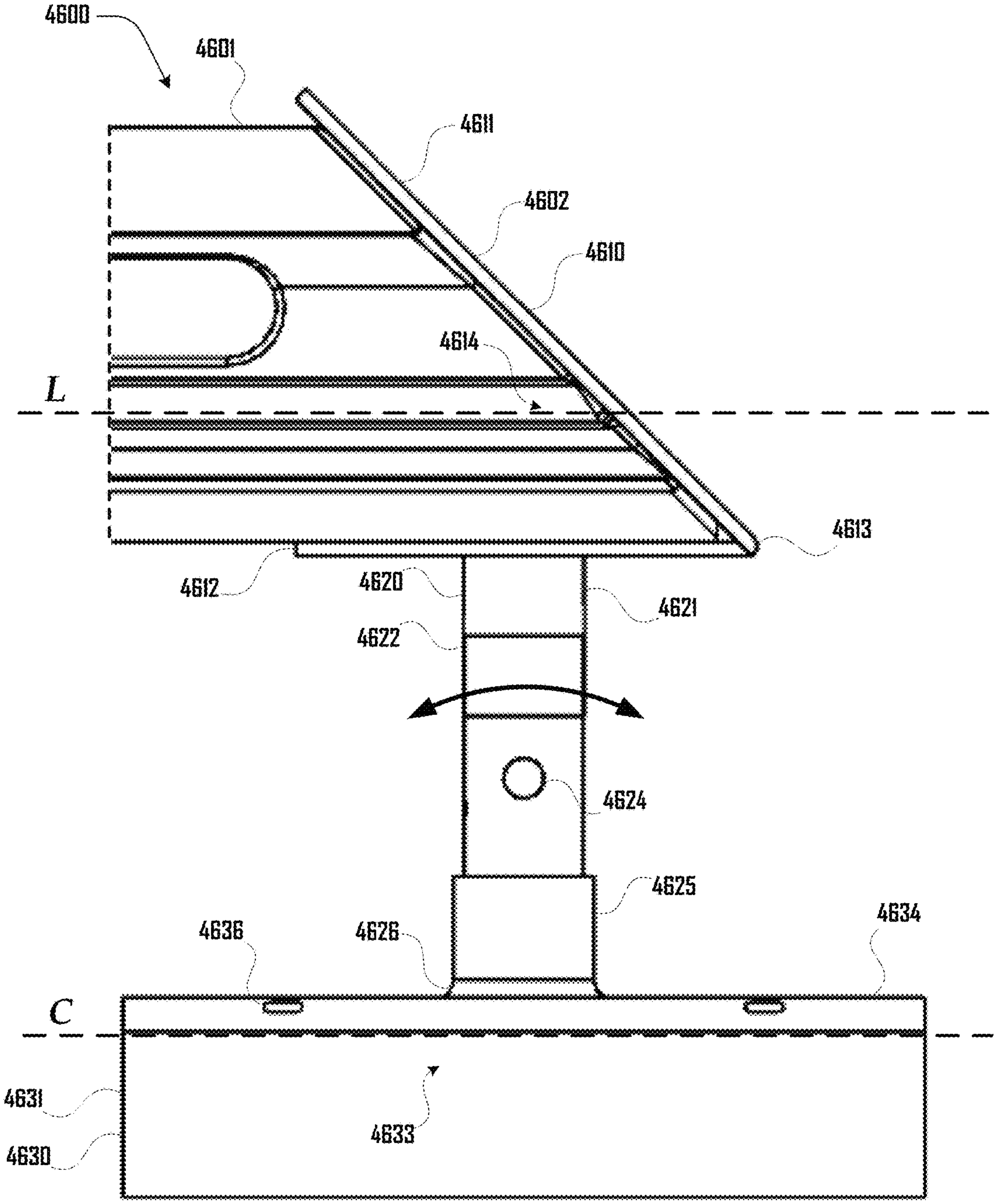

For example, as illustrated in FIGS. 48, 49 and 53, the leveling device 4601 can sense a leveling status of an axis L and the coupler assembly leveling device 5300 can sense a leveling status of axis C. In various embodiments, example axis C can be coincident with a plane, face, edge or other portion of the leveling device coupler assembly 4602, which as shown in FIGS. 48 and 49, can include the coupler top plate 4631 coupler sidewall plate 4632, coupling slot 4633, or the like. For example, where a beam, edge, or the like is coupled within the coupling slot 4633, the coupler assembly leveling device 5300 can sense a leveling status of axis C, which is coincident with an axis of such a beam or edge, which can allow the coupler assembly leveling device 5300 to effectively detect a leveling and/or positioning status of such a beam or edge.

Additionally, the coupling of the leveling device 4601 to the leveling device coupler assembly 4602 can allow the position of axis L to be known relative to a portion of the device coupler assembly 4602. For example, coupling of the leveling device 4601 within the coupling slot 4614 of the coupling head 4610 allows the position of axis L to be know relative to the coupling head 4610. Accordingly, with the position of axis L being known relative to axis C, the leveling device 4601 can report a leveling and/or position status of an object that the leveling device coupler assembly 4602 is coupled to.

In some examples, the coupler assembly leveling device 5300 lacks leveling and/or positioning sensors (e.g., a level, GPS, or the like), but can provide data that allows a difference in position between axis C and axis L, for example, to be determined. In various embodiments, the position of the joint assembly 4620 can be reported to identify a difference in position between axis C and axis L. For example, FIGS. 48 and 49 illustrate a configuration of the joint assembly 4620, where axis C and axis L are parallel and coincident within a common plane. Such a position could be considered a "zero" position of the joint assembly 4620.

Figure 50:
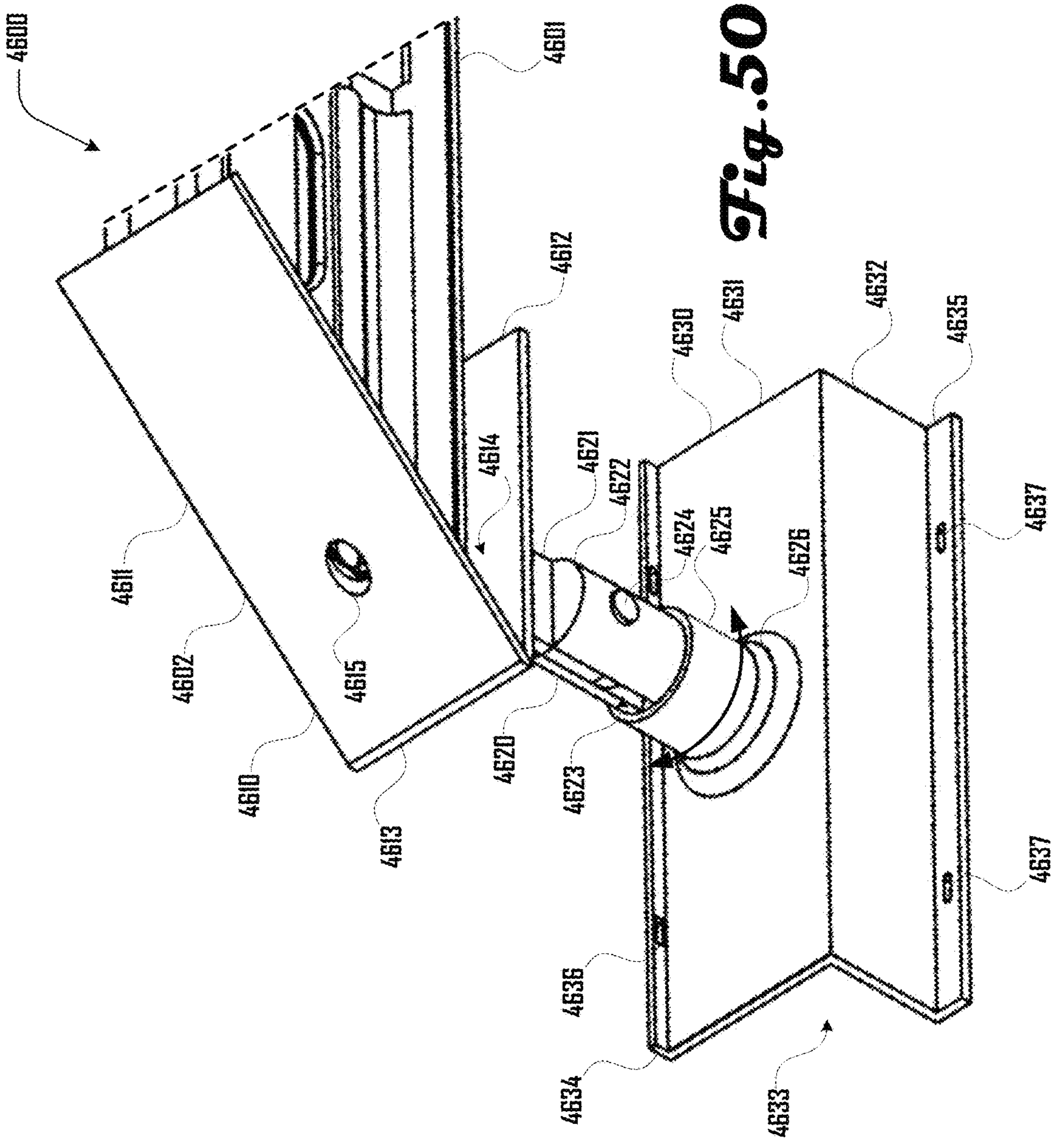
Figure 51:
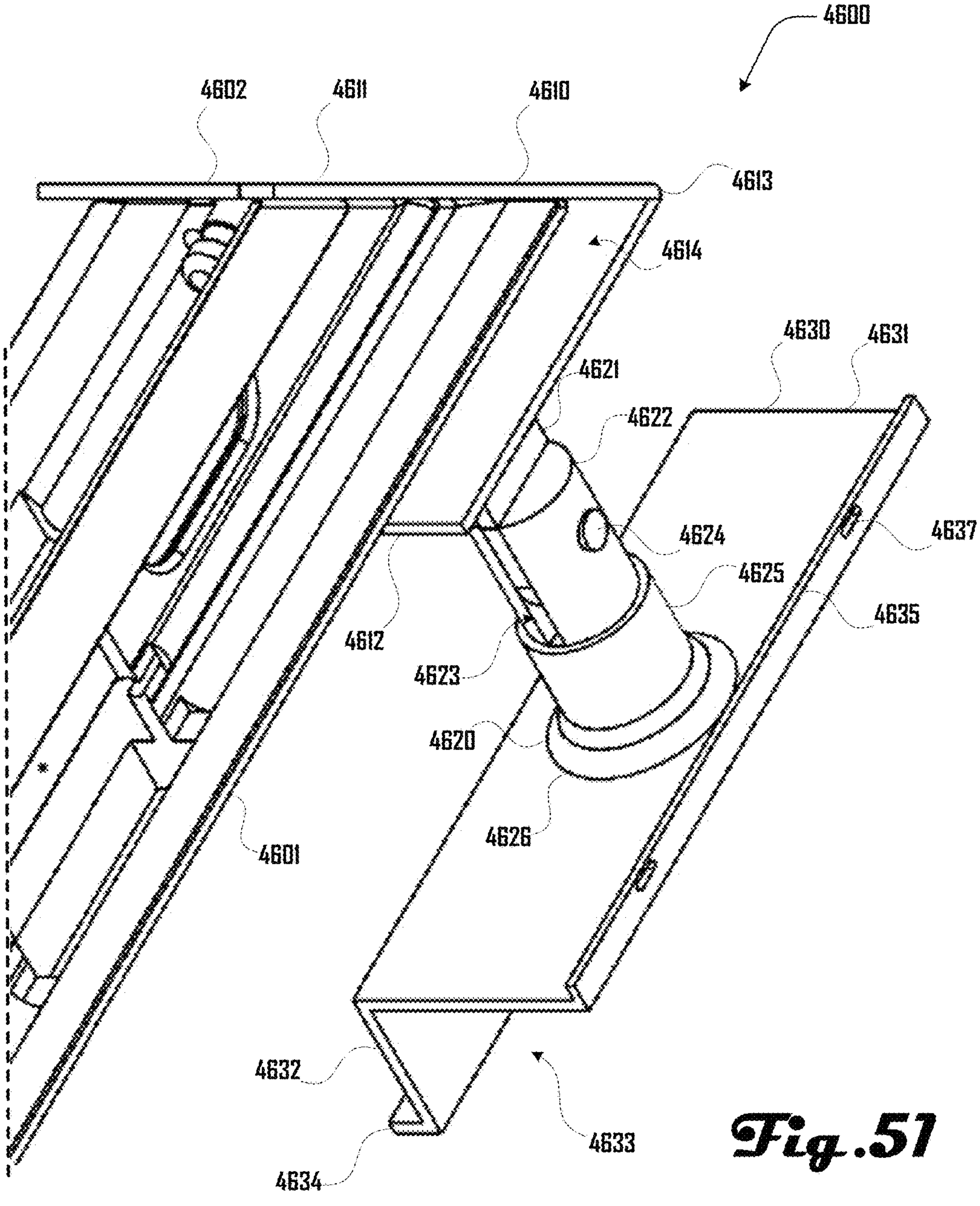
Figure 52:
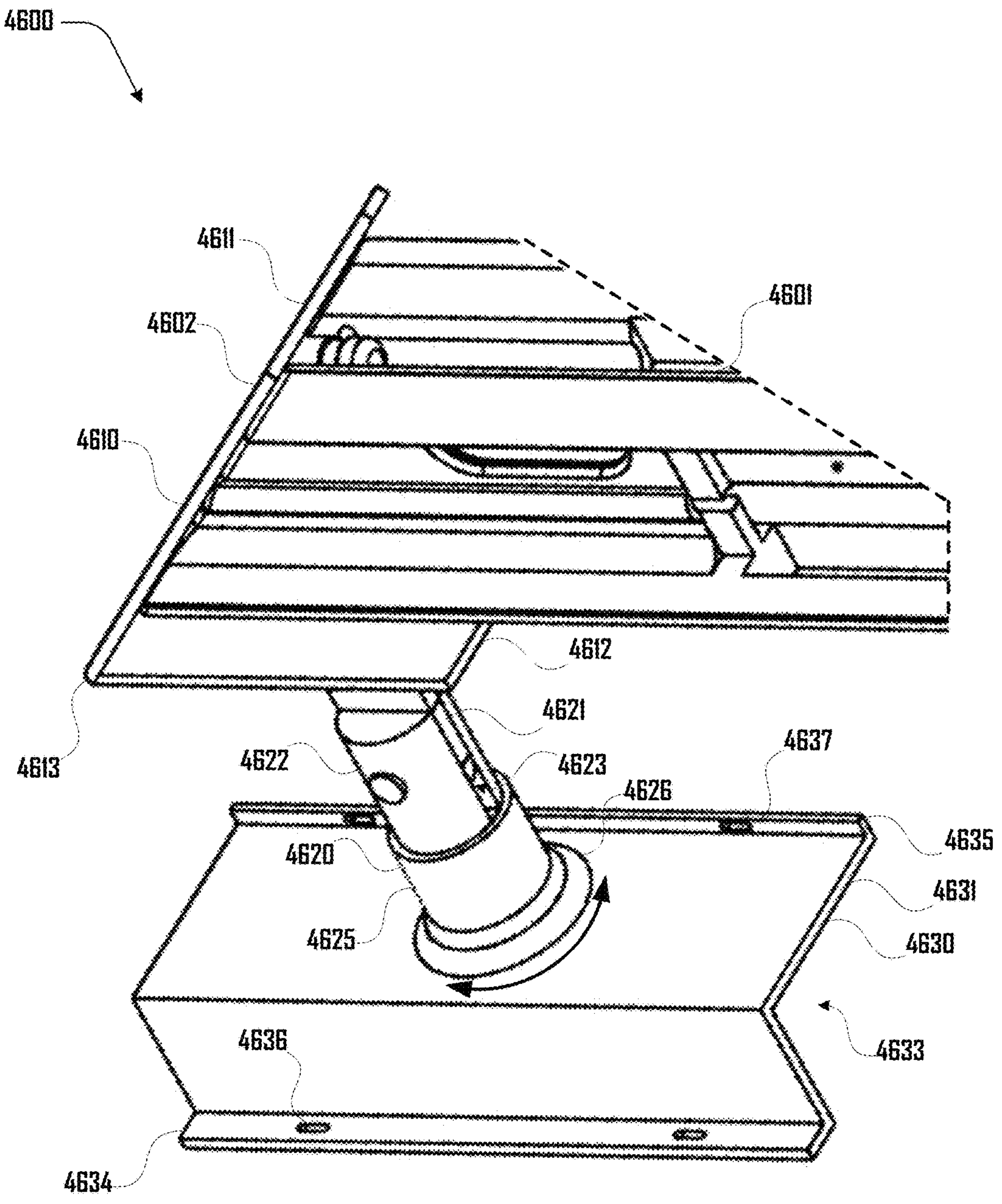

As discussed herein, and as illustrated in FIGS. 49, 50 and 52, the joint assembly 4620 can rotate about one or more axis and the position, change in position, movement, or the like of joints of the joint assembly 4620 can be reported to determine the position of axis C relative to axis L. Accordingly, the joint assembly 4620 can be configured to sense the position, movement or the like, of joints of the joint assembly 4620.

For example, where a tongue 4621 extends from a base plate 4612 and is rotatably held within a slot 4623 defined by a joint shaft 4622, with the tongue 4621 being rotatably coupled to the joint shaft 4622 via a pin 4624, the rotation position of the tongue 4621 relative to the joint shaft 4622 can be sensed and reported. Similarly, a position of a rotatable coupling associated with a shaft coupling cylinder 4625 and/or foot rim 4626 can be sensed and reported. Accordingly, such a sensed position or configuration of the joint assembly 4620 can be used to determine the position of axis C relative to axis L.

Figure 54:
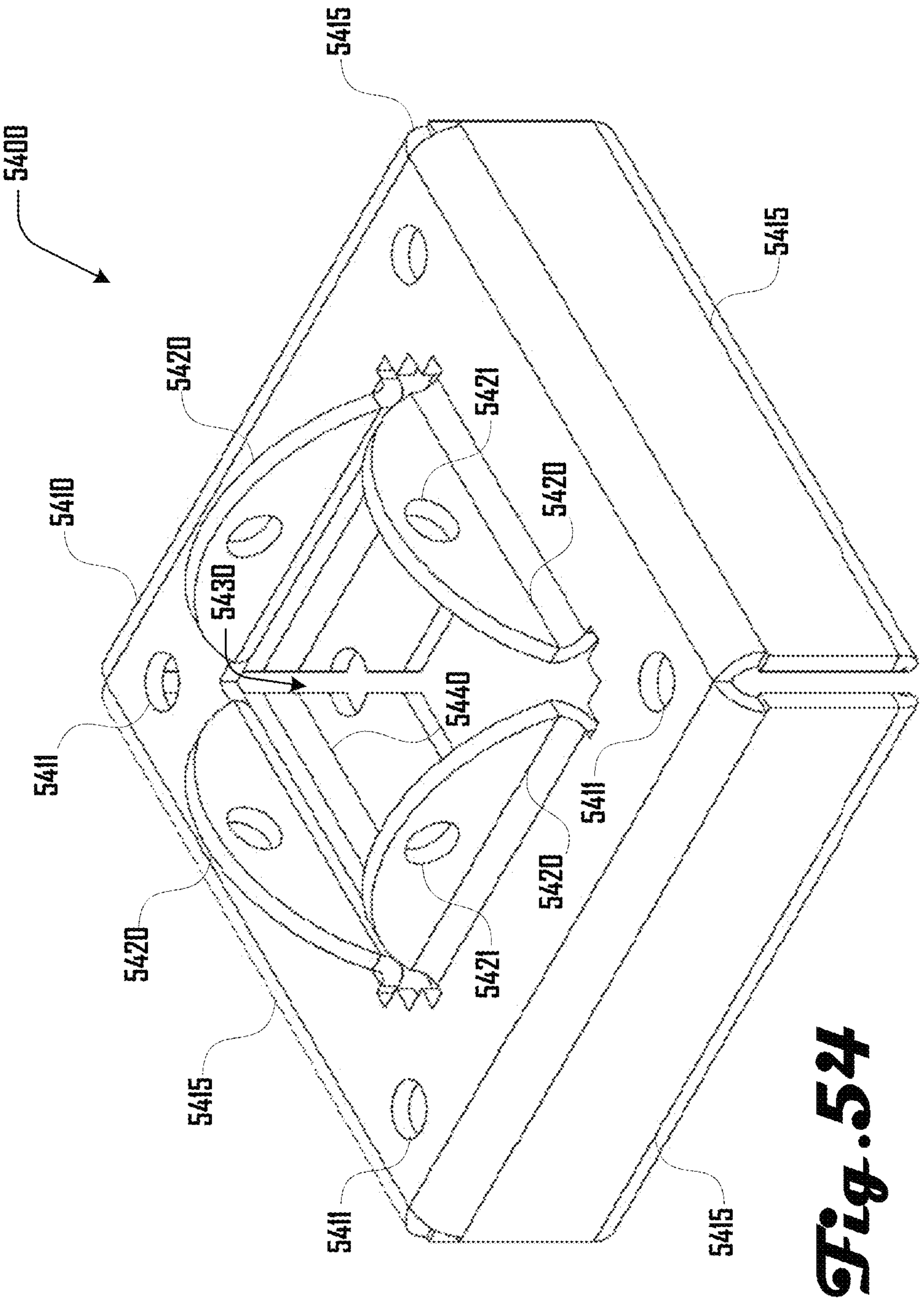
FIGS. 54, 55, and 56 illustrate an example of a leveling device puck in accordance with one embodiment.
Figure 55:
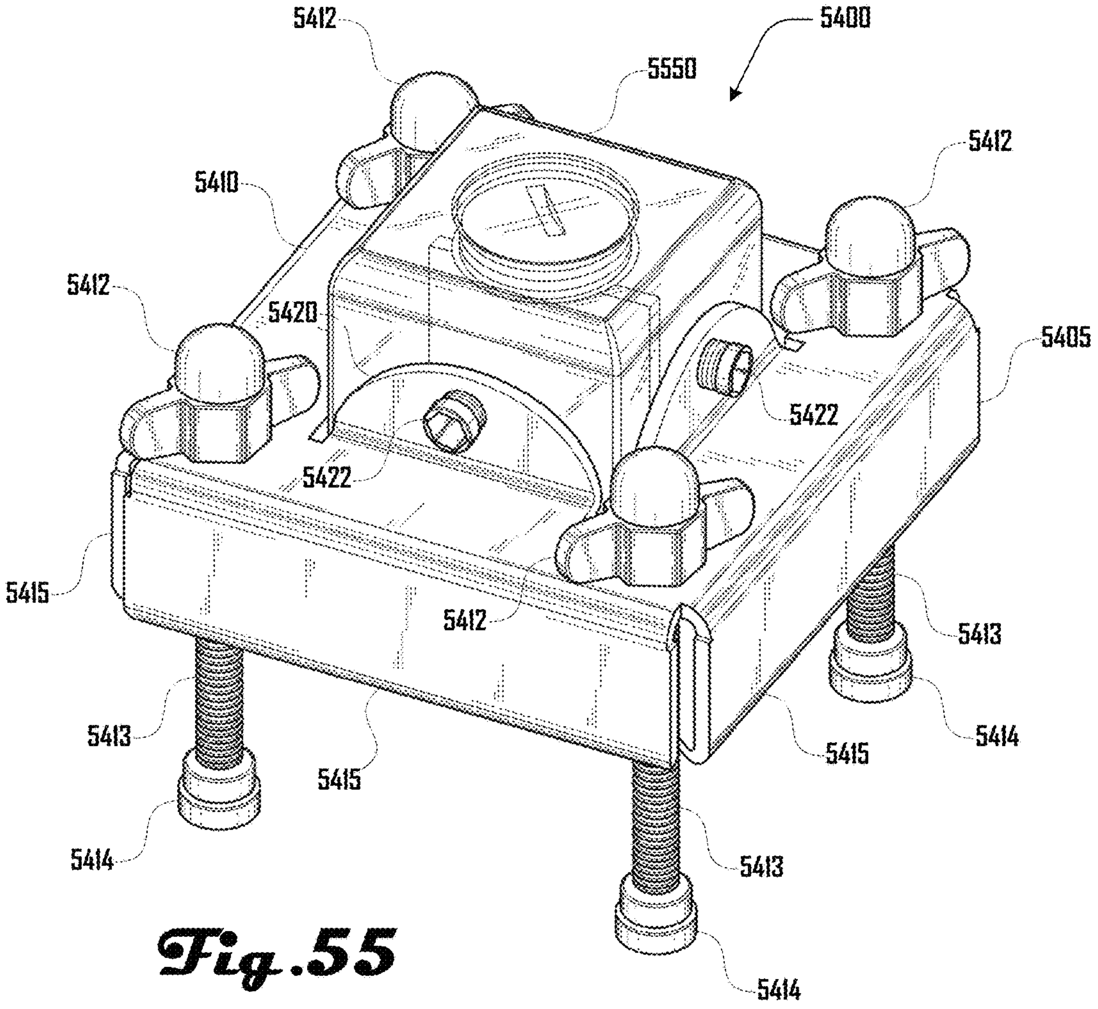
Figure 56:
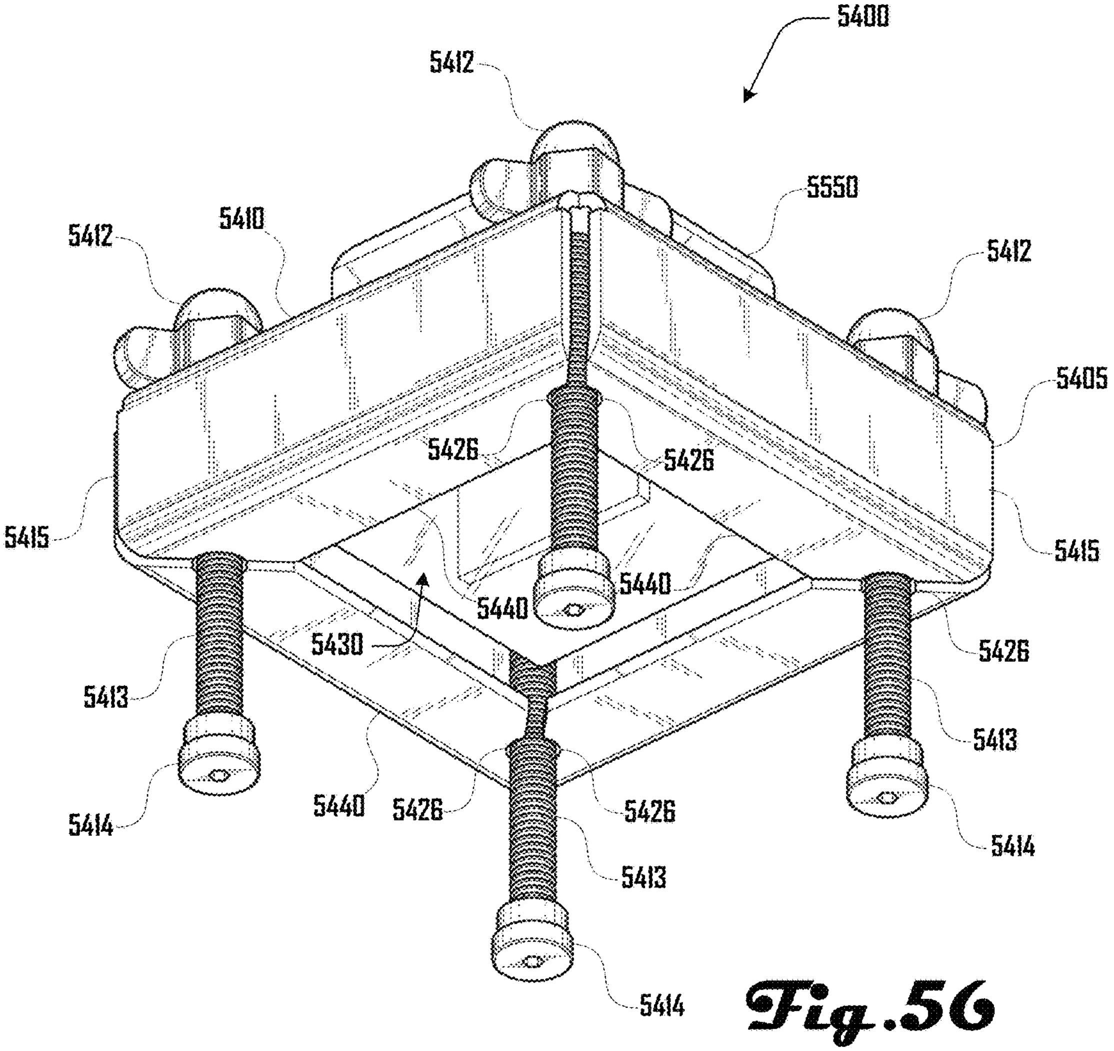

Turning to FIGS. 54-56, an embodiment of a leveling device puck 5400 is illustrated, which includes a top plate 5410, which includes a plurality of sidewalls 5415 extending therefrom on peripheral edges of the top plate 5410. Additionally, a plurality of coupling tabs 5420 extend from a central portion of the top plate 5410, with the coupling tabs 5420 and top plate 5410 defining a coupling slot 5430. The sidewalls 5415 can comprise a respective lip 5440 extending therefrom and into the coupling slot 5430.

As shown in FIG. 54, the top plate 5410 can comprise a plurality of coupling holes 5411, through which a respective plurality of shafts 5413 can extend therethrough as shown in FIGS. 55 and 56. The shafts 5413 can further extend through notches 5425 defined by adjoining lips 5440. Additionally, a plurality of respective caps 5412 can be coupled at tops of the shafts 5413 at a top face of the top plate 5410. Additionally, a plurality of respective feet 5414 can be coupled at an opposing end of the shaft 5413 from the caps 5412. As shown in FIGS. 55 and 56, a leveling device 5550 can be removably coupled within the coupling slot 5430 via screws 5422 that extend through respective tab holes 5421 of the coupling tabs 5420.

As shown in the examples of FIGS. 54-56, in on embodiment, the leveling device puck 5400 can comprise a square planar top plate 5410 with four sidewalls 5415 extending therefrom perpendicular to the top plate 5410. Similarly, the lips 5440 extending from the sidewalls 5415 can be parallel to the face of the top plate 5410 and perpendicular to the face of the sidewalls 5415. The coupling tabs 5420 can extend perpendicular to the face of the top plate 5410 and parallel to respective faces of the sidewalls 5415. While some examples of a leveling device puck 5400 can have a generally cuboid shape with the coupling tabs 5420 extending therefrom, further embodiments can include various other suitable shapes.

In various embodiments, faces of the leveling device puck 5400 can be used for leveling and/or positioning relative to various objects. For example, the faces of the sidewalls 5415 can be used for leveling of planar surfaces or corners having right angles. Similarly, a face defined by the lips 5440 extending from the sidewalls 5415 can be used for leveling of planar surfaces. Additionally, as shown in FIGS. 55 and 56, embodiments having shafts 5413 extending from the leveling device puck 5400 can be coupled to various objects via the shafts 5413 and/or the shafts can be used as legs for the leveling device puck 5400 to stand on. For example, in some embodiments, the feet 5414 can comprise magnets, or other suitable coupling structures. Additionally, in various embodiments, the length of the shafts can be changed relative to each other via threads, or the like.

In various embodiments, the leveling device 5550 can comprise any of the capabilities, elements, functions, or the like of any of the leveling devices described herein and/or in documents incorporated by reference herein. In some examples, the leveling device 5550 can have a cuboid shape as shown in FIGS. 55 and 56, but in further embodiments the leveling device 5550 can be any suitable shape. As discussed herein, the leveling device 5550 can be removably coupled within the leveling device puck 5400, which can act as a housing for the leveling device 5550 and facilitate leveling and/or positioning of the leveling device relative to various faces, structures, or the like, of the leveling device puck 5400.

Figure 57A:
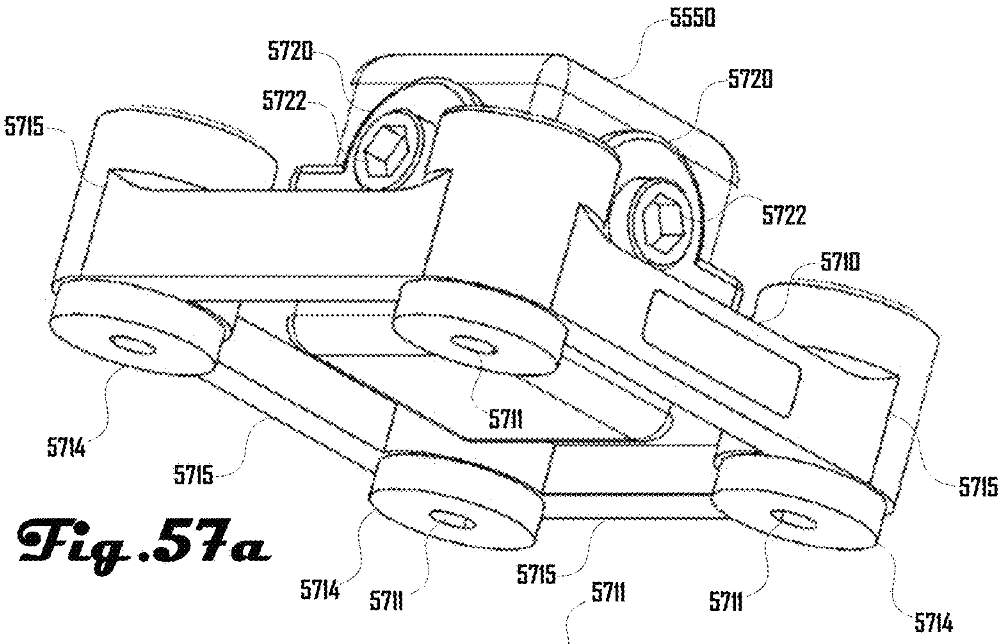
FIGS. 57*a* and 57*b* illustrate an example of a leveling device puck in accordance with one embodiment.
Figure 57B:
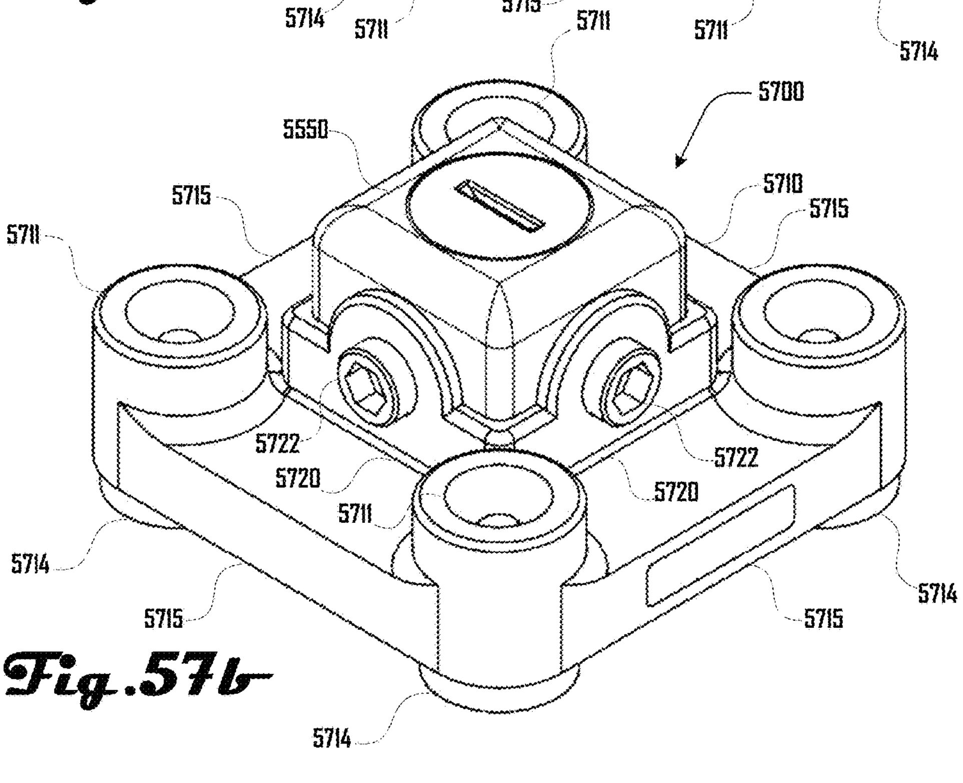

Turning to FIGS. 57*a* and 57*b*, another embodiment of a leveling device puck 5700 is illustrated, which includes a top plate 5710, which includes a plurality of sidewalls 5715 extending therefrom on peripheral edges of the top plate 5710. Additionally, a plurality of coupling tabs 5720 extend from a central portion of the top plate 5710, with the coupling tabs 5720 and top plate 5710 defining a coupling slot in which a leveling device 5550 can be removably coupled via bolts 5722.

The top plate 5710 can comprise a plurality of coupling holes 5711 that extend through the top plate, with portions defining the coupling holes 5711 extending above a face of the top plate 5710, with feet 5714 defining a bottom portion of the coupling holes 5711 extending from a bottom face of the sidewalls 5715.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. For example, while some embodiments are related to aftermarket products configured to couple with various commercially available leveling devices, further embodiments can include a standalone device with any suitable combination of such functionalities described or shown herein. In other words, functionalities and/or components described herein related to aftermarket devices can also be present in non-aftermarket devices in further embodiments.

Additionally, although specific embodiments have been illustrated and described herein, it will be appreciated by those of ordinary skill in the art and others, that a wide variety of alternate and/or equivalent implementations may be substituted for the specific embodiment shown in the described without departing from the scope of the embodiments described herein. This application is intended to cover any adaptations or variations of the embodiment discussed herein. While various embodiments have been illustrated and described, as noted above, many changes can be made without departing from the spirit and scope of the embodiments described herein.

The invention claimed is:

1. A leveling device coupling assembly comprising:

a first electronic leveling device configured to at least detect a level status of at least one axis of the electronic leveling device; and a leveling device coupler assembly that includes:

a coupling head having a planar top plate and a planar base plate that are coupled along an edge with the top plate and base plate defining a coupling slot having an angle less than or equal to 90 degrees and greater than or equal to 0 degrees, with the electronic leveling device removably coupled within the coupling slot;

a joint assembly coupled to the base plate of the coupling head, the joint assembly including a tongue extending from the base plate of the coupling head, with the tongue being rotatably coupled within a slot defined by a joint shaft to define a first rotatable coupling, at least a portion of the joint shaft defining a second rotatable coupling separate from the first rotatable coupling, a base coupler coupled to the joint assembly, with the base coupler and coupling head being coupled on opposing ends of the joint assembly, the base coupler including a planar coupler top plate and a planar coupler sidewall plate that extends from the coupler top plate at a 90 degree angle, the coupler top plate and coupler sidewall plate defining a base coupler coupling slot;

an electronic coupler assembly leveling device, configured to at least detect a configuration status of the leveling device coupler assembly, the coupler assembly leveling device being operably connected to the first electronic leveling device and operable to at least communicate a detected configuration status of the leveling device coupler assembly to the first electronic leveling device.

2. The leveling device coupling assembly of claim 1, wherein the first electronic leveling device generates a level status indicator beam, and wherein the coupling head defines a beam port though which the level status indicator beam extends.

3. The leveling device coupling assembly of claim 1, wherein the coupler top plate of the base coupler comprises a first rim extending from an edge of the coupler top plate, and wherein the coupler sidewall plate comprises a second rim extending from an edge of the coupler sidewall plate.

4. The leveling device coupling assembly of claim 3, wherein the first rim comprises a plurality of first coupling holes, and wherein the second rim comprises a plurality of second coupling holes.

5. The leveling device coupling assembly of claim 1, wherein the first rotatable coupling has a range of motion of 180 degrees or less.

6. The leveling device coupling assembly of claim 1, wherein the second rotatable coupling has a range of motion of 360 degrees.

7. The leveling device coupling assembly of claim 1, wherein the first electronic leveling device and the coupler assembly leveling device are configured to communicate via wireless communication.

8. A leveling device coupling assembly comprising:

a first electronic leveling device configured to at least detect a level status of at least one axis of the electronic leveling device; and a leveling device coupler assembly that includes:

a coupling head having a planar top plate and a planar base plate that are coupled along an edge with the top plate and base plate defining a coupling slot with the electronic leveling device removably coupled within the coupling slot;

a joint assembly coupled to the base plate of the coupling head, the joint assembly including a tongue that is rotatably coupled within a slot defined by a joint shaft to define a first rotatable coupling, at least a portion of the joint shaft defining a second rotatable coupling separate from the first rotatable coupling, a base coupler coupled to the joint assembly, with the base coupler and coupling head being coupled on opposing ends of the joint assembly, the base coupler including a planar coupler top plate;

an electronic coupler assembly leveling device, configured to at least detect a configuration status of the leveling device coupler assembly, the coupler assembly leveling device being operably connected to the first electronic leveling device and operable to at least communicate a detected configuration status of the leveling device coupler assembly to the first electronic leveling device.

9. The leveling device coupling assembly of claim 8, wherein the base coupler further comprises a planar coupler sidewall plate that extends from the coupler top plate, with the coupler top plate and coupler sidewall plate defining a coupling slot.

10. The leveling device coupling assembly of claim 9, wherein the planar coupler sidewall plate extends from the coupler top plate at a 90 degree angle.

11. The leveling device coupling assembly of claim 8, wherein the top plate and base plate of the coupling head defining the coupling slot having an angle less than or equal to 90 degrees and greater than or equal to 0 degrees.

12. A leveling device coupler assembly that comprises:

a coupling head having a planar top plate and a planar base plate that are coupled along an edge with the top plate and base plate defining a coupling slot with a first electronic leveling device removably coupled within the coupling slot;

a joint assembly coupled to the base plate of the coupling head, the joint assembly including a tongue that is rotatably coupled within a slot defined by a joint shaft to define a first rotatable coupling, at least a portion of the joint shaft defining a second rotatable coupling separate from the first rotatable coupling, a base coupler coupled to the joint assembly, with the base coupler and coupling head being coupled on opposing ends of the joint assembly, the base coupler including a planar coupler top plate; and an electronic coupler assembly leveling device, configured to at least detect a configuration status of the leveling device coupler assembly, the coupler assembly leveling device being operably connected to a second electronic leveling device and operable to at least communicate a detected configuration status of the leveling device coupler assembly to the second electronic leveling device.

* * * * *